United States Patent [19]

Hatakeyama et al.

[11] Patent Number: 5,469,354
[45] Date of Patent: Nov. 21, 1995

[54] DOCUMENT DATA PROCESSING METHOD AND APPARATUS FOR DOCUMENT RETRIEVAL

[75] Inventors: Atsushi Hatakeyama, Kokubunji; Hiromichi Fujisawa; Kanji Kato, both of Tokorozawa; Hisamitsu Kawaguchi, Sagamihara; Naoki Minegishi, Osaka; Katsumi Tada, Kokubunji; Satoshi Asakawa, Hirakata, all of Japan

[73] Assignee: Hitachi, Ltd., Tokyo, Japan

[21] Appl. No.: 843,162

[22] Filed: Feb. 28, 1992

Related U.S. Application Data

[63] Continuation-in-part of Ser. No. 555,483, Aug. 9, 1990, Pat. No. 5,168,533.

[30] Foreign Application Priority Data

Feb. 28, 1991 [JP] Japan ................................. 3-058311
Dec. 25, 1991 [JP] Japan ................................. 3-342695

[51] Int. Cl.$^6$ .................................................... G06F 17/21
[52] U.S. Cl. ................. 364/419.19; 364/419.13; 364/419.07; 364/225.3
[58] Field of Search ................ 364/419.19, 419.13, 364/419.07, 225.3; 395/600

[56] References Cited

U.S. PATENT DOCUMENTS

| | | | |
|---|---|---|---|
| 4,870,568 | 9/1989 | Kahle et al. | 364/225.3 |
| 5,051,947 | 9/1991 | Messenger et al. | 364/956.1 |
| 5,168,533 | 12/1992 | Kato et al. | 364/200 |
| 5,206,949 | 4/1993 | Cochran et al. | 395/600 |
| 5,220,625 | 6/1993 | Hatakeyama et al. | 382/54 |

FOREIGN PATENT DOCUMENTS

| | | |
|---|---|---|
| 0437615A1 | 7/1991 | European Pat. Off. . |
| 63-198124 | 8/1988 | Japan . |
| 3-125263 | 5/1991 | Japan . |
| 5-55912 | 8/1993 | Japan . |
| 5-76068 | 10/1993 | Japan . |
| WO90/16036 | 2/1990 | WIPO . |

OTHER PUBLICATIONS

Mukhopadhyay et al., An Intelligent System for Document Retrievel in Distributed Office Environments, Journal of the American Society for Information Science, Jun. 17, 1985.
"State Machines Find the Pattern", System Design/Software, 8167 Computer Design, May 1985, No. 5, Littleton, Mass.

Primary Examiner—Robert A. Weinhardt
Assistant Examiner—Frantzy Poinvil
Attorney, Agent, or Firm—Antonelli, Terry, Stout & Kraus

[57] ABSTRACT

High-speed full document retrieval method and system capable of providing result of retrieval within practically acceptable short search time. Upon registration of documents in a document database, condensed texts are created by decomposing each of textual character strings of the documents to be registered into fragmental character strings in dependence on character species and by checking mutual inclusion relations existing among the fragmental character strings. A component character table is created in which characters occurring in each of the condensed texts are registered without duplication. The condensed texts and the component character table are registered in the data base together with the texts of the documents to be registered. Upon retrieval of a document containing a search term designated by a user, a component character table search is first executed to extract those documents which contain all species of characters constituting the search term by consulting the component character table, and subsequently a condensed text search is executed by consulting the condensed texts of the documents. Finally, a text body search is executed for extracting a document which satisfies query condition imposed on the search term by consulting the texts of the documents extracted through the component character table search and the condensed text search.

50 Claims, 66 Drawing Sheets

FIG. 3

【COMPONENT CHARACTER TABLE】

|  | あ | い | う | · · | 検 | · · | 索 | · · · |
|---|---|---|---|---|---|---|---|---|
| DOCUMENT #1 | 1 | 1 | 0 | · · | 1 | · · | 1 | · · · |
| DOCUMENT #2 | 0 | 0 | 0 | · · | 1 | · · | 1 | · · · |
| DOCUMENT #3 | 0 | 0 | 0 | · · | 1 | · · | 1 | · · · |
| DOCUMENT #4 | 0 | 1 | 0 | · · | 1 | · · | 1 | · · · |
| · | · | · | · |  | · |  | · |  |
| · | · | · | · |  | · |  | · |  |
| DOCUMENT #N |  |  |  |  |  |  |  |  |

【CONDENSED TEXT】

| DOCUMENT #1 | あいまい検索技術 · · · · · · · · · |
| DOCUMENT #2 | 自然語検索技術 · · · · · · · · · |
| DOCUMENT #3 | 壁検出出口探索 · · · · · · · · · |
| DOCUMENT #4 | 文書理解用検索システム · · · · · |
| DOCUMENT #N | |

【TEXT】

| DOCUMENT #1 | あいまい検索のための検索技術 · · · · |
| DOCUMENT #2 | 自然語による検索技術 · · · · · · · |
| DOCUMENT #3 | 壁を検出しながら出口を探索 · · · · · |
| DOCUMENT #4 | 文書理解を用いた検索システム · · · · |
| DOCUMENT #N | |

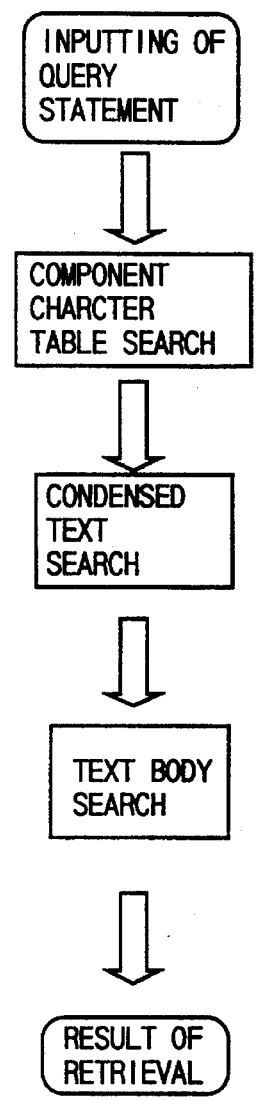

FIG. 5

| DOCUMENT #1 | あいまい,のための,検索技術 |
| DOCUMENT #2 | 自然語,による,検索技術 |
| DOCUMENT #3 | 壁,を,検出,しながら,出口,検索 |
| DOCUMENT #4 | 文書理解,を,用,いた,検索,システム |
| ⋮ | |
| DOCUMENT #N | |

FIG. 6

| CHARACTER CODE | (0000)H | ... | (SPACE) (8140)H | ... | あ (82A0)H | い (82A2)H | ... | ま (82DC)H | ... | を (82F0)H | 亜 (82F0)H | ... | 技 (889F)H | ... | 検 (8B5A)H | ... | 索 (8C9F)H | ... | 龠 (EA9E)H |
|---|---|---|---|---|---|---|---|---|---|---|---|---|---|---|---|---|---|---|---|
| DOCUMENT #1 | 0 | 0 | 1 | ... | 1 | 0 | ... | 1 | ... | 0 | 0 | ... | 1 | ... | 1 | ... | 1 | ... | 0 |
| DOCUMENT #2 | 0 | 0 | 1 | ... | 1 | 0 | ... | 1 | ... | 0 | 0 | ... | 1 | ... | 1 | ... | 1 | ... | 0 |
| DOCUMENT #3 | 0 | 0 | 1 | ... | 1 | 0 | ... | 1 | ... | 0 | 0 | ... | 1 | ... | 1 | ... | 1 | ... | 0 |
| DOCUMENT #4 | 0 | 0 | 1 | ... | 1 | 0 | ... | 1 | ... | 0 | 0 | ... | 1 | ... | 1 | ... | 1 | ... | 0 |
|  | 0 | 0 | 1 | ... |  |  | ... |  | ... |  |  | ... |  | ... |  | ... |  | ... |  |
| DOCUMENT #N |  |  |  |  |  |  |  |  |  |  |  |  |  |  |  |  |  |  |  |
| ENTRY ID NUMBER | 0 | 1 | ... 33088 | ... 33440 | 33442 | ... 33500 | ... 33520 | ... 34975 | ... 35674 | ... 35999 | ... 36341 | ... 60062 |

FIG. 12

| TRANSFORMED CHARACTER CODE | (0000)H | (SPACE) (00C0)H | ... | あ (01E0)H | い (01E2)H | ... | ま (021C)H | を (0230)H | ... | 亜 (065F)H | 重 (085F)H | 技 (085A)H | 検 (095F)H | 索 (0A75)H | ... | 簫 (1FDE)H |
|---|---|---|---|---|---|---|---|---|---|---|---|---|---|---|---|---|
| DOCUMENT #1 | 0 | 1 | .... | 1 | 1 | .... | 1 | 0 | .... | 0 | | 1 | 1 | 1 | .... | 0 |
| DOCUMENT #2 | 0 | 1 | .... | 0 | 0 | .... | 0 | 0 | .... | 0 | | 1 | 1 | 1 | .... | 0 |
| DOCUMENT #3 | 0 | 1 | .... | 0 | 0 | .... | 0 | 1 | .... | 0 | | 0 | 1 | 1 | .... | 0 |
| DOCUMENT #4 | 0 | 1 | .... | 0 | 1 | .... | 0 | 1 | .... | 0 | | 0 | 1 | 1 | .... | 0 |
| ... | 0 | 1 | | | | | | | | | | | | | | |
| DOCUMENT #N | | | | | | | | | | | | | | | | |
| ENTRY ID NUMBER | 0 1 .... 192 | | .... | 480 482 | | .... | 540 | 560 .. 1631 | .. | 2138 | | 2399 .. 2677 .. 8158 | | | | |

FIG. 18

| SCODE | ENTRY ID NUMBER |
|---|---|
| . | . |
| . | . |
| . | . |
| (095D)H | 150 |
| (095E)H | 356 |
| (095F)H | 231 |
| (0960)H | 483 |
| (0961)H | 2 |
| (0962)H | 256 |
| (0963)H | 25 |
| (0964)H | 67 |
| . | . |
| . | . |
| . | . |

BASIC WORD DICTIONARY

| | |
|---|---|
| ⟨ PARTICIPIAL FORM OF VERB "ある" ⟩ | : ある |
| ⟨ SUBJUNCTIVE FORM OF VERB "ある" ⟩ | : あれ |
| ⟨ UNENDED FORM OF VERB "なる" ⟩ | : なら |
| ⟨ CONTINUATIVE FORM OF VERB "なる" ⟩ | : なり |
| ⟨ UNENDED FORM OF VERB "もつ" ⟩ | : もた |
| ⟨ POSTPOSITIONAL WORD "が" ⟩ | : が |
| ⟨ NOUN "こと" ⟩ | : こと |
| ⟨ NOUN "ため" ⟩ | : ため |
| ⟨ NOUN "の" ⟩ | : の |

FIG. 22

CONJUNCTION RULES

CONJUNCTION RULE 1  : ⟨PARTICIPIAL FORM OF VERB "ある"⟩ + ⟨NOUN "こと"⟩
CONJUNCTION RULE 2  : ⟨PARTICIPIAL FORM OF VERB "もつ"⟩ + ⟨NOUN "ため"⟩
CONJUNCTION RULE 3  : ⟨NOUN "こと"⟩ + ⟨POSTPOSICNAL WORD "が"⟩
CONJUNCTION RULE 5  : ⟨PARTICIPIAL FORM OF VERB "する"⟩ + ⟨NOUN "こと"⟩
CONJUNCTION RULE 6  : ⟨POSTPOSITIONAL WORD "の"⟩ + ⟨NOUN "ため"⟩
CONJUNCTION RULE 7  : ⟨NOUN "ため"⟩ + ⟨POSTPOSICNAL WORD "の"⟩
CONJUNCTION RULE 8  : ⟨CONJUNCTION⟩ + ⟨POSTPOSICNAL WORD "は"⟩
CONJUNCTION RULE 9  : ⟨UNENDED FORM OF VERB "する"⟩ + ⟨POSTPOSICNAL WORD "に"⟩
CONJUNCTION RULE 10 : ⟨NOUN "こと"⟩ + ⟨POSTPOSICNAL WORD "に"⟩
CONJUNCTION RULE 11 : ⟨POSTPOSITIONAL WORD "で"⟩ + ⟨ENDED FORM OF VERB "ある"⟩
CONJUNCTION RULE 12 : ⟨UNENDED FORM OF VERB "ある"⟩ + ⟨POSTPOSICNAL WORD "は"⟩
CONJUNCTION RULE 13 : ⟨POSTPOSITIONAL WORD "は"⟩ + ⟨ENDED FORM OF VERB "だ"⟩

FIG. 33

| DOCUMENT #1 | あいま検索のため技術・・・・ |
|---|---|
| DOCUMENT #2 | 自然語による検索技術・・・・ |
| DOCUMENT #3 | 壁を検出しながら出口,検索・・・・ |
| DOCUMENT #4 | 文書理解を用いた検索,システム・・・ |
| · | ・・・・・ |
| · | ・・・ |
| | |
| DOCUMENT #N | |

| | ･･ | あ | あい | ･ | オン | イオ | イラ | イン | ライ | ラン | ･ | 関係 | 経済 | 生態 | 戦争 | ･･ |
|---|---|---|---|---|---|---|---|---|---|---|---|---|---|---|---|---|
| DOCUMENT #1 | | 0 | 0 | | 1 | 0 | 0 | 1 | 1 | 0 | | 0 | 1 | 0 | 0 | |
| DOCUMENT #2 | | 0 | 0 | | 1 | 1 | 0 | 0 | 1 | 0 | | 0 | 0 | 1 | 0 | |
| DOCUMENT #3 | | 0 | 0 | | 0 | 0 | 1 | 0 | 0 | 1 | | 1 | 0 | 0 | 1 | |
| ⋮ | | | | | | | | | | | | | | | | |
| DOCUMENT #N | | 0 | 0 | | 0 | 0 | 0 | 0 | 0 | 0 | | 0 | 0 | 0 | 0 | |

DOCUMENT #1 　･･オンラインサービスが経済発展の･･
DOCUMENT #2 　･･ライオンの生態については未だに･･
DOCUMENT #3 　･･戦争後のイランとイラクの関係は･･

FIG. 42

| | DOCUMENT #1 | ...オンラインサービスが経済発展の... |
|---|---|---|
| | DOCUMENT #2 | ...ライオンの生態については未だに... |

| COMBINATION OF CHARACTER CODES | (00000000)H | (83438349)H | (83498393)H | (83898343)H | ... | (8C6F8DCF)H | ... | (EAA2EAA2)H |
|---|---|---|---|---|---|---|---|---|
| | | オン | ンラ | ライ | ... | 経済 | ... | |
| DOCUMENT #1 | ... | 1 | 1 | 1 | ... | 1 | ... | 0 |
| DOCUMENT #2 | ... | 0 | 1 | 1 | ... | 0 | ... | 0 |
| DOCUMENT #3 | | | | | | | | |
| ... | | | | | | | | |
| DOCUMENT #N | ... | 0 | 0 | 0 | ... | 0 | ... | 0 |

FIG. 48

| | DOCUMENT #1 | ‥オンラインサービスが経済発展の‥ |
|---|---|---|
| | DOCUMENT #2 | ‥ライオンの生態については未だに‥ |

| COMBINATION OF CHARACTER CODES | (0000000)H | (02830286)H | (02860 2D3)H | (02C90283)H | (096F0A8F)H | ... | (20222022)H |
|---|---|---|---|---|---|---|---|
| | | イオ | オン | ライ | 経済 | | |
| DOCUMENT #1 | ... | 1 | 1 | 1 | 1 | ... | 0 |
| DOCUMENT #2 | ... | 0 | 1 | 1 | 0 | ... | 0 |
| DOCUMENT #3 | ... | | | | | ... | |
| ⋮ | | | | | | | |
| DOCUMENT #N | ... | 0 | 0 | 0 | 0 | ... | 0 |

FIG. 53

| | | |
|---|---|---|
| DOCUMENT #1 | ‥オンラインサービスが経済発展の‥ | |
| DOCUMENT #2 | ‥ライオンの生態については未だに‥ | |

| HASH ENTRY | 0 | ‥ | 34 | ‥ | 643 | 646 | 723 | ‥ | 2703 | ‥ | 4095 |
|---|---|---|---|---|---|---|---|---|---|---|---|
| | | | | | ライ | イオ | オン | | 経済 | | |
| DOCUMENT #1 | ‥0 | | | | 1 | 1 | 1 | | 1 | ‥ | |
| DOCUMENT #2 | ‥0 | | | | 0 | 1 | 1 | | 0 | ‥ | |
| DOCUMENT #3 | | | | | | | | | | | |
| ‥ | | | | | | | | | | | |
| DOCUMENT #N | ‥0 | | | | 0 | 0 | 0 | | 0 | ‥ | |

FIG. 55

| HASH ENTRY | 0 | 200 | 400 | 500 | 550 | 2050 | 2150 | 4095 |
|---|---|---|---|---|---|---|---|---|
| DOCUMENT #1 | | | | | | | | |
| DOCUMENT #2 | | | | | | | | |
| DOCUMENT #3 | | | | | | | | |
| . . . | | | | | | | | |
| DOCUMENT #N | | | | | | | | |
| | HIRAGANA CHARACTER HASHING AREA | KATAKANA CHARACTER HASHING AREA | ALPHABET HASHING AREA | NUMERIC CHARACTER HASHING AREA | 1ST LEVEL JIS KANJI CHARACTER HASHING AREA | 2ND LEVEL JIS KANJI CHARACTER HASHING AREA | COMPOUND CHARACTER SPECIES HASHING AREA | |

FIG. 64

| SCODE1 SCODE2 | HASH ENTRY |
|---|---|
| . | . |
| . | . |
| (096F0A8C)H | 4032 |
| (096F0A8D)H | 167 |
| (096F0A8E)H | 1680 |
| 「経済」→ (096F0A8F)H | 34 |
| (096F0A90)H | 2687 |
| (096F0A91)H | 2948 |
| (096F0A92)H | 862 |
| . | . |
| . | . |

DOCUMENT DATA PROCESSING METHOD AND APPARATUS FOR DOCUMENT RETRIEVAL

CROSS REFERENCE

This is a continuation in-part application of our U.S. application Ser. No. 555,483, filed Aug. 9, 1990, (PCT JP 90/00774, filed Jun. 14, 1990), U.S. Pat. No. 5,168,533, the isclosure of which is hereby incorporated by reference.

BACKGROUND OF THE INVENTION

The present invention generally relates to a document data processing system and particularly to a full document retrieval system also known as a full text search system For searching and retrieving a full text of a document From a document database on the basis of a designated character string. In more particular, the present invention is concerned with a document retrieval method and system which is capable of speeding up a full text retrieval processing significantly by using an auxiliary File For the search processing.

In the document registration/retrieval systems known heretofore, such a scheme is generally adopted in which a word or term (referred to as a keyword) representing the content of a document to be registered is used as an index. According to this method, however, it is necessary to have an expert called "indexer" read thoroughly every document to be registered and assign pertinent keywords to the documents on the basis of his or her understanding of the contents thereof. As an attempt For evading such troublesome and time-consuming work For the document registration, there has been proposed a method according to which the words or terms occurring in the texts of a document are all registered as the keywords in an index file, as is disclosed, For example, in JP-A-63-198124.

However, the method mentioned above still suffers from a drawback that difficulty is encountered in determining a semantically meaningful word or term of a minimum unit upon preparation or creation of the index file. Besides, due to possible deficiency in a word dictionary and/or grammatical rules, analysis of sentences often Fails of success, presenting a problem that even an important word can not be extracted as the keyword.

As an approach to solve the above problem, there has already been proposed a full document retrieval system which is also referred to as the full text search system and in which documents are straightforwardly loaded in a database through the medium of a computer as texts composed of coded characters upon document registration, while upon retrieval of a document, contents of all the documents stored in the database are read to thereby retrieve the document containing a given or designated keyword (hereinafter referred to as "search term" to distinguish it from the authorized or controlled keyword used in conjunction with the conventional system), as is disclosed, for example, in an article entitled "Text Database Manage System SIGMA and Applications" contained in "Study Reports of The Information Processing Society of Japan: Informatics Fundamentals 14–7", Vol. 89, No. 66 (Jul. 27, 1989). This. full text search system Features among others a character-by-character based scanning of a whole text file from the beginning, as is described in the preamble of the second section of the abovementioned article. By virtue of this feature, it is possible to search or retrieve a document from the database by using the text body as a clue, even in the case where there is available no index file containing document identifiers corresponding to the keywords. In other words, by conducting a character-string based search for all the text data with the aid of a given search term, only the document in which the search term is described or contained can be outputted as the result of the retrieval.

This full document or text retrieval system takes, however, a lot of time for the search processing because the whole text file has to be scanned from the beginning on a character-by-character basis, incurring a problem that the full text search can not practically be applied to a large scale database. As stated also in the abovementioned article in the second section, the full text search system under consideration can realize only the search processing speed (rate) on the order of 2 MB/sec., even by resorting to the use of a general-purpose large scale computer. Of course, the processing speed on this order can afford a practically admissible search time so far as the capacity of a database is several megabytes or so. In reality, however, a database used in practice for the business purpose or the like usually demands a capacity of several hundred megabytes or so. In that case, the full text search system mentioned above will not be in the position to assure any satisfactory response time for the document search.

In an effort to cope with the difficulties mentioned above, the inventors of the present application have already proposed an information retrieval system in which the reading of text data as well as the search processing effected by using a search term are speeded up by providing hardware dedicated thereto, while performing in precedence to a text body search a presearch, so to say, on an auxiliary File in which the text data are previously stored in the compressed state, to thereby screen or shift the documents to undergo the text body search, with a view to realizing the full text search at an equivalently increased speed. In this conjunction, reference may be made to PCT/JP/90/00774, U.S. patent application Ser. No. 555,483, now U.S. Pat. No. 5,168,533 and WO/90/16036. More specifically, this information retrieval system features the presearch procedures referred to as a component character table search and a condensed text search, respectively, wherein the documents to be subjected to the text body search fare screened out (i.e. reduced in the number of documents) hierarchically, so to say, by executing stepwise the component character table search and the condensed text search. To say in another way, through the document screening or narrowing-down preprocessing, the number of the documents to be subjected to the text body search the time for which occupies a greater proportion of the whole search time can be decreased, which in turn means that the time taken for the search or retrieval processing as a whole can correspondingly be shortened, whereby the full text search can be realized at an equivalently increased speed.

According to the abovementioned hierarchical presearch featuring the system proposed by the inventors, the number of the documents is decreased first through the character-based search performed by consulting the component character table, which is then followed by second document number reduction through the word- or term-based search performed by using the condensed text table on the documents remaining even after the character-based search. In connection with the capacity of the database, it is to be mentioned that storage of a condensed text requires about 30% of the capacity for storing a text while the component character table requires 256 bytes per document.

In the information retrieval system mentioned above, however, no consideration is paid to the sentences or words in which the characters contained in the component character table are used, because the document screening or reduction is realized solely in dependence on whether or not a character constituting a part of the search term exists in the component character table. As a consequence, for an input search term composed of those characters which make appearance in the text at a high frequency, the component character table search can not afford a sufficiently high screening ratio for reduction of the documents, giving rise to a problem. In that case, the number of the documents to be subjected to the text body search will not be diminished to such an extent which can assure a sufficiently high retrieval response.

As another approach for speeding up the full text search, there can be mentioned a method disclosed in an article entitled "Method of Speeding-Up Katakana Character Search in Full Document Retrieval By Using Character String Matching" contained in "Study Reports of The Information Processing Society of Japan: Database System 83–1" Vol. 91, No. 46 (May 24, 1991). According to this known method, positional information of all the characters appearing in a document is stored as the indexes on a character-by-character basis, wherein a document in which all the characters constituting a designated or inputted search term make appearance in succession is sought by reference to the indexes. This method requires, however, as many as about 40 KB for the indexes on the assumption that the positional information of four bytes is stored for each character in the case of a document containing ten thousand characters, by way of example. Accordingly, an attempt of structuring a text database containing such documents in a number of one hundred thousands or so will require a storage capacity of 4 GB for the indexes in addition to 2 GB for the storage of the documents themselves. Accordingly, it can be said by no means that such attempt is practical, in view of the enormous capacity demanded for the index storage.

SUMMARY OF THE INVENTION

In the light of the state of the art described above, it is an object of the present invention to provide a document data processing method for high-speed full document retrieval and an apparatus for carrying out the same which allow the retrieval or search result to be outputted within a practically acceptable search time even in the search of a large scale text database for practical application.

More particularly, it is another object of the present invention to provide a hierarchical presearch type document retrieval method incorporating component character table creation and search facilities which can afford a sufficient document screening capability for a given search term as well as a full document retrieval system for carrying out the method.

According to a first aspect of the present invention, there is provided a document data processing method for full document retrieval which comprises processing steps mentioned below as well as a system for carrying out the method. (1) A step of storing or loading texts themselves. (2) A step of decomposing texts as stored into a plurality of fragmental character strings at word level, checking inclusion relation possibly existing among the Fragmental character strings resulting from the decomposition and creating condensed texts, each composed of a set of fragmental character strings in which any character string included or covered by other character string is eliminated. (3) A step of creating a component character table in which characters used in the text are collected without duplication. (4) A step of dividing or splitting a given search term at character level and effecting a component character table search for extracting only the documents that contain all the characters constituting the search term. (5) A step of extracting the documents containing the given search term by consulting the condensed texts corresponding to the documents extracted through the component character table search. (6) When a given search query condition (i.e. statement of condition for search or search condition statement, to say in another way) designates positional relations among a plurality of given search terms in a text, a step of executing a text body search for extracting only the document that contains the given search terms and at the same time satisfies the query condition such as the positional relation among the search terms by consulting the text body data corresponding to the documents extracted through the condensed text search.

By adopting such hierarchical presearch mechanism that the documents subjected to the retrieval are decreased in number hierarchically through the component character table search and the condensed text search and finally undergo the text body search according to the teachings of the invention as described above, those documents which can not meet the given search query condition ape discarded through the component character table search and the condensed text search in precedence to the text body search, whereby the number of documents which ape to undergo the text body search for retrieving the text of document of concern can significantly be decreased (i.e. significant reduction of the documents can be realized before the text body search). Thus, the search time as a whole can be shortened owing to the reduction in the time needed for the text body search which occupies a large proportion of the whole search time.

For the illustrative purpose, let's assume that there is given a query condition statement reading "search a document having a text in which " 亠 化 " and " 扌 圷 " occur in one and the same sentence". In that case, according to the search methods known heretofore which are designed to perform the search straightforwardly on the texts, it will take 250 seconds or about 4 minutes for searching all the texts of the 500 MB on the assumption that the search processing rate is 2 MB/sec. In contrast, when the hierarchical presearch taught by the present invention is adopted, the number of texts can be reduced to 10% of all the texts stored in the database through the component character table search and can Further be decreased through the condensed text search to 10% of the texts or documents remaining after the component character table search in a typical case. In this conjunction, assuming that the volume of the condensed texts is 30% of the texts, the volume of the condensed texts to be subjected to the search will be 15 MB because the capacity of the component character table is so small as to be neglected when compared with the capacity of the database as a whole. Consequently, the volume of the texts which are to undergo the text body search processing will amount to no more than 1% of the capacity of the database, i.e. 5 MB. Thus, the document retrieval processing can be completed within 10 seconds even with the search rate of 2 MB/sec.

In this manner, in the hierarchical presearch processing according to the first aspect of the present invention, the two presearches of "component character table search" and "condensed text search" are stepwise carried out preparatorily to sieve out the documents at "character level" and "term or word level", respectively, to thereby constrict (or reduce the number of) the documents which are to be subjected to the text body search to a possible minimum. By virtue of this feature, the number of the documents to undergo the most time-consuming text body search can be decreased, whereby the full text search can be carried out at a correspondingly increased speed.

Furthermore, when the query condition statement designates a single search term or prescribes AND, OR or NOT condition (Boolean condition) for plural search terms, the result of the condensed text search can be outputted as the final result of the document retrieval. This can be explained by the fact that the word or term existing in the condensed text need not be searched once again because such term exists in the text as well without fail. In that case, the text body search which takes a lot of time for the search at the word level can utterly be spared, whereby the whole search time can further be shortened.

As will be appreciated from the foregoing, a high-speed full document retrieval or full text search can be realized according to the document retrieval method which comprises the processing steps mentioned hereinbefore because the load for searching directly the texts can be reduced beforehand.

According to a second aspect of the present invention, there is provided a document data processing method for full document retrieval which comprises processing steps mentioned below as well as a system for carrying out the same.

Namely, upon document registration for implementing a database, (1) a step of loading text data, (2) a step of counting the frequencies at which character strings each composed of a predetermined number n of characters make appearance in the text data and rearraying the character strings in the order of respective frequencies, (3) a step of establishing correspondences between the character strings and a number of entries which is smaller than that of the character strings and storing the correspondences in the form of a hash table, and (4) a step of storing the character strings used in the text data at the entries corresponding to the character strings in the form of component character lists indicating existence of the character strings, respectively, while upon retrieval of a designated document, (5) a step of dividing or splitting a designated keyword or search term into fragmental character strings each composed of n characters, (6) a step of extracting the entries corresponding to the character strings resulting from the splitting from the abovementioned component character table, and (7) a step of searching a document in which all the character strings composing the keyword exist, by consulting the entries extracted from the component character table, to thereby perform the component character table search for extracting only the document that contains possibly the designated search term.

The second aspect of the present invention is thus concerned with an improvement of the character component table structure.

The procedure for preparing or creating the component character table through the abovementioned processing will be described below in some detail by referring to FIG. 34 of the accompanying drawings.

In the first step, the text data is decomposed into character strings each of a predetermined length n.

In the second step, decision is made as to which of the entries in the component character table a character string resulting from the decomposition corresponds.

In the third step, information indicating existence of the character string corresponding to the entry as decided in the second step is recorded.

A procedure for searching the component character table prepared in this manner will be described below by reference to FIG. 35.

For retrieval or search processing, a search term is split into fragmental character strings each of a same string length n in a first step as is in the case of creation of the component character table.

In a second step, entries of the component character table which correspond to the fragmental character strings are obtained by using a same hash table as used in the creation of the component character table.

In a third step, only the document that contains descriptions of all existence information at the entries of the component character table corresponding to all the fragmental character strings thus obtained is outputted as the result of the component character table search.

By preparing the component character table on the basis of character strings each having a predetermined length (predetermined number of characters) contained in the text data in this manner, those documents which can not be reduced in number through the search by using a single character which is frequently used in documents written in Japanese can efficiently be marked and filtered out by using a preceding and/or succeeding character as a clue. By way of example, let's consider a character string " ". In that case, the number of documents can not be reduced to more than about 20% with the single character search. In contrast, the search with the character string consisting of two characters allow the number of documents to be reduced down to 3%. Consequently, the number of the document of which text data has to be scanned is correspondingly decreased, whereby the full text or document search can be accomplished within a correspondingly shortened time.

In preparation of the hash table used in the second step of the component character table creation processing, the individual character strings ape so distributed that they can be hit as uniformly as possible on the basis of frequency information of the characters contained in the document to be registered. To this end, all the character codes ape previously checked as to frequencies at which the corresponding characters occur in the documents, whereon as many low-frequency characters as possible are mapped to a same entry of the component character table so that a maximum hit ratio can be attained on an average regardless of the characters used in the search term.

When the component character table is created on the basis of plural characters, it is necessary to create the component character table containing combinations of all the characters as the entries. In this conjunction, it is noted that in the case of the shift JIS code system, the number of characters amounts to "6,879", which in turn means that for creation of the component character table by combining, For example, two characters, the entries have to be prepared for as many character strings as 47,320,641 different combinations (= 6,879×6,879). Obviously, this is unfavorable from the practical standpoint, because a memory of an enormous capacity will then be required.

To cope with this problem, the characters are first hashed on a character-by-character basis to be mapped to a smaller number of different characters such as, for example, 256 characters, whereby 65,536 combinations (= 256×256) are prepared. Subsequently, the 65,536 combinations are again hashed to thereby create the component character table containing a reduced number of fragmental character strings. This table will hereinafter be referred to as the concatenated component character table for distinguishing it from the component character table used according to the first aspect of the invention. By way of example, the 65,536 combinations may be hashed to 2,048 entries. Owing to the hash processings at two steps as mentioned above, the concatenated component character table can be implemented with a practically acceptable memory capacity.

Upon execution of search by using, for example, a two-character based concatenated component character table, a given search term, for example, "イ シ ゛ ー  フ ァ ー ジ " is split on a two-character basis as follows: "イ シ ゛" "ー " "フ ァ" "ー ジ "

as shown in FIG. 36 at ① or alternatively "イ シ ゛" "゛ ー " "ー " "フ ァ" "ア ー " "ー ジ "

as shown in FIG. 36 at ②, whereon a document containing all of these character combinations is searched out from the concatenated component character table containing the character combinations as the entries as described above.

Further, to cope with the designation of the search term consisting of a single character, there is provided a component character table created on a single-character basis in addition to the abovementioned concatenated component character table. In that case, unless folding is effected by hashing, the result of the search of the single-character based component character table can be outputted as the final retrieval result, because no more than one character is mapped to the relevant entry. Thus, the document retrieval search can be completed upon completion of the search of the single-character based component character table for the given search term consisting of one character.

By creating the concatenated component character table in which a fragmental character string composed of n characters constitutes one entry, occurrence frequency of the character string can be suppressed lower when compared with that of the string consisting of one character, whereby a sufficient reduction of the documents with regard to the number thereof can be realized even if the characters consisting the search term are those used frequently. To say in another way, stable document screening or filtering function can be accomplished without being affected by the characters of the search term. By virtue of this feature, a relatively large number of documents which are irrelevant to the search term can be discarded through the search of the concatenated component character table, as a result of which the number of the condensed texts and hence that of the texts subjected to the subsequent text body search can significantly be reduced. This means that the time taken for the text body search which occupies a greater proportion of the whole search time as well as the time taken for the condensed text search can be reduced, whereby the whole search time is remarkably shortened.

Now, let's assume that there is designated a query condition statement reading "search a document having a text in which 'あいまい' and 'フアジー' coexist in a same sentence", which is one example of the query condition statement which also designates the positional relation between the two search terms in a text. In this case, according to the prior art method which is carried out by consulting directly the texts, it takes 250 seconds or about 4 minutes fop performing the search on all the texts of 500 MB on the assumption that the search processing rate is 2 MB/sec.. Further, it is assumed that through the hierarchical presearch performed by using the one-character based component character table, the number of documents can be reduced or constricted to 30% of the whole volume of the database through the component character table search while it can be reduced down only to 1% of the whole database through the condensed text search. In that case, when the volume of the condensed texts is 30% of that of the texts, the volume of the condensed texts subjected to the search is 45 MB while that of the texts is 5 MB, i.e. 1% of the whole database capacity, with the volume of the component character table being neglected, then the search processing can be completed within 25 seconds at the search speed of 2 MB/sec.. In contrast, when the document number can be reduced to 10% of the whole database through the concatenated component character search, i.e. one-third of the document number reduced by the prior art method, then the volume of the condensed texts to undergo the search is 15 MB with that of the texts being 5 MB, which makes it possible to complete the retrieval processing within 10 seconds, meaning that the search or retrieving speed can be increased about 2.5 times as high as that of the prior art method.

In this manner, by executing hierarchically the two-level presearch processing with the aid of the concatenated component character table and the condensed texts, respectively, the documents can be screened or sieved out at two levels of the n-character-based fragmental character string level and the word level, respectively, to thereby reduce the number of the documents to be subjected to the text body search which is the most time-consuming processing, as a result of which the full document retrieval can be realized at a very high speed.

Further, when a single search term composed of less than n characters is given, the result of the concatenated component character table search can be outputted as the final result of the document retrieval. In this case, the retrieval result can be obtained within an extremely short time.

As will now be appreciated from the foregoing, the full document retrieval method comprising the aforementioned steps (1) to (8) can reduce remarkably the volume of the texts to be directly searched by virtue of the inventive hierarchical presearch, whereby the full document retrieval can be accomplished at an extremely high speed, to a great advantage.

BRIEF DESCRIPTION OF THE DRAWINGS

FIG. 3 is a schematic flow chart for illustrating a search processing involved in the hierarchical presearch according to an aspect of the invention;

FIG. 5 is a view for illustrating, by way of example, a manner in which the condensed texts are stored;

FIG. 6 is a view showing schematically a structure of a component character table;

FIG. 12 is a view fop illustrating schematically a structure of the component character table employed according to a fourth embodiment of the invention;

FIG. 18 is a view showing schematically a structure of a character code/entry ID number correspondence table for illustrating a hash function employed according to the seventh embodiment of the invention;

FIG. 21 is a view showing, by way of example, a structure of a basic word dictionary referred to in a subsidiary word analysis adopted in the eighth embodiment of the invention;

FIG. 22 is a view showing, by way of example, conjunction rules referred to in the subsidiary word analysis adopted in the eighth embodiment of the invention;

FIG. 33 is a view for illustrating, by way of example, a structure of a component character table storing characters on a character-by-character basis;

FIG. 40 is a view showing, by way of example, a structure of the concatenated component character table;

FIG. 42 is a view showing, by way of example, a structure of the character code dependent type concatenated component character table;

FIG. 48 is a view showing schematically a structure of a character code transformation type concatenated component character table;

FIG. 53 is a view showing schematically a structure of a hashing type concatenated component character table;

FIG. 55 is a view showing schematically a structure of a character-species-based hashing type concatenated component table employed in a nineteenth embodiment of the invention;

FIG. 64 is a view showing schematically a structure of a hash table;

DESCRIPTION OF THE PREFERRED EMBODIMENTS

Now, the present invention will be described in detail in conjunction with preferred or exemplary embodiments thereof by reference to the drawings.

In the first place, the description is directed to a first aspect of the teachings of the invention incarnated in first to fourteenth illustrated embodiments.

Figure 1:
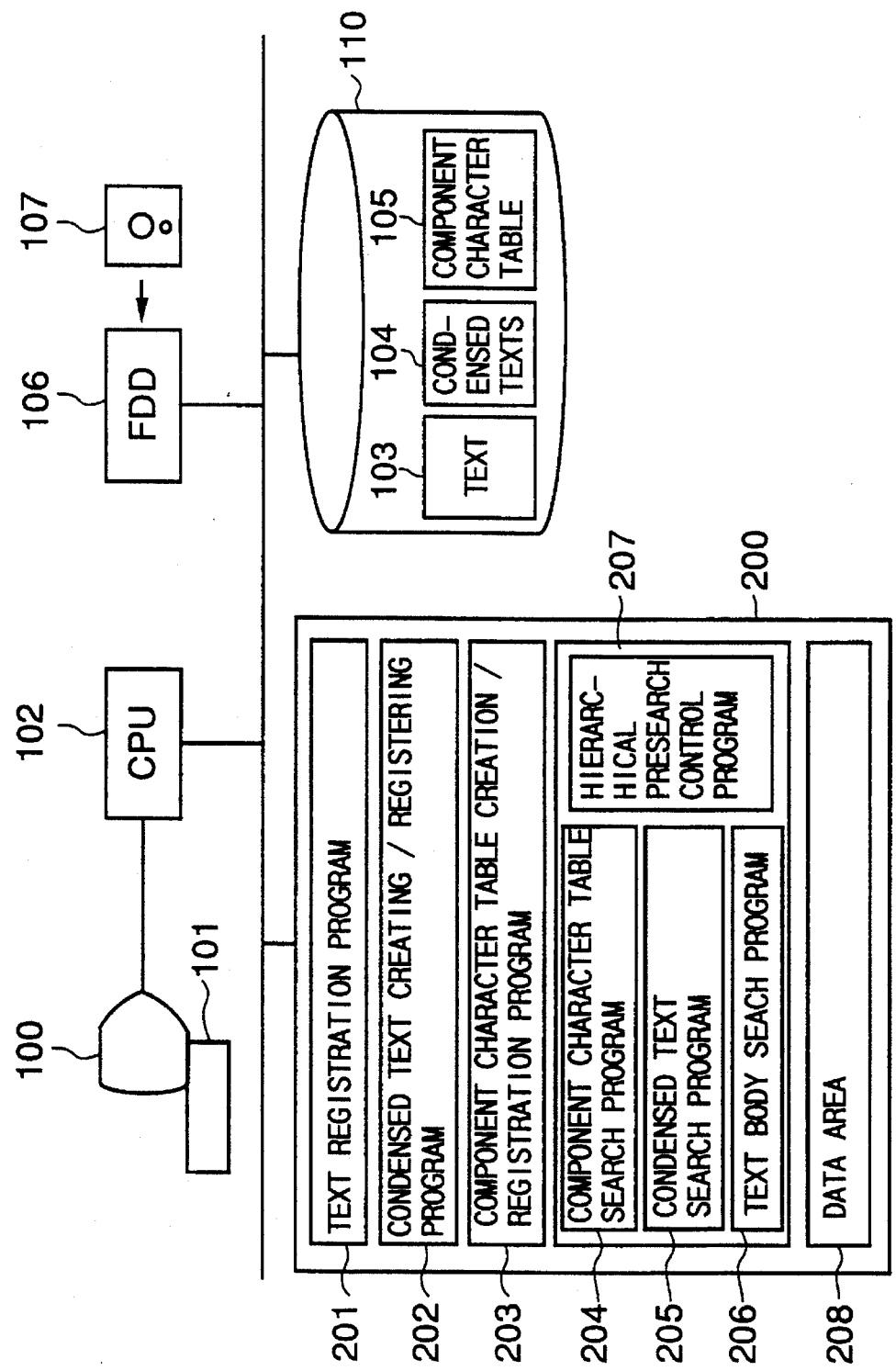
FIG. 1 is a schematic diagram showing a general arrangement of a full document retrieval system according to a first embodiment of the present invention.

Referring to FIG. 1, the first embodiment of the present invention will be described. A document data processing system illustrated in this figure comprises a display unit 100, a keyboard 101, a central processing unit or CPU 102, a storage file unit 110 including a magnetic disk or the like which serves as a storage medium for storing a component character table 105, condensed texts 104 and documents of texts 103, a floppy-disk driver of FDD 106 and a main memory 20. Further, a reference numeral 107 denotes a floppy disk.

There are stored in the main memory 200, a text registration program 201, a condensed text creation/ registration program 202, a component character table creation/registration program 203, a component character table search program 204, a condensed text search program 205, a text body search program 206, and a hierarchical presearch control program 207. Further, a data area 208 is secured on the main memory 200. The programs mentioned above are executed by the CPU 102.

For registration of a document, a corresponding command is inputted through the keyboard 101. In response to the command, the CPU 102 fetches document data from the floppy disk 107 placed in the floppy-disk driver 106 and executes the text registration program 201 to thereby store the fetched document data in the file 110 as a text 103. In this conjunction, it should be mentioned that the present invention is never limited to the inputting of the document data by using the floppy disk. The invention can equally be applied to such an arrangement in which the document data is loaded from other apparatus or system via a communication line or the like circuits. Subsequently, the CPU 102 executes the condensed text creation/registration program 202 to thereby divide or decompose the text 103 into fragmental character strings at a word level and check a mutual inclusion relation possibly existing among the fragmental character strings resulting from the decomposition to thereby eliminate those fragmental character strings which are included or covered by other fragmental character strings, as a result of which there is created a condensed text composed of a set of those fragmental character strings which bear no inclusion relation to one another. The condensed text 104 created or prepared in this manner is stored in the file 110. Finally, the CPU 102 executes the component character table creation/registration program 202 to thereby create the component character table 105 in which characters used in the text 103 are collected without duplication. The component character table 105 thus prepared is then stored in the file 110 as well.

In document or text search operation, a query condition statement (i.e. statement of condition for the search) is inputted via the keyboard 101 and supplied to the CPU 102, which responds thereto by executing first the hierarchical presearch control program 207, which is then followed by sequential executions of the component character table search program 204, the condensed text search program 205 and the text body search program 206 in this order under the control of the hierarchical presearch control program 207.

More specifically, upon execution of the component character table search, a search term (or terms) given by the inputted query condition statement is divided or split to constituent or component characters, whereon only those documents that contain all the characters constituting the search term are extracted. Next, the condensed texts which correspond to the documents extracted through the component character table search are consulted to thereby extract the documents which contain the given search term (or terms). In case the given query condition statement designates only a single search term (i.e. term serving as a keyword for searching or retrieving a document) or only a logical or Boolean relation among a plurality of search terms and unless it designates the positional relation of these search terms in the text, the text or document retrieval processing then comes to an end by outputting the result of the condensed text search as the final result of the document retrieval. In contrast, in the other case where the positional relation(s) or condition(s) among a plurality of search terms in the text is designated by the given query condition statement, the text data or text bodies corresponding to the documents extracted through the condensed text search are checked, whereby only the text which contains the given search terms and which satisfies the query condition concerning the positional relation imposed on the search terms is extracted to be outputted as the result of the retrieval as performed.

The above is an outline of the concept underlying the full text or document retrieval according to the first embodiment of the present invention.

In the following, description will be made generally of registration and search methods in conjunction with the hierarchical search processing which includes presearch steps of the component character table search and the condensed text search for screening and reducing the documents in respect to the number and the text body search according to the first embodiment of the present invention.

At first, it should be recalled that creation of the condensed text and the component character table is automatically effectuated upon registration of a document. A procedure of the processing involved in the creation and registration of the condensed texts and the component character table is illustrated in FIG. 2.

Figure 2:
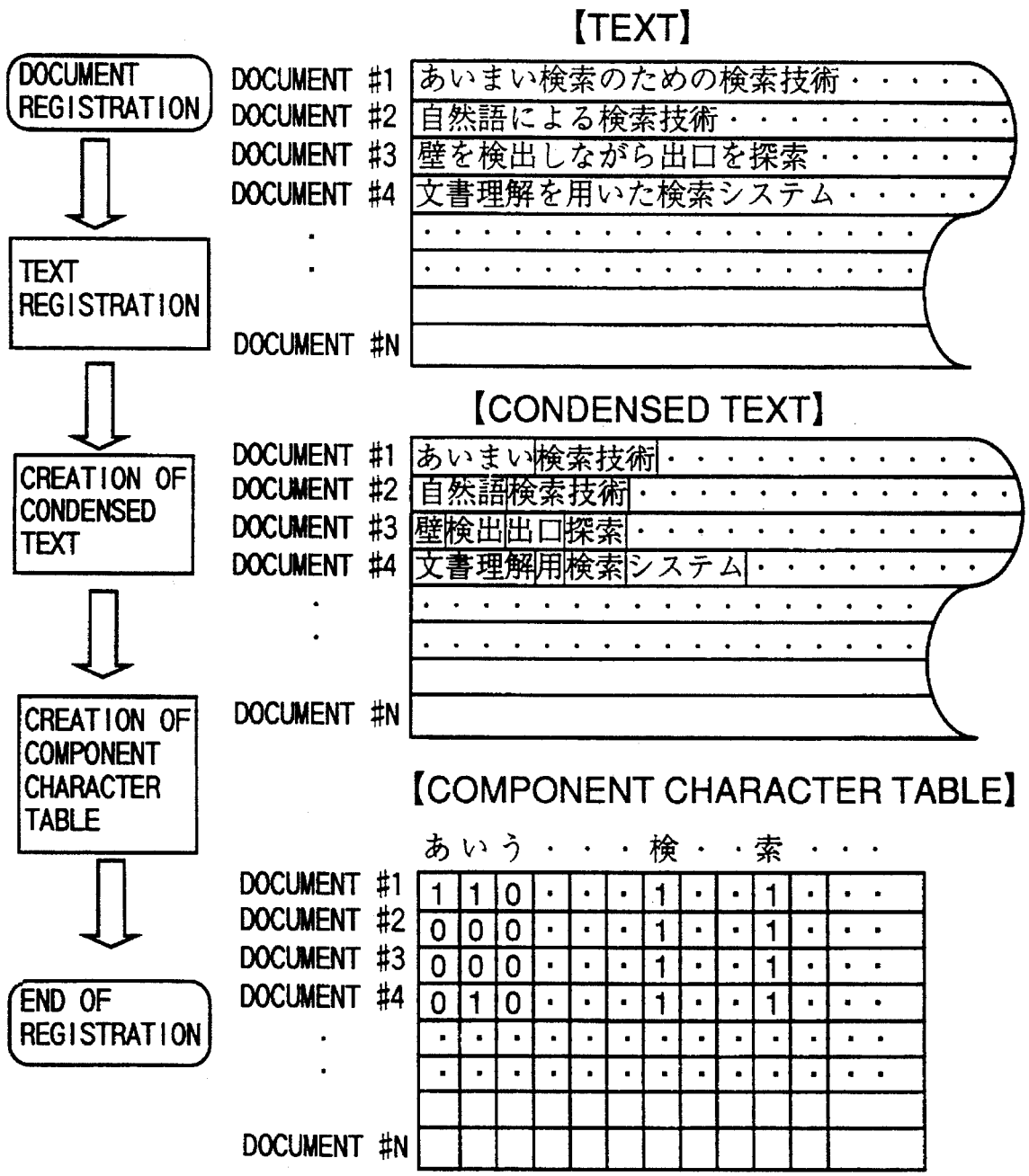
FIG. 2 is a schematic flow chart fop illustrating a registration processing for a hierarchical presearch according to an aspect of the present invention.

Referring to FIG. 2, when a document to be registered is loaded, the document is stored intact as a text. Subsequently, a condensed text is created or generated from this text. The condensed text is then prepared by decomposing the text into character strings on the basis of the character species or types such as Chinese character (kanji), cursive kana character (hiragana), square kana character (katakana), alphabetic character and others, while excluding duplication of any character string making appearance repetitively. Let's assume, by way of example, that a text of concern reads "あいまい検索のための検索技術... (A search technique for a fuzzy search...)", as exemplified by a text #1 shown in FIG. 2. In that case, the word "検索(search)" is discarded as a duplicative word, as a result of which there are left "あいまい(fuzzy)", "検索技術(search technique) and "のための(for)" as the fragmental character strings constituting a condensed text.

Further, a component character table is created from the text. To this end, characters appearing in the text are assigned or allocated with one-bit information. For example, in the case of the abovementioned text #1, bit information of "1" is set for "あ" and "い" (hiragana characters), respectively, since they make appearance in the text 1, while bit "0" is assigned or allocated to "う" which does not occur in the text #1. Likewise, bit "1" is set for "検" and "索" (Chinese characters), respectively. Through similar procedure, those characters of the component character table which are found in the text of concern are assigned with "1s", respectively, while the characters in the component character table which are absent in the text under consideration are affixed with "0s", respectively.

Through the procedure described above, the condensed text and the component character table are automatically created upon registration of a document to thereby make preparation for execution of the hierarchical presearch processing.

The text or document retrieval is carried out by consulting the auxiliary file(s) storing the condensed texts and the component character table in the order reversed relative to that for the registration, as is illustrated in FIG. 3.

More specifically, the component character table search is first carried out, whereby those component characters in the component character table which are assigned with "1s" and which correspond to all the characters appearing in a given search term are selected. In a second step, the condensed text search is effected, whereby the condensed texts containing the characters selected through the component character table search are checked to thereby pick up selectively the documents, if any, which contain the search term given by the query condition statement. Finally, in the text body search, only the text that contains the search term (or terms) which makes appearance in the text at a position (or positions) meeting the given query condition is selected. In the case of the example shown only for the illustrative purpose in FIG. 3, it is assumed that the following query condition statement is given:

"検索[4C] 理解"

The above query condition statement prescribes "search a document containing a text in which terms '検索' and '理解' makes appearance in such proximity relation that both terms are not distanced from each other by more than four characters". As a result of this search processing, there is extracted a document containing a text #4 in which "検索" and "理解" occur at the respective positions which are distanced by four characters from each other.

Description which follows is directed to elucidation in concrete of a method of creating or preparing the condensed texts of character-species-based decomposed/duplication excluded type and a method of creating the component character table of character-code dependent type along with the hierarchical preseaPch control method in which the condensed texts and the component character table of the types mentioned above are made use of.

Figure 4:
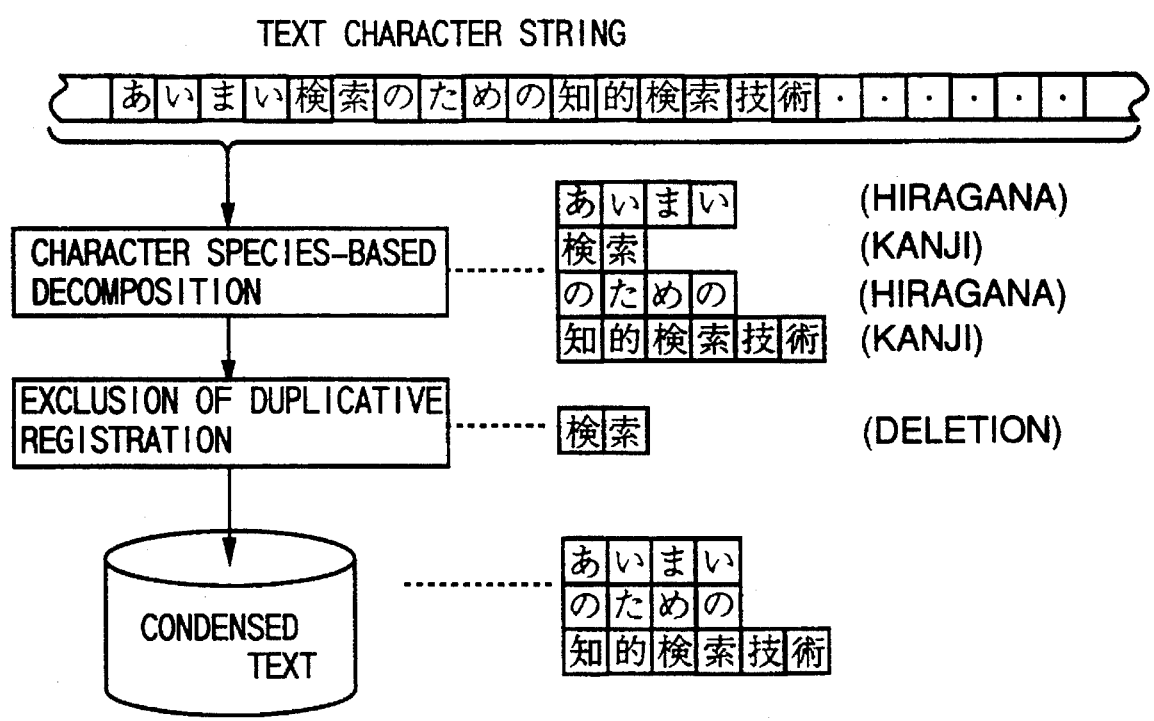
FIG. 4 is a schematic flow chart for illustrating, by way of example, a procedure for creating a condensed text.

In the first place, description will be made of the character-species-based decomposed/duplication excluded type condensed text creation method adopted in the first embodiment of the document data processing system for full document retrieval according to the invention. As is illustrated in FIG. 4, a given text is decomposed into fragmental character strings on the basis of (or in accordance with) character types or species. As the character species, there may be mentioned "kanji (Chinese character)", "hiragana (Japanese cursive kana character)", "katakana (Japanese square kana character)", "alphabetic letter", "numeric character", "symbol" etc.. The text is decomposed into fragmental character strings each consisting of a string of characters of same type, e.g. kanji character string, hiragana character string, katakana character string and so forth. Next, any character string which results from the the decomposition mentioned above and included or covered completely by other character string also resulting from the decomposition of the same text containing the former is eliminated or excluded as a duplicative character string from the set of the fragmental characters constituting the corresponding condensed text. By way of example, let's consider a character string "検索(search)". It will be readily understood that this character string is completely included or covered by other character string "知的索技術(intelligent search technique)" which exists in the same text. Accordingly, the character string "検索" is excluded from the registration. It should however be noted that the character string "検索(search)" can be hit in the condensed text search as a part of the character string "知的索技術(intelligent search technique)", even though the string "検索" is not registered.

The character strings thus determined for registration while excluding duplication in the registration in this way are separated from one another by inserting a separator in each of texts or documents, as is illustrated in FIG. 5. In the case of the example illustrated in FIG. 5, there is employed a symbol "," as the separator. On the other hand, in the case of the examples illustrated in FIGS. 2 and 3, the separator is represented by a symbol "|". In this connecction, it is unnecessary to represent the separator in the form of a character. Any specific code which is not allocated to the character may equally be used as the separator to the same effect.

Next, description will be turned to a method of creating or preparing the character-code dependent type component character table used in the instant embodiment of the invention.

As is illustrated in FIG. 6, the character-code dependent type component character table is utilized for determing the bit position at which "1" is to be set as the information bit indicating the presence of a character as a character code. In the case of the example shown in FIG. 6, it is assumed that the shift JIS code system is adopted only for the illustrative purpose. In this figure, "(XXXX)H" represents characters in the hexadecimal notation. For giving indication that a character string "検索" exists in a text of a document #1, bit "1s" are set at the positions (8C9F)H and (8DFS)H in the bit list for the document #1. For convenience of the description, the bit position corresponding to a character of concern will be referred to as entry identifier or ID number of the component character table. Thus, the entry ID number (identifier) of "検", for example, is given by "(8C9F)H" or "35999" in the decimal notation.

Figure 7:
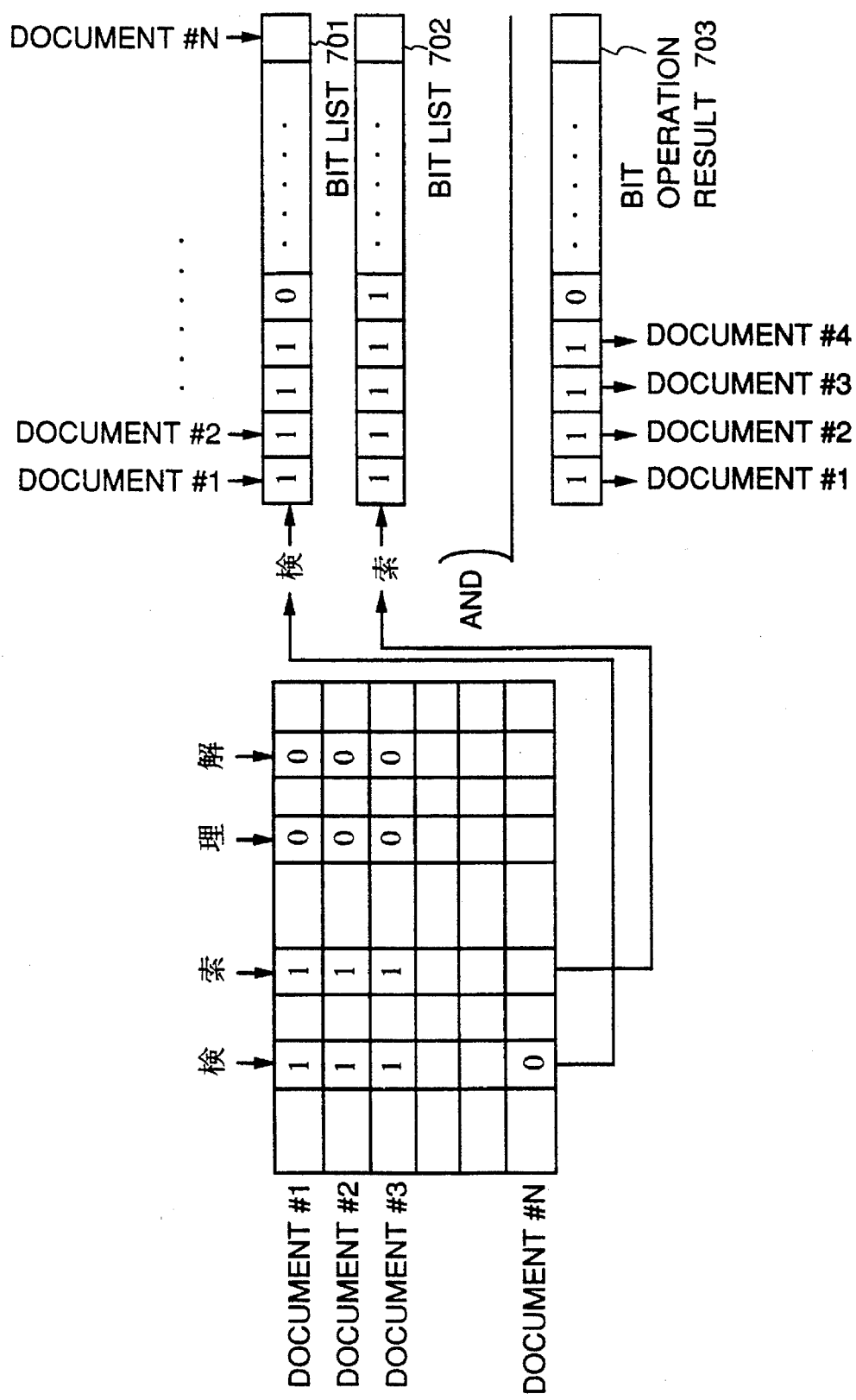
FIG. 7 is a view for illustrating schematically a component character table search procedure.

By resorting to the component character table and the condensed texts described above, the hierarchical presearch control and the document (text) search operation are carried out in the manner which will be described below. At first, the search term designated by the query condition statement is split into individual characters in order to perform the component character table search. Through this component character table search, there are determined documents having the respective bit lists in which "1s" are set at the positions of the entry ID numbers in the list which correspond to the character codes constituting the given search term. By way of example, let's assume that a character string "検索" is given as the search term. In that case, there are retrieved as the result of the component character table search the documents #1, #2, #, #4, . . . , all of which have the respective bit lists in which "1s" are set at the bit positions corresponding to the codes (8C9F)H and (8DF5)H corresponding to "検" and "索", respectively. In more particular, referring to FIG. 7, an AND operation is performed on a bit-by-bit basis between a bit list 701 having the entry ID number of "(8C9F)H" representing the character "検" and a bit list 702 having the entry ID number of "(8DF5)H" representing the character "索" to thereby derive a result of the bit-based AND operation in the form of a bit list 703. In this bit list 703 containing the results of the bit-based AND operation, the document ID numbers corresponding to the bit positions of "1" represent the documents hit in the course of execution of the component character table search. In other words, all the documents (texts) containing "検" and "索" are extracted as the result of the component character table search.

Parenthetically, in the case where the search term consists of only one character such as "湖" (kanji character meaning "lake" in English), the document retrieval is ended by outputting the result of the component character table search.

Next, search processing is performed on the condensed texts of the documents extracted through the component character table search. To this end, the contents of the condensed texts registered on a document-by-document basis as illustrated in FIG. 5 are scanned for thereby extracting the documents, if any, which contains the given search term as a word constituting a part of the document. In other words, in the case of the abovementioned example, only the document containing the two characters "検" and "索" which make appearance in succession are extracted. To say in another way, such documents which contain the characters "検" and "索" and in which these characters occur as parts of mutually different terms such as "検出" and "探索" are discarded. For this purpose, search is performed on a character-by-character basis as in the case of the text body search performed on the condensed texts of every documents retrieved through the component character table search processing. At that time, it is however sufficient to scan only the contents of the condensed texts corresponding to the document ID numbers obtained as the result of the component character table search. By way of example, in case the component character table search results in the retrieval of the document (ID) numbers #1, #2, #3, #4 and so forth, the condensed texts of the document ID numbers #1, #2, #3, #4 and so forth are scanned in the condensed text search processing, and the document(s) containing the search term existing in reality in the corresponding condensed text(s) is outputted as the retrieval result of the condensed text search processing.

As will be appreciated from the above description, in the hierarchical presearch scheme taught by the present invention incarnated in the illustrative embodiment now under discussion, two steps of the presearch, i.e. the component character table search and the condensed text search are previously performed to sieve out the documents at the character level and the word (or phrase) level, respectively, to thereby reduce previously the number of the documents which are to be subjected to the time-consuming body text search to a possible minimum, whereby the volume of the documents to undergo the text body search can be reduced correspondingly, which in turn means equivalently that the full text or document retrieval can be realized at a very high speed.

In more concrete, in the component character table search in which the presence of a character of concern is represented by one-bit information, the data volume to be searched for the retrieval can extremely be reduced with the time taken for the search being correspondingly shortened. Moreover, by logically ANDing the bit lists generated for the characters constituting parts of the search word (keyword), respectively, a relatively large number of the documents which are irrelevant to the search term(s) can be discarded, whereby the number of the documents to be subjected to the subsequent retrieval processing can remarkably be decreased.

Additionally, it is noted that in the condensed text search processing according to the invention, the time taken therefor can also be reduced because of a decreased amount of data as compared with that involved in scanning directly the texts.

Description will now be turned to a second embodiment of the full document retrieval method and system according to the invention. The second embodiment of the invention is also directed to the full document retrieval which allows the hierarchical presearch processings to be efficiently carried out even in the case where a plurality of search terms are designated.

By way of example, let's assume that a query condition statement prescribing "'検索' AND '理解'" is given. In that case, the component character table is searched as the first processing step. In this step, all the documents containing all the characters constituting parts of the given search terms are searched, which is then followed by searching the document to be outputted which satisfies the relation imposed on the search terms. For the query condition statement reading, for example, "'検索' AND '理解'", the documents containing two characters "検" and "索" as well as two characters "理" and "解" are searched. Namely, search is performed to find out the documents which satisfy the condition given below:

"('検' AND '索') AND ('理' AND '解')"
To state in another way,

"'検' AND '索' and '理' AND '解'"
In other words, the documents containing concurrently the four characters mentioned above are searched.

Next, search is performed on the filtered condensed texts corresponding to the documents which have been found out as the result of the component character table search. In the condensed text search, only the documents in which the designated keywords make appearance as the semantically meaningful words (or phrases) are extracted. Namely, the document containing simultaneously both words or phrases (meaningful character strings) "検索" and "理解" are searched.

When the relation between the search terms is represented by the Boolean relation such as "AND", "OR" or the like and unless any other conditions prescribing the positional relation between the search terms (keywords) are given, the retrieval processing comes to an end, whereon the result of the condensed text search is outputted as the final result of the document retrieval processing. On the other hand, when any positional condition is designated, search is performed on the texts extracted through the condensed text search to thereby mark the text which satisfies the designated condition and output it as the final result of the document retrieval processing.

The retrieval or search operation of the full document retrieval system according to the instant (second) embodiment of the present invention will now be understood from the foregoing description. By performing the component character table search and the ANDing operation on the the search terms in the component character table search, the hierarchical presearch can efficiently be performed to thereby realize a high-speed full text retrieval even when a plurality of search terms are given.

Figure 8:
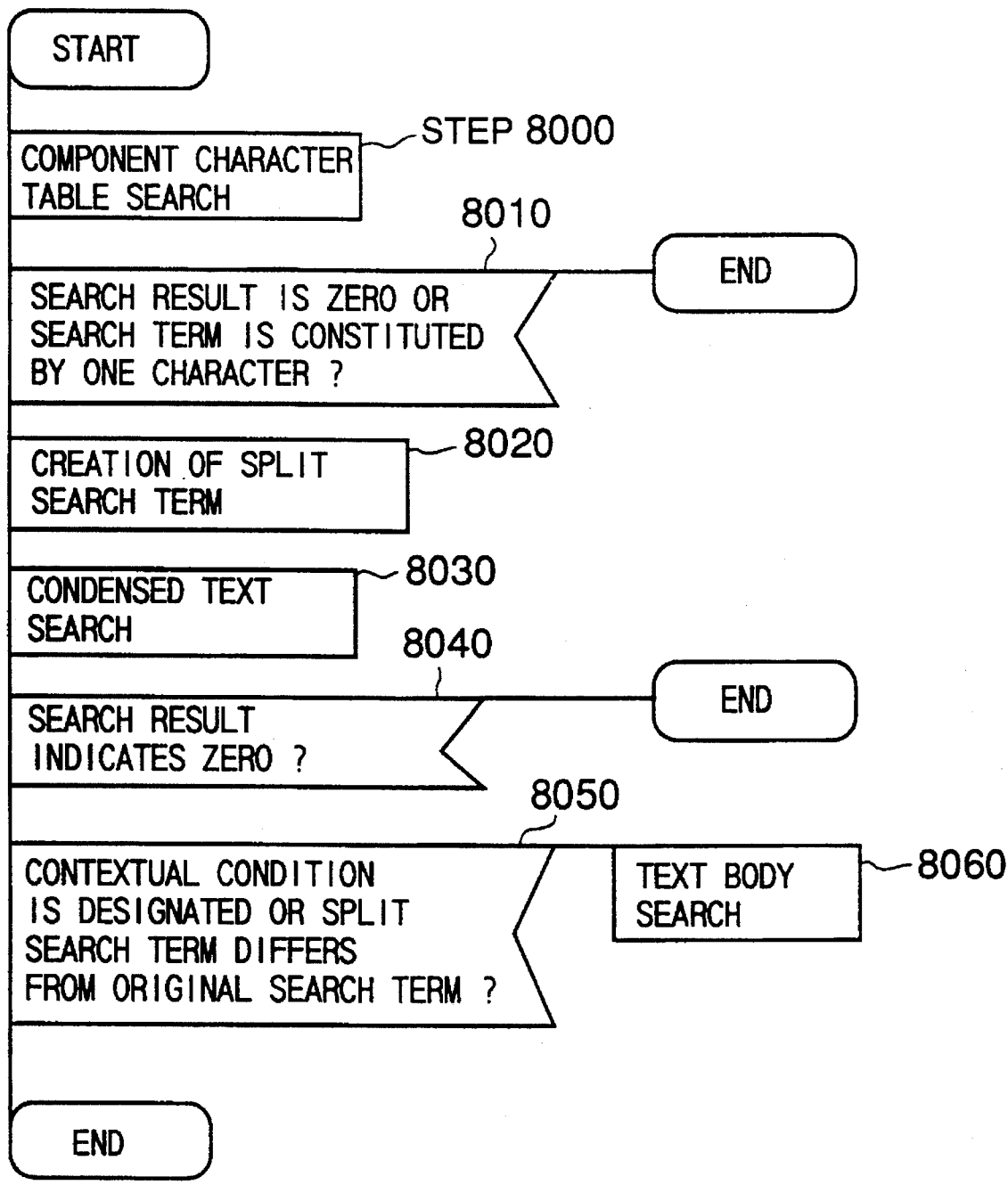
FIG. 8 is a PAD diagram showing a processing procedure involved in the hierarchical presearch.

Next, description will be made of a third embodiment of the present invention for elucidating the search control in the hierarchical presearch in general terms. FIG. 8 is a PAD diagram (Problem Analysis Diagram) for illustrating the control involved in the hierarchical presearch procedure. It is again assumed that a query condition statement reading as follows is given:

"'計算機' OR '知的インタフェースの検'"
The above statement commands that a document containing either "計算機(computer)" or "知的インタフェースの検(intelligent interface" is to be searched and retrieved.

Figure 9:
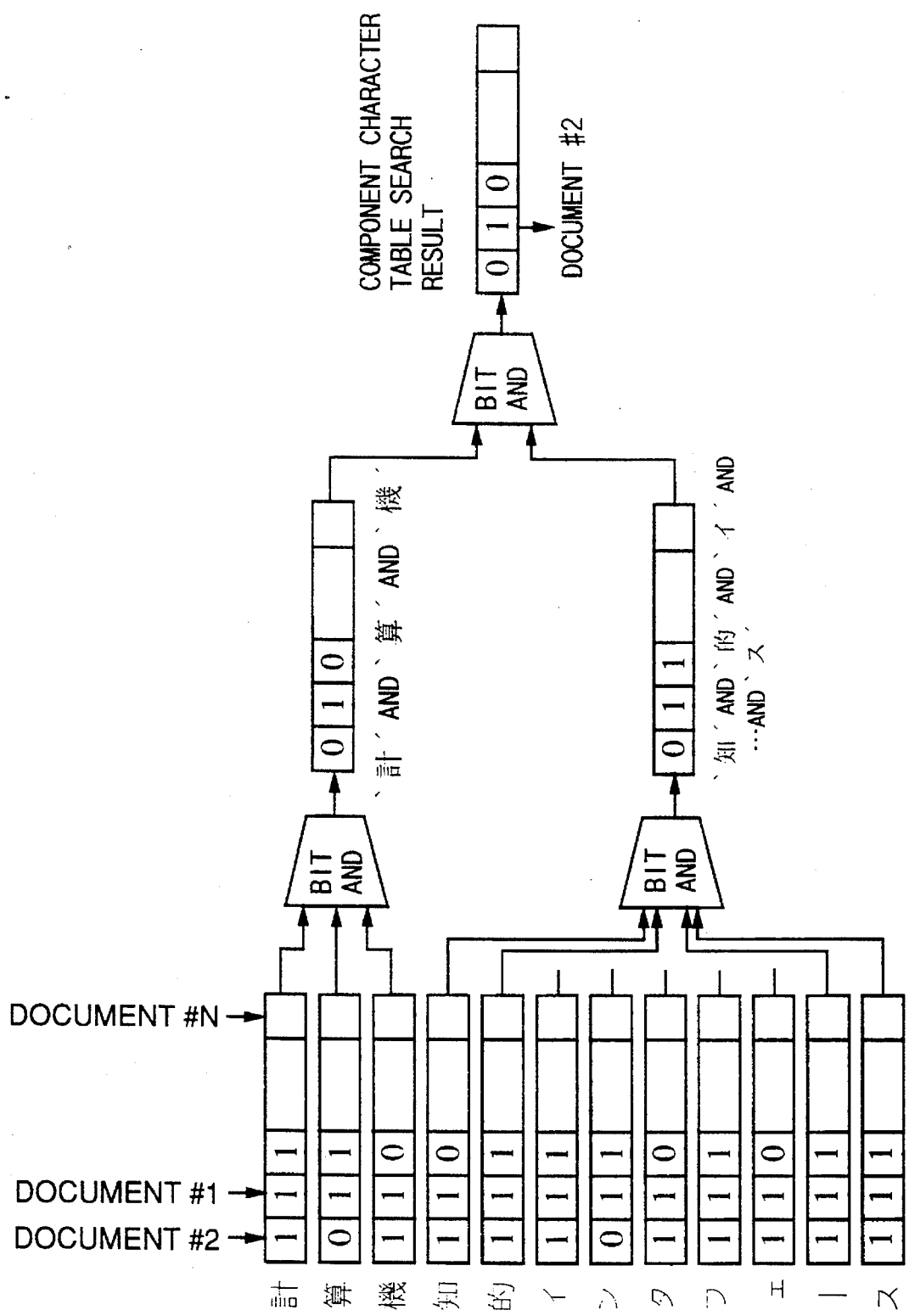
FIG. 9 is a diagram for illustrating a component character table search processing according to a third embodiment of the invention.

At first, in a step 8000, the component character table search is performed. In this step, the documents which contain all the characters of the search terms are searched for each of the search terms as designated, which is then followed by the step of outputting the documents which can satisfy the compound condition imposed on the search terms. In the case of the example now under consideration, for each of three characters constituting a search term "計算機", the bit-based AND operation performed between the relevant entry ID numbers in the component character table, as is illustrated in FIG. 9. Subsequently, the bit-based AND operation is similarly performed between the relevant entry ID numbers in the component character table for each of the nine characters constituting "知的インタフェースの検". Finally, the result of the bit-based AND operation for "計算機" and that for "知的インタフェースの検" are logically ORed. To say in another way, the following search condition command is executed.

"('計' AND '算' AND '機') OR ('知' AND '的' AND 'イ' AND 'ン' AND 'タ' AND 'フ' AND 'エ' AND 'の' AND 'ス')"

As a result of this, there is extracted all the documents, if any, which contain all the three characters constituting "計算機" or all the nine characters constituting "知的ンタフェースの検".

In case the number of the document extracted through the component character table search mentioned above is zero, the search result indicating zero document (i.e. none of the documents) is outputted as the ultimate result of the document retrieval, as is shown in FIG. 8, whereupon the document retrieval processing comes to an end. Further, when the search term consists of only one character as in the case of "胡", the retrieval processing is ended by outputting the result of the component character table search (step 8010 in FIG. 8).

When the search term is constituted by a plurality of characters and unless the result of the component character table search results in zero text, then the condensed text search is carried out in succession. The registered contents of the condensed text are composed of character strings resulting from the character-species-based decomposition as described hereinbefore. For the search term constituted by characters of different types or species such as exemplified by "知的ンタフェースの検(kanji plus katakana characters)" the term is decomposed into fragmental character strings in the condensed text such as "知的, インタフェース" separated by the separator mark ",". Consequently, simple searching of a condensed text containing the heterogeneous search term such as "知的ンタフェースの検" will result in absence of the corresponding character string. Under the circumstances, the search term is checked before executing the condensed text search, to thereby decompose any search term consisting of different character species into character substrings each of the same or homogeneous character species. For convenience of the description, the search term undergone the decomposition based on the character species in this manner will be referred to as the split search term to distinguish the latter from the source search term in which the split search term origins. The condensed text search is then effected by using the split search terms "知的(intelligent)" and "インタフェース(interface)" in addition to "計算機(computer)" in the case of the aforementioned example. It should however be noted that the split search terms which originate in a same source search term are logically ANDed in the execution of the condensed text search. In the case of the query condition statement reading, for example,

"計算機" OR "知的ンタフェあの検"

the condensed text search is performed on the following condition:

計算機) OR ("知的" AND "インタフェース")

The above condition commands that a document in which "知的" and "インタフェース" exist concurrently or a document in which "計算機" exists be searched.

When the result of the condensed text search is zero (no text), the search result of "zero" or "no document" is outputted, whereupon the condensed text search comes to an end. At this time, the text body search is performed only when a proximity condition or a contextual condition is designated or when a search term to be split such as "知的ンタフェあの検" is given (i.e. when the search term differs from the split search terms), Otherwise, the hierarchical presearch processing is completed by outputting the result of the condensed text search. At this juncture, the contextual condition (or simply the context) is such as given by the following condition statement;

"計算機" [S] "知的ンタフェあの検"

which commands that a document in which "計算機" and "知的ンタフェあの検" coexist in one and the same sentence be searched. Further, the proximity condition is, for example, such as described as follows:

"計算機" [10C] "知的ンタフェあの検"

This proximity condition statement commands that a document in which "計算機" and "知的ンタフェあの検" makes appearance in such proximity that both terms are distanced by no more than ten characters be searched.

In other words, the contextual condition and the proximity condition represent the query conditions designating the positional relations between the search terms appearing in a document.

When the query condition indicating the positional relation between the search terms appearing in a text is given or when a heterogeneous search term consisting of substrings of heterogeneous or different character species punctuated by the separator in the condensed text is presented, the text data corresponding to the result of the condensed text search is referred to, to thereby output as the result of retrieval only the document in which the search terms exist in the text in conformance with the given condition, whereupon the document retrieval processing comes to an end.

As can be understood from the above description, the hierarchical presearch can efficiently be carried out to thereby allow a high-speed full text retrieval to be realized even when the search term is composed of substrings of heterogeneous character species or even in the case where the condition concerning the positions or locations at which the search terms are to make appearance in the text is designated.

A fourth embodiment of the present invention will now be described. With this embodiment, it is intended to reduce the capacity of the component character table used in the full document retrieval system according to the first embodiment of the invention. MoPe specifically, although the character-code dependent type component character table can afford a simplified and facilitated processing, there is a problem that the component character table is necessarily of a large size because the bit list for each document is long. Besides, since the entry ID number is allocated nevertheless of absence of a relevant character code, the component character table has not a few useless areas or locations, giving rise to another problem. In the case of the shift JIS, for example, there exist no character codes relevant to the entry ID numbers between (0000)H and (8140)H and between (A000)H and (E040)H, i.e. in the ranges from the zeroth to 33087-th entry ID numbers and from the 40960-th to 57408-th entry ID numbers, respectively. Notwithstanding of this, the component character table must have these locations as the entries because the entry ID numbers are determined by the character codes.

With a view to eliminating the useless areas in the bit list, it is proposed according to the teaching of the invention incarnated in the fourth embodiment that a character code transformation type component character table is created such that the bit positions or locations starting from the zeroth bit position can be used without involving any gap or space between the bit positions by resorting to a character code transformation technique, as will become apparent from the detailed description which follows.

Figure 10:
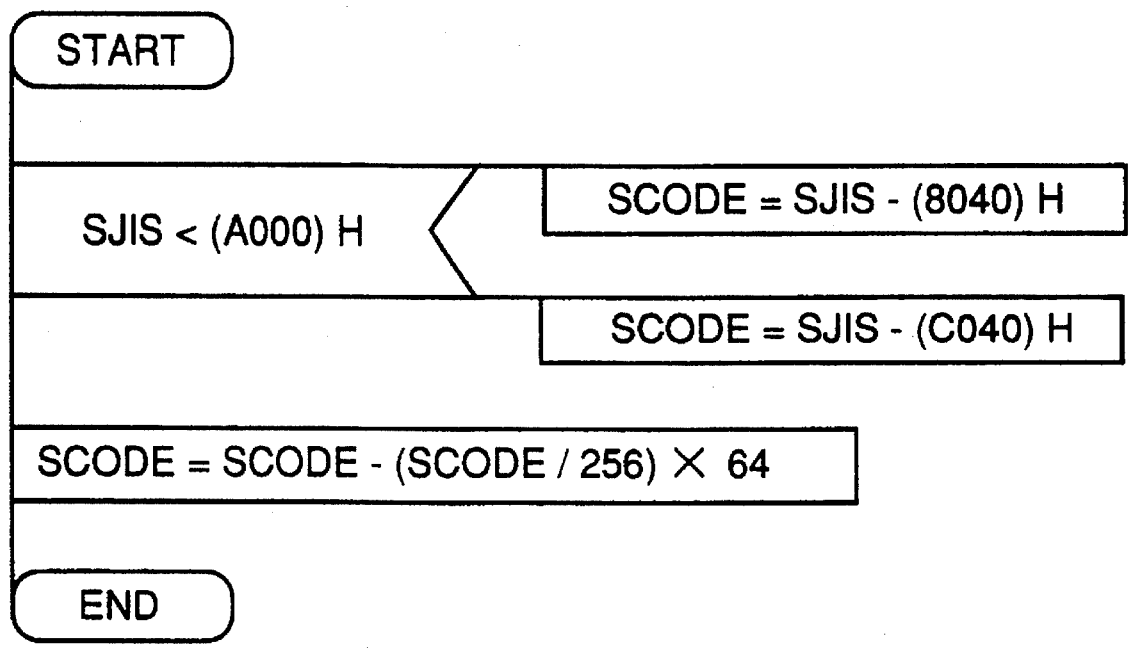
FIG. 10 is a PAD diagram for illustrating a processing involved in code translation of a component character table used in the full document retrieval system according to a third embodiment of the invention.

As an example of the character code transformation expression for creating the character code transformation type component character table, there may be mentioned the following one. (A corresponding PAD diagram is shown in FIG. 10.)

if SJIS<(A000)H
then
SCODE=SJIS=(8040)
else
SCODE=SJIS−(C040)H
SCODE=SCODE−(SCODE/256)×64 . . . (4-1) In the above expression, (8040)H is used instead of (8140)H for affording more or less margin in view of the fact that the character codes of smaller values are usually used frequently as the control codes. Further, the fraction succeeding to the decimal point of the result of operation "(SCODE/256)" is discarded, whereon the result thus rounded is multiplied with "64".

Figure 11:
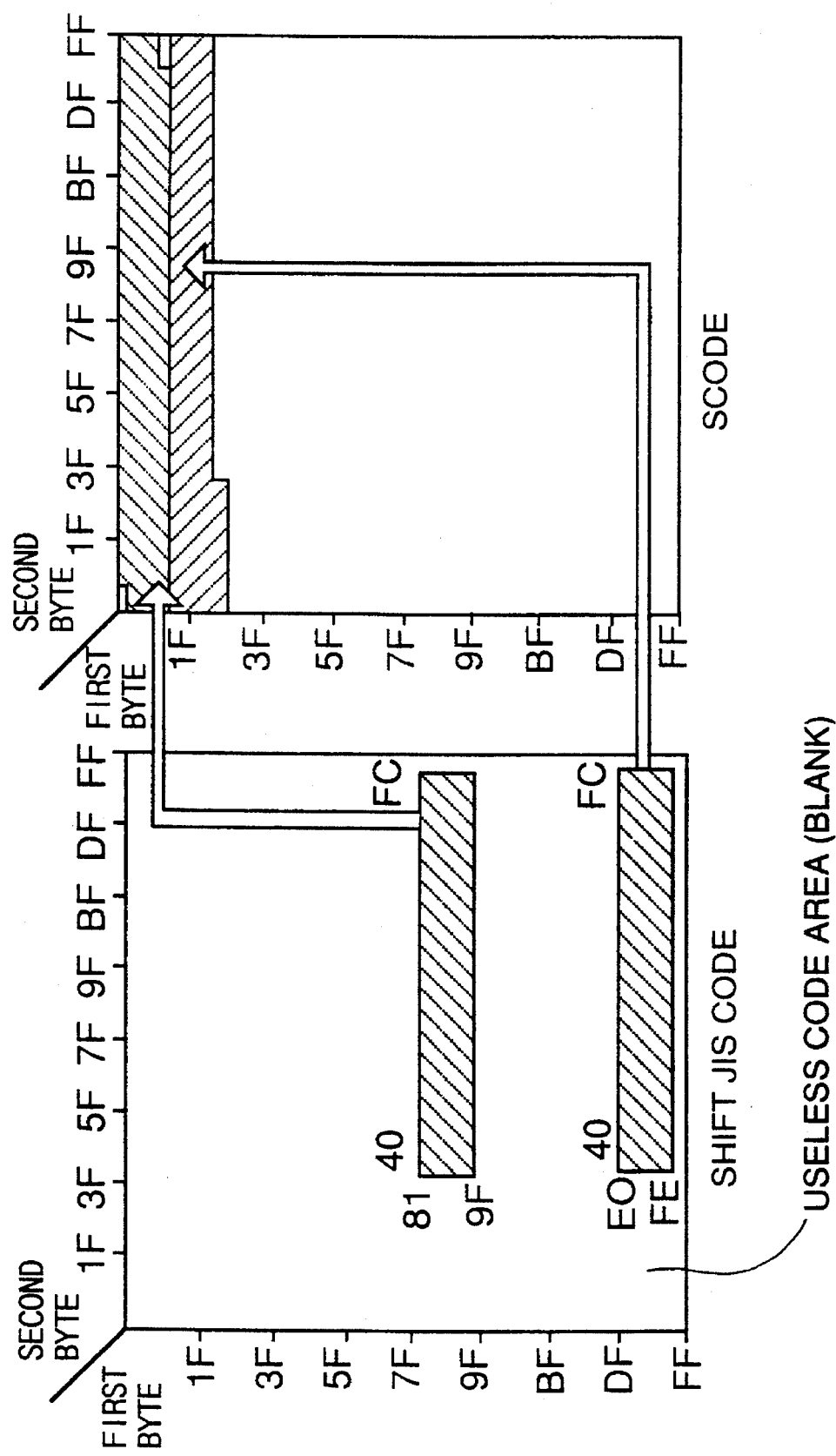
FIG. 11 is a diagram for illustrating a code transformation of the component character table adopted in the full document retrieval system according to a fourth embodiment of the invention.

In the above expression, "SJIS" indicates original JIS code with "SCODE" indicating a character code obtained after the transformation. In this conjunction, it should also be mentioned that KEIS code system or other code system for which correspondence is established with the shift JIS code can equally be transformed to the SCODE in accordance with an expression similar to the abovementioned one (4-1). FIG. 11 shows the transformation in accordance with the expression (4-1) in the form of a character code table. As will be seen also from FIG. 11, the character codes lying between (000)H and (FFFF)H being distributed as (8140)H to (9FFC)H and (E040)H to (FFFC)H are so transformed as to be disposed without any intervening space, starting from the character code (000)H.

By virtue of the code transformation in accordance with the expression (4-1), the length of the bit list can remarkably be shortened, as will be seen in FIG. 12, which in turn means that the capacity of the whole component character table can correspondingly be reduced.

The control for the hierarchical presearch is identical with that described hereinbefore in conjunction with the first embodiment of the invention. Namely, the control procedure illustrated in FIG. 8 can be employed without any modification to carry out first the component character table search by using the characters constituting the search term, which is then followed by the condensed text search by using the search term(s). Unless the contextual condition is given, the result of the condensed text search is outputted as the result of the retrieval, whereupon the document retrieval processing is completed. On the other hand, when the contextual condition is designated, the text body search is performed as the third search processing step, whereon the result of the text body search is outputted as the document retrieval result. It should however be noted that in carrying out the component character table search, any search term as used has to undergo previously the character code transformation in accordance with the expression (4-1).

The teaching of the present invention directed to the use of the character code transformation type component character table fop the purpose of reducing the capacity thereof will be understood from the above description made on the fourth embodiment of the invention. Namely, according to the fourth embodiment of the invention, the component character table is created by arraying the character codes undergone the code transformation at the bit positions starting from the zePoth bit position without any intervening space, whereby the entries to which no character codes are allocated can be eliminated from the character component table, providing an advantage that the component character table can be prepared with a remarkably reduced capacity.

Now, description will be made of a fifth embodiment of the invention with which it is intended to further reduce the capacity of the component character table prepared according to the fourth embodiment by resorting to a hashing technique.

In order to decrease the capacity of the component character table created according to the fourth embodiment, it is contemplated with the fifth embodiment of the invention to allocate a plurality of characters to a single entry ID number in the bit list. More specifically, there is adopted a method for establishing correspondences between the characters constituting the search term and the bit positions in the bit list by using a hash function. The hash function to this end may be expressed as follows.

$$h(SCODE) = mod(SCODE, N) \quad \ldots \quad (5\text{-}1)$$

where "SCODE" represents a character code resulting from the transformation in accordance with the expression (4-1) mentioned hereinbefore, "mod" represents a function used for outputting a residue resulting from division of a first argument by a second argument, and "N" represents a given integer value. Assuming, for example, that "512" is used as the value of N, "あ" assumes the entry ID number of "480" with "ま" assuming the entry ID number of "118".

Figure 13:
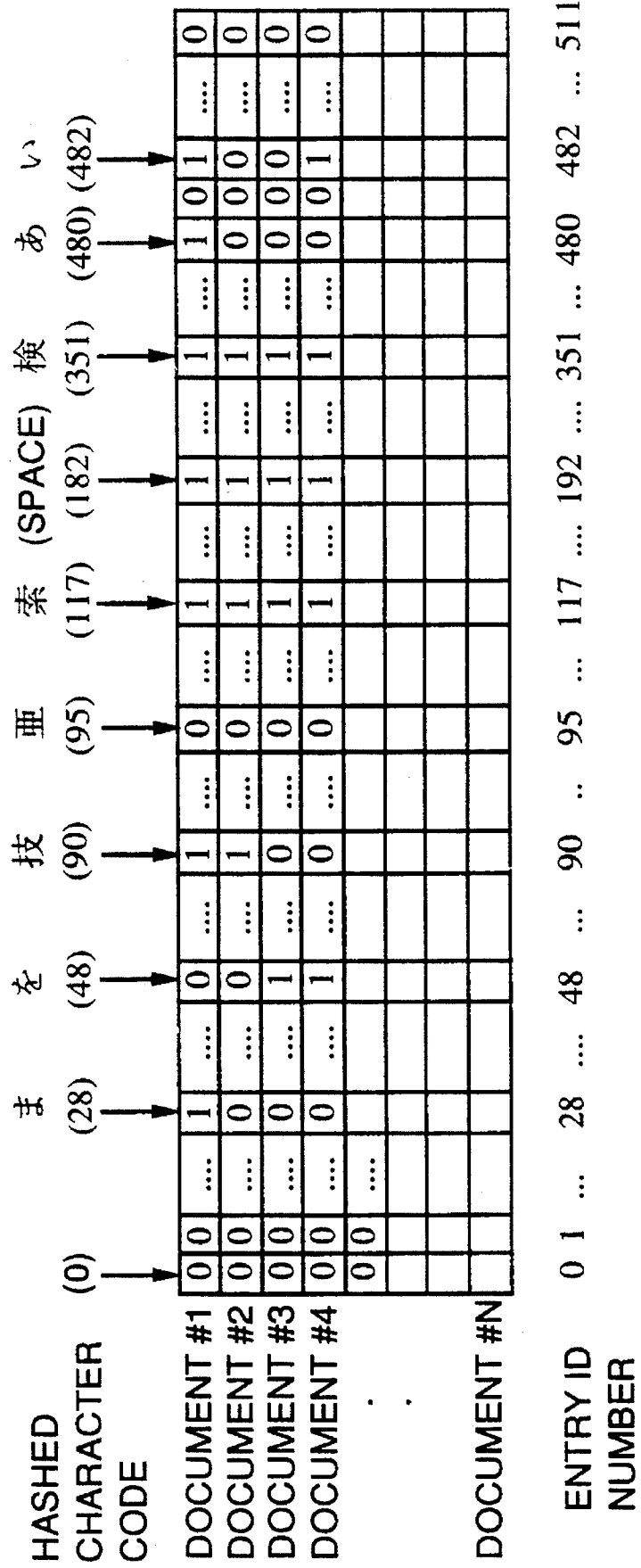
FIG. 13 is a view for illustrating schematically a structure of the component character table employed in a fifth embodiment of the invention.

An example of the component character table created in this manner is illustrated in FIG. 13. In the case of this example, N is set to be "512". It will be understood that no more than 512 bits are required for registration of one document. Upon retrieval, the entry ID numbers are determined for every character of a given search term by using the hash function represented by the expression (5-1) and then reference is made to the corresponding bit positions in the component character table (FIG. 13). In the case of a character string of "あいまい", for example, a document for which all the bits at the positions indicated by the entry ID numbers "480", "482" and "128" in FIG. 13 are "1s", respectively, is outputted as the result of the component character search. Subsequently, the 1B condensed text search is performed for the document sought through the component character table search procedure.

Figure 14:
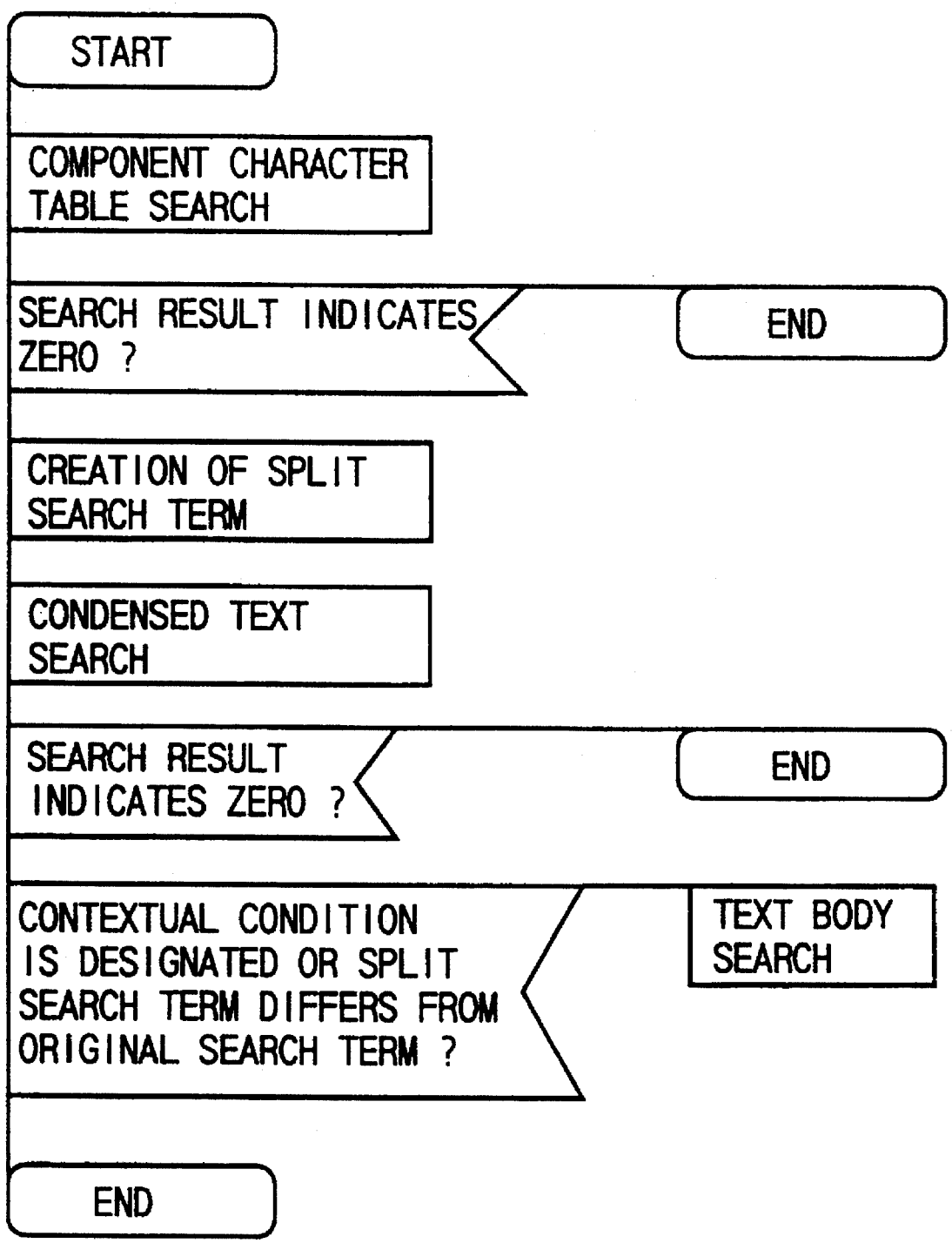
FIG. 14 is a PAD diagram for illustrating a processing procedure of the hierarchical presearch adopted in the fifth embodiment of the invention.

Next, referring to FIG. 14, control procedures for the condensed text search and the text body search will be described. In the case of the first embodiment of the invention, when the search term consists of one character, the hierarchical presearch is completed after the component character table search by outputting the search result thereof as the document retrieval result. In contrast, in the case of the fifth embodiment of the invention now under consideration, it is necessary to carry out consecutively the hierarchical presearch up to the condensed text search inclusive, because of possibility of generation of search noise in the component character table search performed on the component character table prepared according to the fifth embodiment. By way of example, a hiragana "は" which is represented by "(82CD)H" in terms of the shift JIS code is allocated with the entry ID number "13" in accordance with the expression (5-1). In this conjunction, it is noted that a kanji "艦" which is represented by a shift JIS code "(8ACD)H" is also allocated with the same entry ID number "13". This means that when a kanji character "艦" is designated as a search term, those documents which contain hiragana "は" will all be outputted as the result of the component character table search. This is the so-called search noise. Such being the circumstances, it becomes necessary to scan the condensed texts for thereby extracting the document containing actually the kanji "艦" and outputting the document as the search result of the hierarchical presearch processing.

As will be appreciated from the above, according to the teaching of the invention incarnated in the fifth embodiment, it is possible to reduce more significantly the capacity of the component character table by virtue of such arrangement that a plurality of characters are assigned or allocated to one entry of the component character table by using the hash function.

Next, a sixth embodiment of the present invention will be described.

In the case of such simple hashing as described above in conjunction with the fifth embodiment, both the character which is likely to make frequent appearance in a document such as the hiragana characters and the character which is unlikely to appear in the document such as the kanji characters belonging to the JIS Kanji character set of second level may possibly be allocated with a same entry number. By way of example, a hiragana character "は" and a kanji character "艦" are allocated with a same entry number "13", as described previously. Accordingly, when the term "艦" is given as the search term, all the documents containing the hiragana character "は" will equally be hit in the course of the component character table search. In practice, substantially all the documents will be hit in the component character table search since the hiragana character "は" is one of those which are used most frequently in the documents written in Japanese. As a consequence, the ratio of screening or filtering the documents in the component character table search will be lowered, which in turn means that the amount of the documents to be scanned in the condensed text search processing is correspondingly increased, giving rise to a problem that the time taken for the whole retrieval processing increases.

Figure 15:
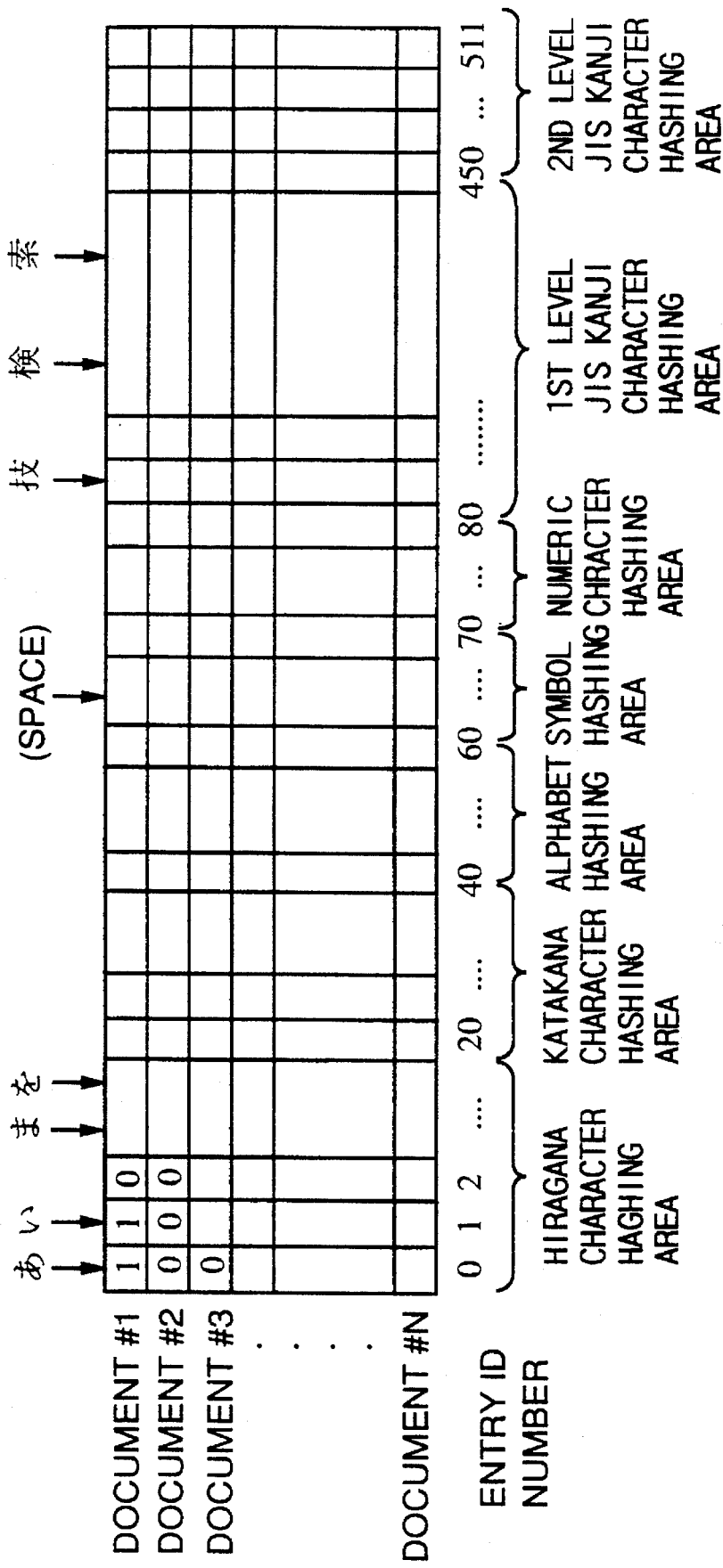
FIG. 15 is a view for illustrating schematically a general structure of the component character table employed according to a sixth embodiment of the invention.
Figure 16:
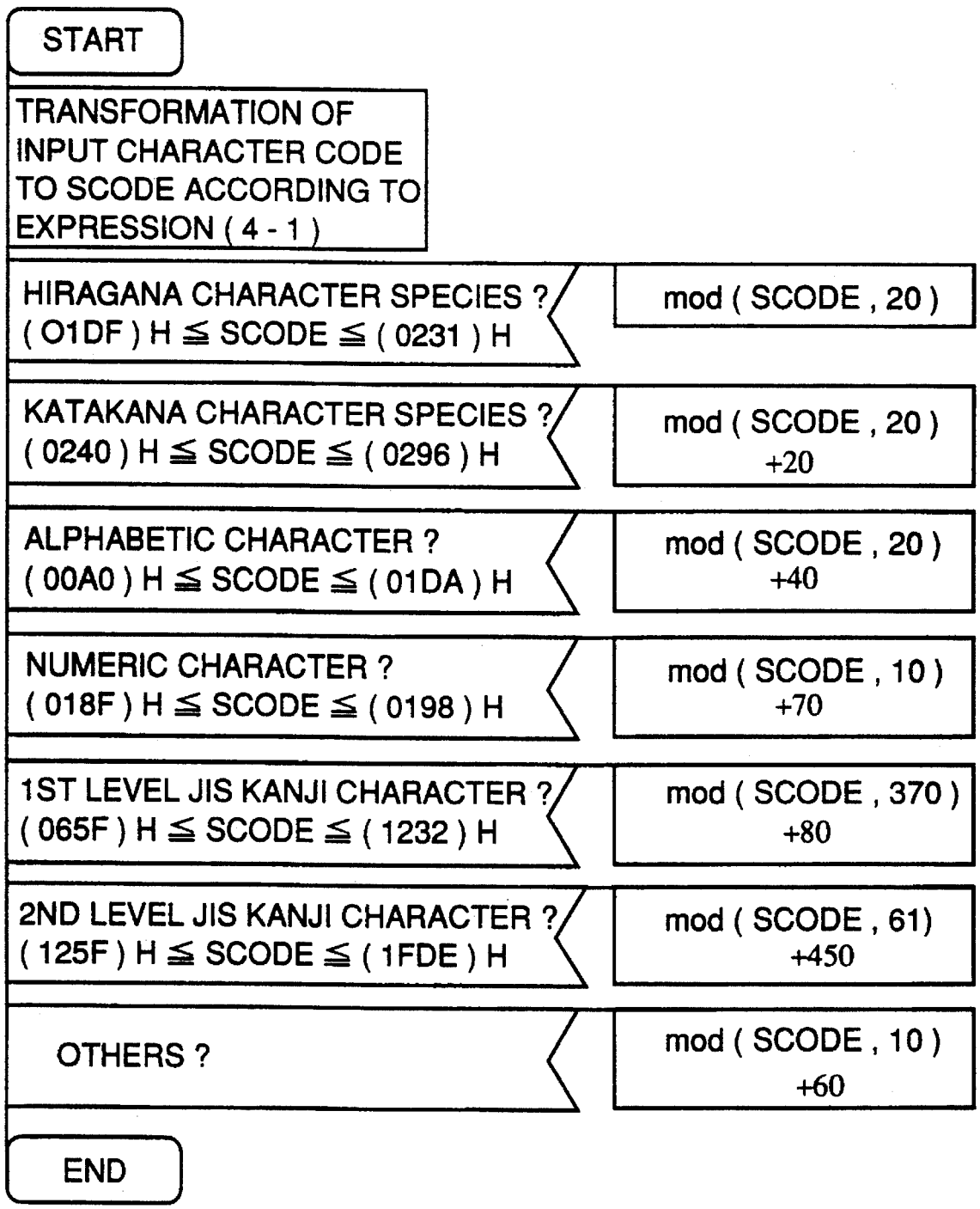
FIG. 16 is a PAD diagram fop illustrating a processing procedure of the hierarchical presearch employed according to a sixth embodiment of the invention.

In order to prevent the document screening ratio from being lowered in the component character table search, it is necessary to define the hash function by taking into consideration the frequencies at which characters are used. In the following description directed to the sixth embodiment of the invention, the component character table as used will be referred to as the character-species-based hashing type component character table for distinguishing it from those used in the first to fifth embodiments of the invention. For creating the character-species-based hashing type component character table, entry areas of a component character table are allocated to the individual character species or types, respectively, whereon such a hash function is prepared which folds at a character code within the allocated relevant entry area, as is illustrated in FIG. 15. This type of hash function may be realized by determining the character species on the basis of the character code and then folding up by the "mod" function or alternatively by preparing a correspondence table indicating correspondences between the character codes and the entry ID numbers. FIG. 16 is a PAD diagram for illustrating a character table search procedure by using this type hash function on the assumption that the numbers of entries (or entry number for short) of hiraganas, katakanas and alphabetic characters are "20", respectively, the entry number of symbol character is "10", the entry number of the numeric characters is "10", the entry number of the kanji character belonging to the JIS Kanji of character set first level is "370" and that the entry number of kanji characters belonging to the JIS Kanji character set of second level is "61". Referring to FIG. 16, for an inputted search term, the species or types of the characters constituting the search term are identified on the basis of the character codes and the entry areas of the component character table allocated to the character species, respectively, are folded up by using the "mod" function defined hereinbefore.

More specifically, when a SCODE is in a range of (1DF)H to (0231)H, this means a character string of hiraganas. Accordingly, a value obtained by mod (SCODE, 20) is determined as the entry ID number.

When the SCODE falls within a range of (0240)H to (0296)H, it represents a katakana character string. Accordingly, a value obtained by adding the results of mod (SCODE, 20) with "20" entered at the start of the katakana hashing area is determined as the entry ID number.

When the SCODE is within a range of (01A0)H to (01DA)H, it represents an alphabetic character string. Accordingly, a value obtained by adding the value of mod (SCODE, 20) with "40" entered at the start of the alphabetic character hashing area is determined to be the entry ID number.

When the SCODE is in a range of (018F)H to (0198)H, it represents a numeric character string. Accordingly, a value obtained by adding the value of mod (SCODE, 10) with "70" entered at the start of the numerical character hashing area is determined to be the entry ID number.

When the SCODE lies within a range of (065F)H to (1232)H, it represents a kanji character string belonging to the JIS Kanji character set of first level. Accordingly, the value of mod (SCODE, 30) is added with "80" entered at the start of the hashing area allocated to the first level JIS Kanji character set and the resulting value is determined as the entry ID number.

When a SCODE is in a range of (125F)H to (1FDE)H, it represents a kanji character string belonging to the second level JIS Kanji character set. Accordingly, the value of mod (SCODE, 61) is added with "450" entered at the start of the hashing area allocated to the second level JIS Kanji set and the resulting value is determined as the entry ID number.

The other SCODE is regarded as representing a character string of symbols. Accordingly, the value of mod (SCODE, 10) is added with "60" entered at the start of the hashing area allocated to the symbols, and the resulting value is determined to be the entry ID numbers.

The hierarchical presearch control procedure performed with the aid of the character-species-based hashing type component character table is identical with the control procedure described hereinbefore in conjunction with the fifth embodiment. Namely, the component character table search is first conducted by using the characters contained in the search term and then the condensed text table search is performed by using the search term. Unless the contextual condition and others are designated, the retrieval is completed at the end of the condensed text search. Otherwise, the text body search is performed, the B result of which is outputted as the document retrieval result.

As will be appreciated from the above description, the sixth embodiment of the invention allows the generation of search noise in the scanning of the documents in the condensed text table to be considerably reduced, to thereby speed up correspondingly the full text retrieval operation as a whole owing to the use of the character-species-based hashing type component character table in which corPespondences between the entry ID numbers and the character are established in dependence on the character species, respectively, while taking into account the frequencies at which the characters are used.

A seventh embodiment of the present invention will be described in conjunction with a hierarchical presearch control method which is carried out by using a frequency-information-based hashing type component character table and which is capable of enhancing the document screening ratio in the component character table search and hence reducing the load of scanning the condensed texts.

Figure 17:
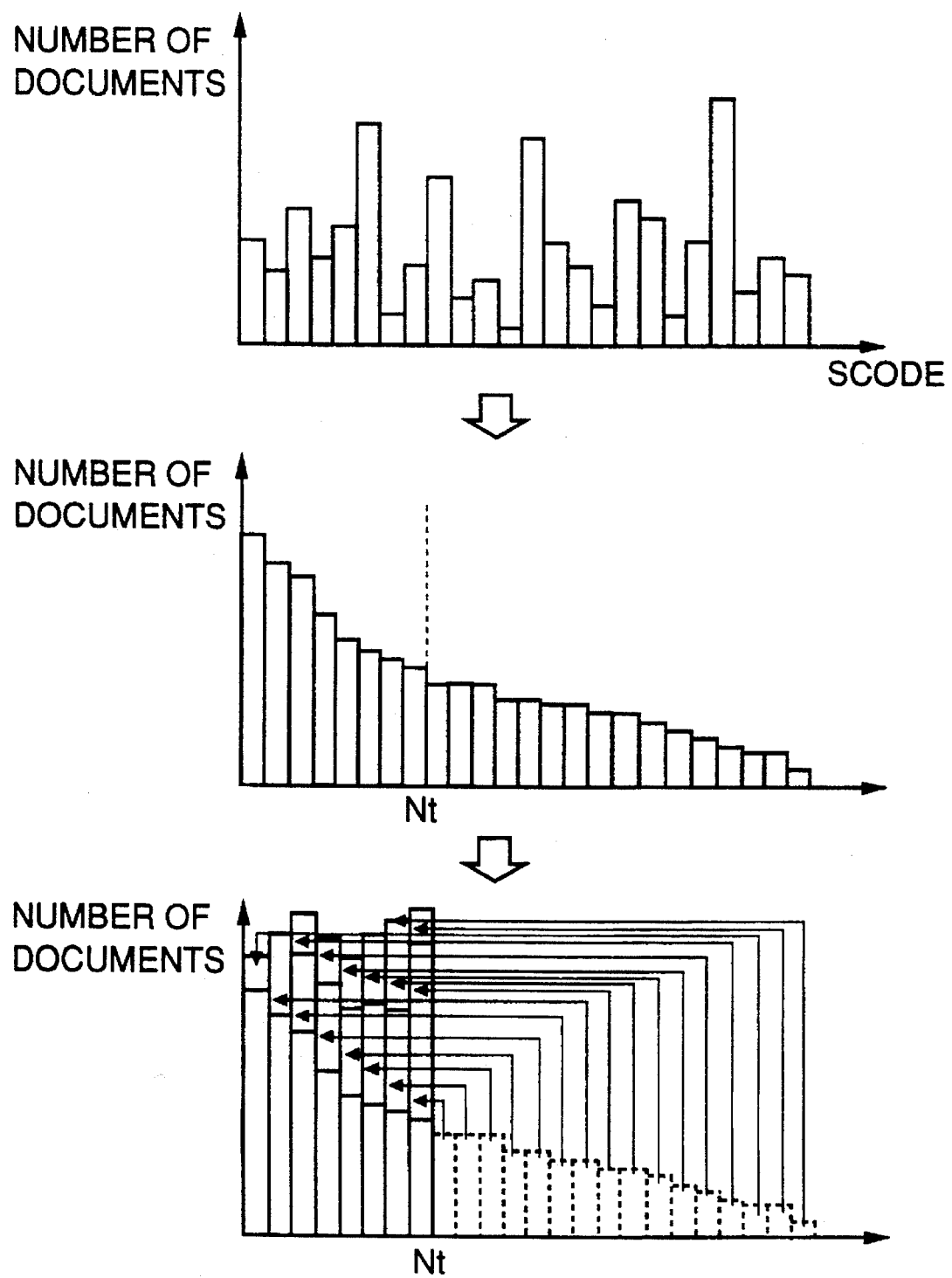
FIG. 17 is a view For illustrating a general concept underlying a component character table creation method according to a seventh embodiment of the invention.

For creating the frequency-information-based hashing type component character table, frequencies at which characters of documents registered in a database are checked to thereby determine the hash function on the basis of the frequency information thus obtained. The hash function is so adjusted that an entry for a character used at a high frequency is protected against other characters being entered to a maximum possible extent while the entry for a character of low frequency use allows a plurality of characters to be entered. Owing to such preparation of the hash function, there can be realized the component character table search which can assure a stable text screening ratio (document reduction ratio) on an average. In more concrete, a number of documents using a character or characters of concern in a database are checked on the basis of SCODE derived in accordance with the expression (4-1) mentioned hereinbefore and rearranged in the order of high to low frequencies, as is illustrated in FIG. 17. Subsequently, a number of documents corresponding to the number Nt of the entries in the component character table are selected, starting from the document in which the characters of concern occurs at a highest frequency. Subsequently, except for the entry corresponding to the highest frequency in a frequency distribution beyond Nt, the other entries are allocated sequentially with the entry ID numbers greater than Nt. To this end, the allocation of the entry ID numbers is performed such that the entry ID numbers increasing progressively from Nt are sequentially allocated, for example, in such manner that the entry ID number Nt is to a (Nt+1)-th entry, the entry ID number (Nt+1) to the (Nt+2)-th entry and so forth. In the course of the allocation of the entry ID numbers, care is taken not to allocate the entry ID number to the entry having the highest frequency. The allocated entry ID numbers are stored in the form of a table such as illustrated in FIG. 18.

The hash function is implemented by consulting this table. It can readily be seen from the table that the character "検" represented by (095F)H in SCODE, for example, has the entry ID number "231" allocated thereto.

In the case of the instant embodiment, the control procedure for the hierarchical presearch processing is identical with that described hereinbefore in conjunction with the fifth embodiment. Namely, the control procedure illustrated in FIG. 14 is adopted as it is, to thereby effect first the component character table search by using the characters contained in the given search term, which is then followed by the condensed text search by using the search term. Unless the contextual condition or the like is designated, the retrieval is completed at the end of the condensed text search. Otherwise, the text body search is performed, the result of which is then outputted as the document retrieval result.

As will be understood from the above description, the arrangement of the seventh embodiment can assure constantly and stably a high document screening ratio in the component character table search owing to the use of the component character table created on the basis of information about the frequency distribution of characters used actually in a database. As a result of this, the time required for the retrieval processing can be shortened uniformly independent of the search terms.

The foregoing description has been directed to the embodiments in which the respective component character tables differ from one another. In the following, description will be made of exemplary embodiments of the invention which differ from those described so far in respect to the structure of the condensed text.

Although the processing for creating the condensed text employed in the first embodiment of the invention is simple, there is a problem that even a character string which is not to be intrinsically used for the search or retrieval such as a hiragana character string "のため の" (corresponding to "for" in English) is contained in the condensed text, presenting an obstacle in increasing the compression ratio of the condensed text. This in turn means that the volume of the condensed text to be scanned upon retrieval is increased, as a result of which the time taken for the document retrieval processing is also increased. A major factor which lowers the compression ratio of the condensed text can be explained by the fact that a character string representing a subsidiary or accessory word which has semantically no meaning by itself is also registered as a part of the condensed text.

Figure 19:
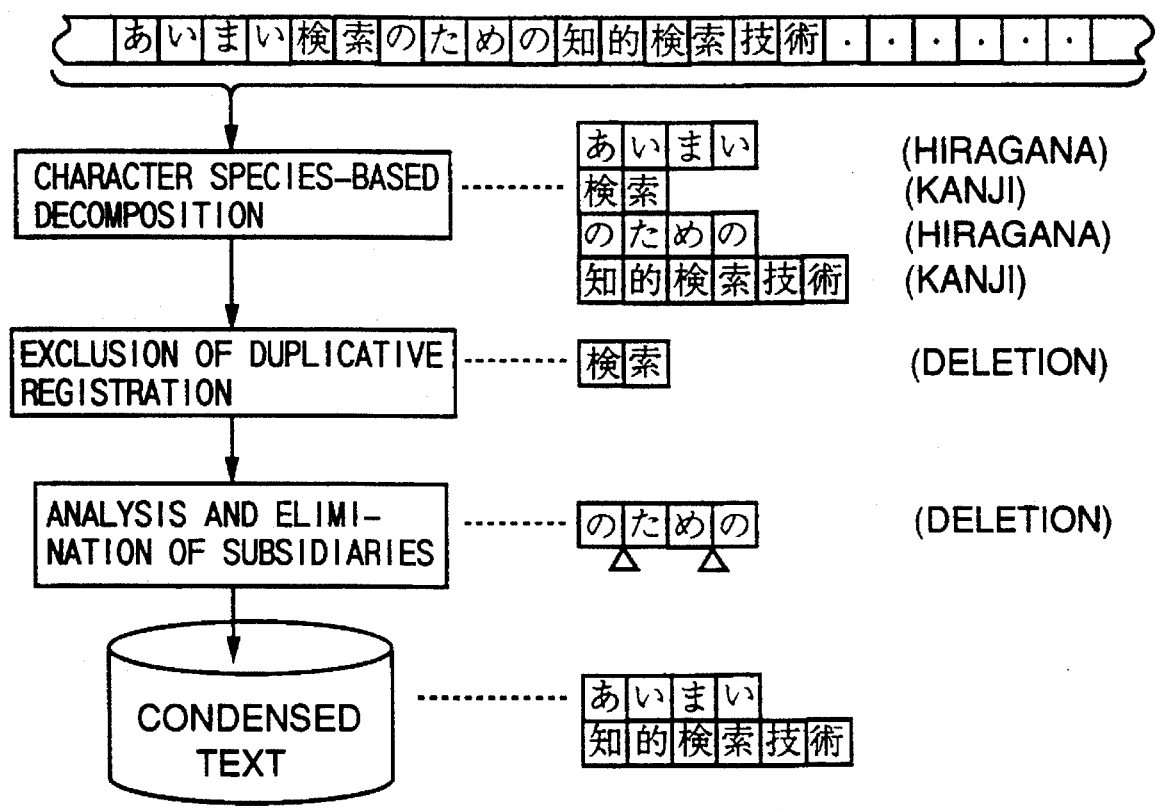
FIG. 19 is a schematic flow chart for illustrating a method of creating a condensed text according to an eighth embodiment of the invention.
Figure 20:
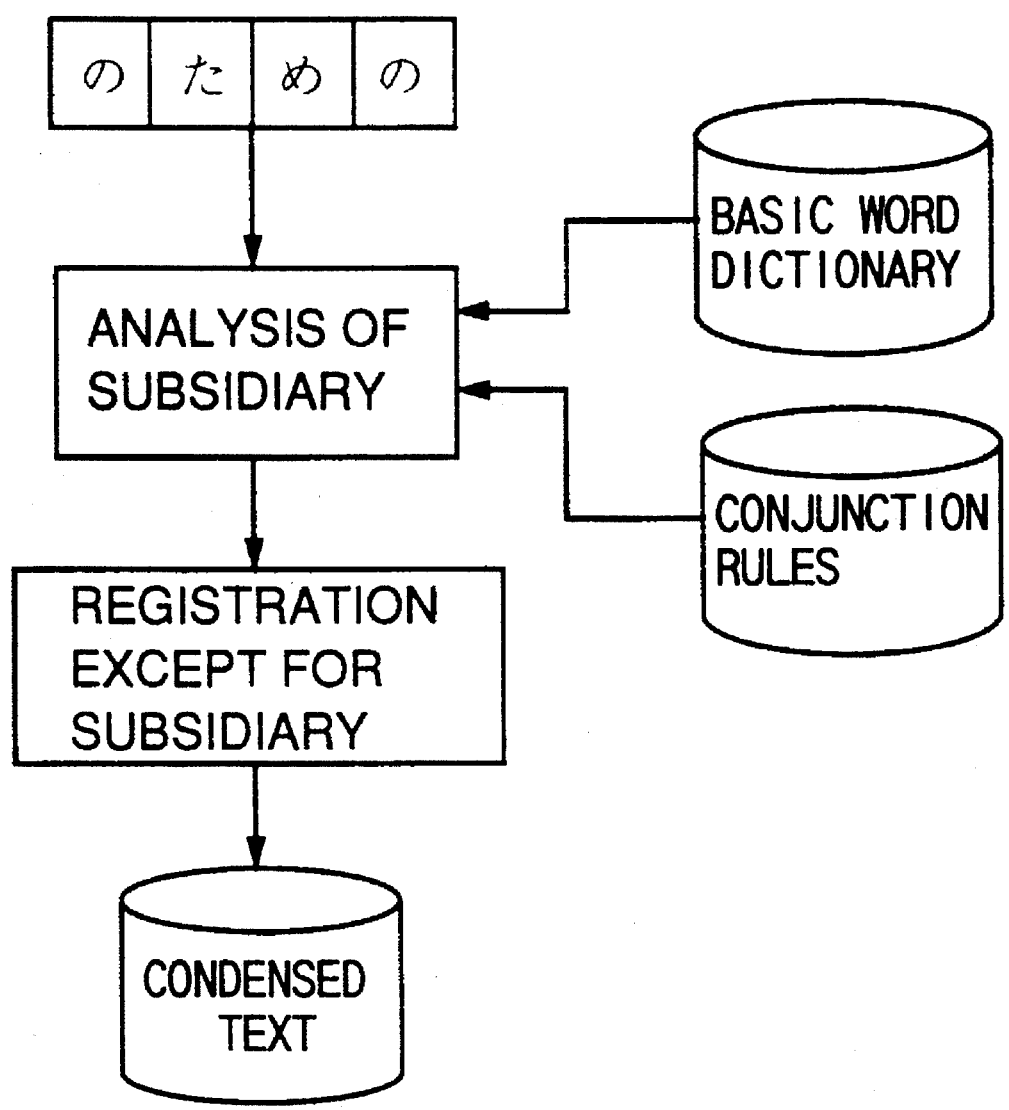
FIG. 20 is a schematic flow chart for illustrating a hiragana character string processing method for a condensed text used in the eighth embodiment of the invention.

An eighth embodiment of the invention described below is concerned with the hierarchical presearch executed by using the condensed texts in which useless or meaningless character strings have been removed. This type of condensed text will be referred to as a character-species-based decomposed/duplication excluded/subsidiary word eliminated type condensed text. Referring to FIG. 19, a method of creating the condensed text of this type resides in that a source text is decomposed into fragmental character strings on the basis of the character species, and the duplication of the character strings is excluded, which is then followed by elimination of the subsidiary word(s). The methods for character-based text decomposition and exclusion of the duplication of character string are same as the procedure described hereinbefore in conjunction with the first embodiment of the invention. The removal of the subsidiary word is performed on the hiragana character string after the duplication excluding procedure. Analysis for elimination of the subsidiary word is conducted with the aid of a basic word dictionary and in accordance with conjunction rules, as is illustrated in FIG. 20. There are registered in the basic word dictionary hiragana character words functioning as verbs, nouns, demonstrative pronouns, adjectives, adjective verbs, adverbs, conjunction, postpositional words (joshi in Japanese) each of which functions as an auxiliary to a main word, and auxiliary verbs, together with inflections of these parts of speech and information thereof, as is illustrated in FIG. 21. In the case of the illustrated example, there are registered verbs "ある(be)", "なる(become)", "もつ(have)" and others together with inflection information thereof. As the conjunction rules, there are registered the rules stipulating which of the words registered in the basic word dictionary is allowed to be connected to which of other words registered in the basic dictionary, as is illustrated in FIG. 22 from which it can be understood that a noun word "こと" is allowed to be connected to a participle form of a verb word "もつ", a postpositional word "が" can be connected to a noun word "こと" and so forth. By consulting the basic word dictionary and the conjunction rules mentioned above, decision is made as to whether or not a given fragmental character string consisting of hiragana characters constitutes a subsidiary or auxiliary word, to thereby determine whether or not the given hiragana character string of concern should be included in a relevant condensed text. By way of example, a fragmental hiragana character string "のため の" can analytically be decomposed into a series of substrings of a postpositional word "の", a noun word "ため" and a postpositional word "の". Accordingly, this fragmental hiragana character string is decided to be composed only of the subsidiary words each of which is semantically meaningless by itself and eliminated or deleted for this reason. On the other hand, a hiragana character string "あいまい" has a meaning by itself and can not be regarded to be a subsidiary word. Accordingly, this hiragana character string is included in the condensed text to be registered.

By analyzing the hiragana character strings to eliminate the subsidiary word, such useless information which can not intrinsically be used in the document retrieval processing is deleted, as a result of which the compression ratio of the condensed text thus prepared can be increased. At this junction, it should be added that the basic word dictionary and the conjunction rules are of universal nature and require essentially no updating maintenance after they have once been created, to an advantage, in contrast to a conventional keyword dictionary in which the number of registered words increases as a function of the time or the generation. Since only the hiragana character strings that are susceptible to the analysis and determined as the subsidiary are eliminated, any new word composed of hiragana characters which is absent in the dictionary can necessarily be contained in the condensed text.

Now, description will be turned to the control procedure for the hierarchical presearch processing in which the character-species-based decomposed/duplication excluded/subsidiary word eliminated type condensed text is used. In the case of the condensed text of this type, some hiragana character strings are not registered as the result of the subsidiary word analysis, as described above. Accordingly, when the retrieval is to be performed by using a particular hiragana character string as the search term, there may arise such a case in which no relevant condensed text can be retrieved through the condensed text search. Let's consider, for example, a hiragana character string "めまい" (a word meaning "dizziness" in English). However, this hiragana character string may be analyzed to be a string of a postpositional character "め" representing an unended conjugation form of a verb word and an end form "まい" of an auxiliary verb word. In this conjunction, let's consider again a phrase "認めまい" ("may not be admitted" in English). However, "めまい" may be deleted from the condensed text as the result of the subsidiary word elimination processing even when it is used as a noun, for the reason described just above. Accordingly, retrieval of the condensed texts by using "めまい" as a search term may cause some relevant text to be omitted. Such being the circumstances, it is necessary to check before starting the condensed text search whether a given search term is a word which does not originally exist in the condensed text or a word which might possibly be deleted in the course of creation of the condensed text. For checking whether or not a search term is a word which should be registered in a condensed text, the subsidiary word elimination algorithm used in the creation of the condensed text can be applied without any modification. In the case of the abovementioned example, "めまい" given as the search term can be determined to be a string of the subsidiary words.

Figure 23:
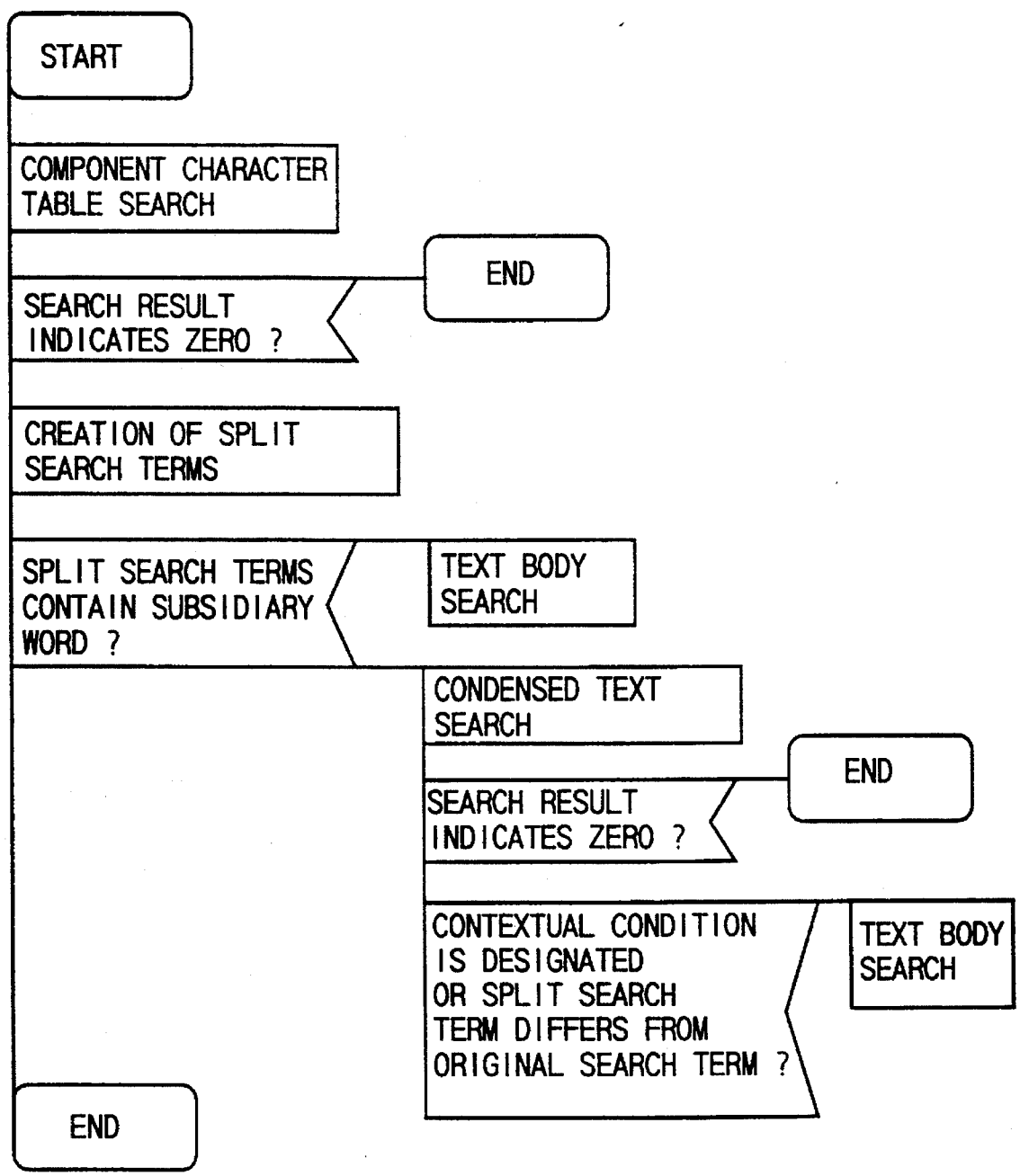
FIG. 23 is a PAD diagram for illustrating a processing procedure of a hierarchical presearch adopted in the eighth embodiment of the invention.

The retrieval control procedure outlined above will be described in detail by reference to FIG. 23. At first, the component character table search is performed. When the result of retrieval is zero, the retrieval document processing comes to an end by outputting zero (i.e. no document). As described hereinbefore in conjunction with the first embodiment, in the system in which no hash function is employed, the result of the component character search table can be outputted as the final result, when the search term consists of a single character.

Accordingly, when the component character table described previously in conjunction with the first and fourth embodiments of the invention is used, it is checked whether or not the search term is composed of one character. If so, the result of the component character table search is outputted as the final retrieval result, whereon the document retrieval processing is completed. On the other hand, when the component character table is used which is prepared by using the hash function as described hereinbefore in conjunction with the fifth, sixth and seventh embodiments, the check as to whether or not the search term is composed of one character is not performed but the succeeding condensed text search is necessarily carried out. Subsequently, the split search terms are created as in the case of the first embodiment.

In a next processing step, the subsidiary word analysis described previously is conducted for each of the split search terms. In that case, even when one of the split search terms is analytically decided to be the subsidiary word, there is a possibility that the original search term has been eliminated from the condensed text. Accordingly, the condensed text search is skipped and the text body search is straightforwardly executed on the basis of the results of the component character table search. On the contrary, when the result of the subsidiary word analysis shows that all the split search terms do not represent the subsidiary words, the condensed text search is performed in a same manner as in the case of the first embodiment of the invention. When neither proximity condition nor contextual condition is given or when the split search term is same as the source or original search term, the result of the condensed text search is outputted as the final result of the document retrieval, whereupon the retrieval processing is completed. To the contrary, when the proximity condition or the contextual condition is given or when the split search term differs from the original search term, the text body search is then executed, the result of which is outputted as the ultimate result of the document retrieval.

As will be appreciated from the above description of the eighth embodiment of the invention, the compression ratio of the condensed text can be increased with the time taken for the retrieval processing being correspondingly reduced by virtue of the use of the character-species-based decomposed/duplication excluded/subsidiary word deleted type condensed text from which the useless string of subsidiary words has been deleted.

Next, as a ninth embodiment of the present invention, description will be made of the hierarchical type presearch processing in which a character-species-based decomposed/duplication excluded/hiragana-string eliminated type condensed text is used. With the arrangement of the eighth embodiment, the compression ratio of the condensed text can certainly be enhanced. However, there exists a possibility that the subsidiary word analysis may erroneously be performed. In reality, in addition to the hiragana character string "めまい" discussed in connection with the eighth embodiment, there are encountered, although rarely, such a character string which makes it impossible to decide correctly which substring is in essence a subsidiary word merely by resorting to the subsidiary word analysis only. By way of example, let's consider a character string "動作してこの応用で". In that case, it is difficult to decide whether a hiragana character string "してこの" means "して, この(operates and this)" or "し, てこの(operates, while a lever)". In the latter case, designation of "てこ(lever)" as the search term which is not the subsidiary word in the sense used herein will render it difficult to retrieve a relevant condensed text. On the other hand, in creation of the condensed text, the hiragana character string "してこの" will be interpreted as a meaningless subsidiary string and be deleted from the condensed text, which will then provide a cause for omission of the relevant text from the retrieval in the condensed text search.

Figure 24:
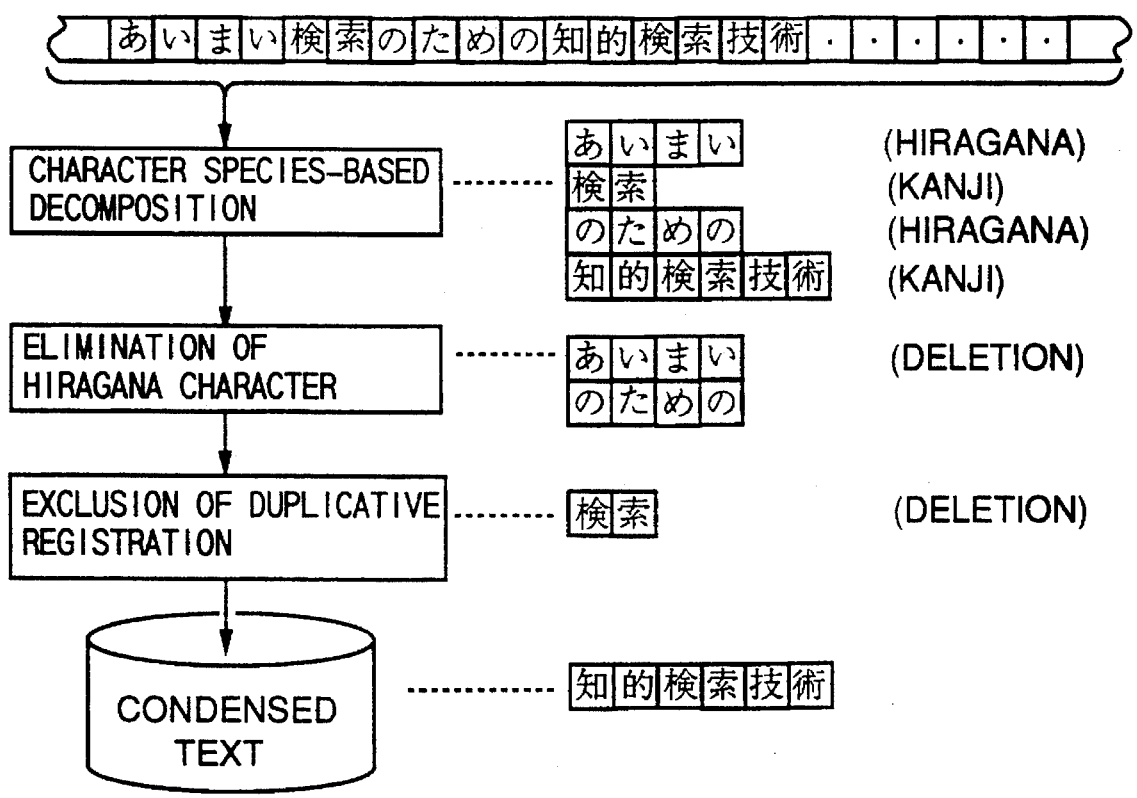
FIG. 24 is a schematic flow chart for illustrating a method of creating a condensed text according to a ninth embodiment of the invention.

Under the circumstances, with the ninth embodiment of the present invention, it is contemplated to realize the hierarchical presearch control by adopting a simple discrimination method for deciding whether or not a search term is a hiragana character string, to thereby complement the imperfectness of the subsidiary word analysis described above in connection with the eighth embodiment. FIG. 24 illustrates a condensed text creating method according to the ninth embodiment. In brief, according to this method, hiragana character strings are deleted after the character-species-based decomposition to thereby exclude the duplicative registration.

Figure 25:
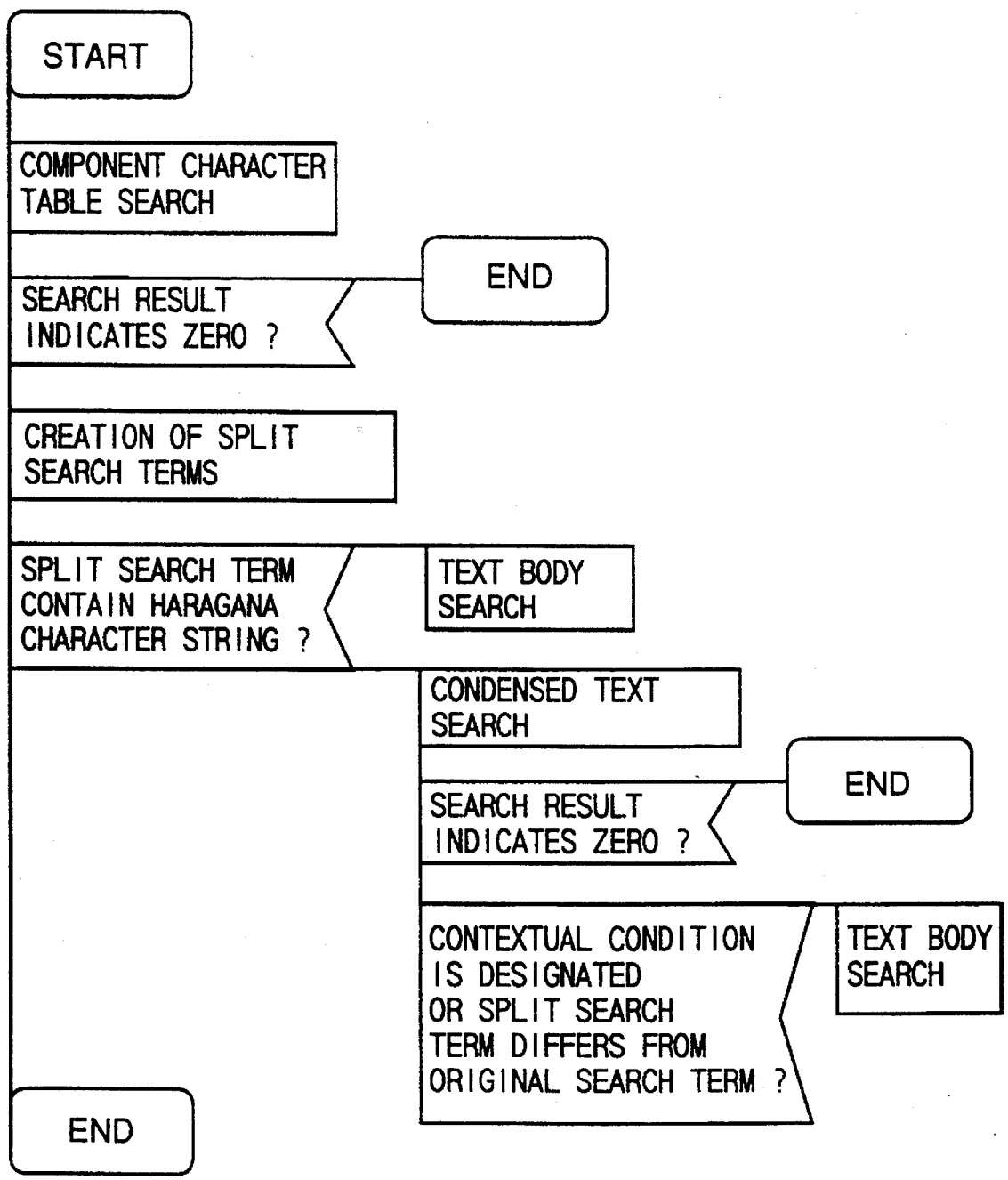
FIG. 25 is a PAD diagram for illustrating a processing procedure of a hierarchical presearch according to the ninth embodiment of the invention.

Now referring to a PAD diagram shown in FIG. 25, description will be made of the control procedure of the hierarchical presearch in which the character-species-based decomposed/duplication excluded/hiragana-string eliminated type condensed text is made use of. First, the component character table search is performed as in the case of the eighth embodiment of the invention. Subsequently, split search terms (i.e. search character substrings) are generated; Next, it is checked whether or not each of the split search terms or substrings is a hiragana string. In case any one of the split search terms is a hiragana string, the condensed text search is not effectuated but the text body search is performed directly on the basis of the result of the component character table search. In contrast, when the split search terms include no hiragana character string at all, the condensed text search is performed as described hereinbefore in connection with the first embodiment. In that case, when the proximity condition or the contextual condition is designated or when the split search term differs from the original search term, the retrieval processing is continued up to the text body search inclusive.

As will be appreciated from the above description according to the ninth embodiment of the invention, a correct full document retrieval can be realized without incurring omission of text by virtue of the use of the condensed text from which all the hiragana character strings have been deleted.

A tenth embodiment of the present invention will next be described.

Figure 26:
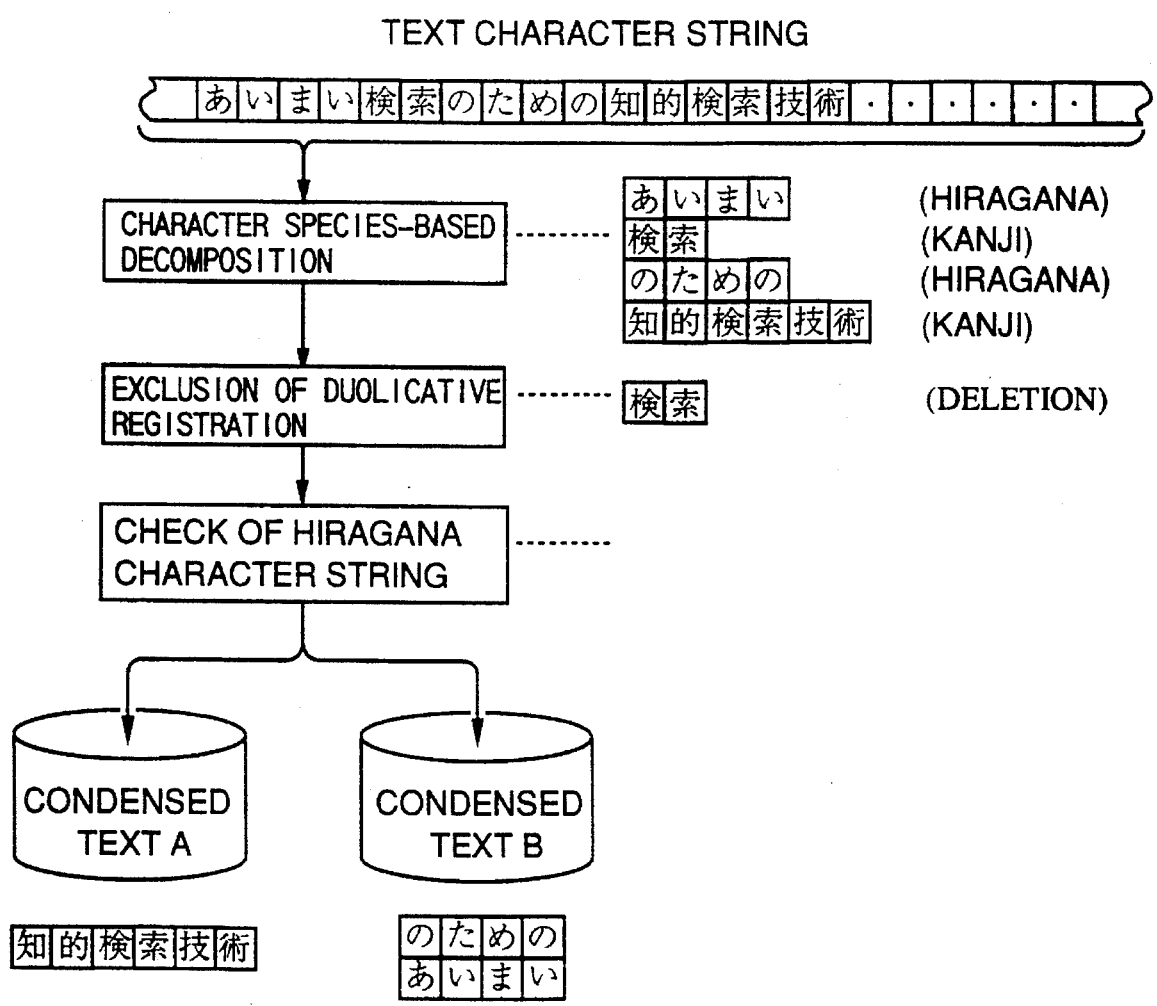
FIG. 26 is a schematic flow chart for illustrating a method of creating a condensed text according to a tenth embodiment of the invention.

In the full text retrieval system according to the ninth embodiment of the invention, there arises the necessity of consulting straightforwardly the text body when a search term composed of hiragana characters is given. As a result of this, lot of time is needed for the retrieval processing. With the tenth embodiment of the invention, it is contemplated to provide a method which is capable of performing the full document retrieval at a high speed even in the case a search term of hiragana characters is given. To this end, it is proposed that condensed texts registering therein hiragana character strings which are eliminated in the document retrieval according to the ninth embodiment are created in addition to the condensed texts used therein. More specifically, after the character-species-based decomposition and the duplication exclusion processing, it is decided whether or not remaining character substrings are hiragana character strings, whereon the character strings other than the hiragana string are registered as a condensed text A while the hiragana character strings ape registered as a condensed text B, as is illustrated in FIG. 26.

Figure 27:
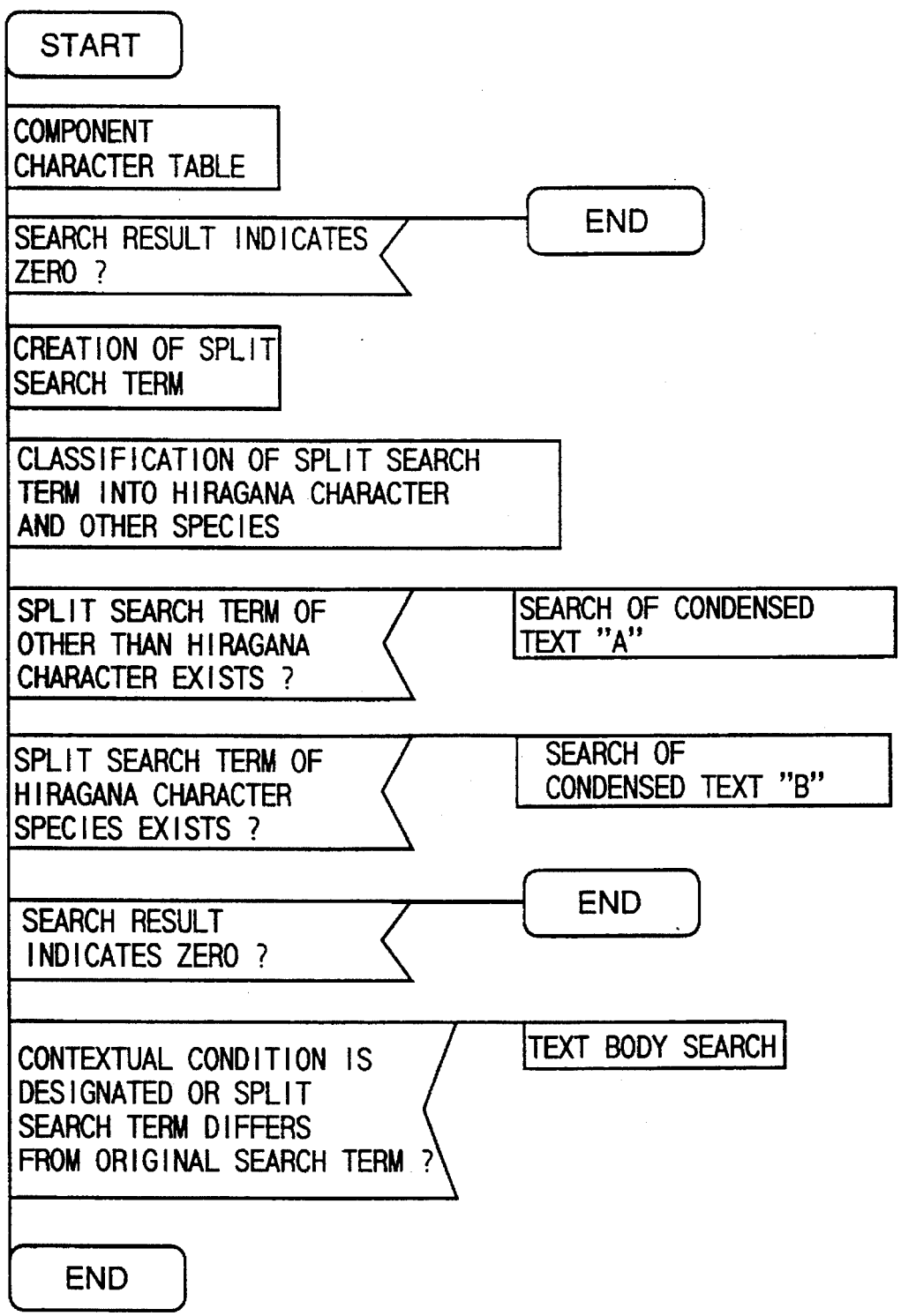
FIG. 27 is a PAD diagram showing a processing procedure of a hierarchical presearch adopted in the tenth embodiment of the invention.

By virtue of this arrangement, the search can be performed on the condensed texts B when a search term consisting only of hiragana characters is given, whereby the time taken fop the retrieval can further be shortened. A practical example of the control procedure for the hierarchical presearch is illustrated in FIG. 27. Referring to this figure, the component character table search is first effected in a same manner as described hereinbefore in conjunction with the eighth embodiment of the invention. When this search results in zero or no retrieval, the processing is ended at that time point. Subsequently, split search terms are generated, which are then classified into a term consisting only of a hiragana character string and a term consisting of other character string than hiragana characters. Subsequently, the condensed text A is searched when there is a split search term consisting of other character string than the hiragana characters, being then followed by the search on the condensed text B when the split search term of hiragana character string exists. Thereafter, the retrieval processing is continued up to the text body search in a same manner as in the case of the first embodiment of the invention when the proximity/contextual condition is given or when the split search term differs from the original search term.

In this manner, by virtue of storage of the condensed texts consisting of hiragana characters separately from those constituted by the other characters than hiragana, the condensed texts can be made use of more effectively and efficiently regardless of the types or species of the characters constituting the search term, as a result of which a high-speed full document retrieval can always be ensured.

An eleventh embodiment of the invention will next be described.

Figure 28:
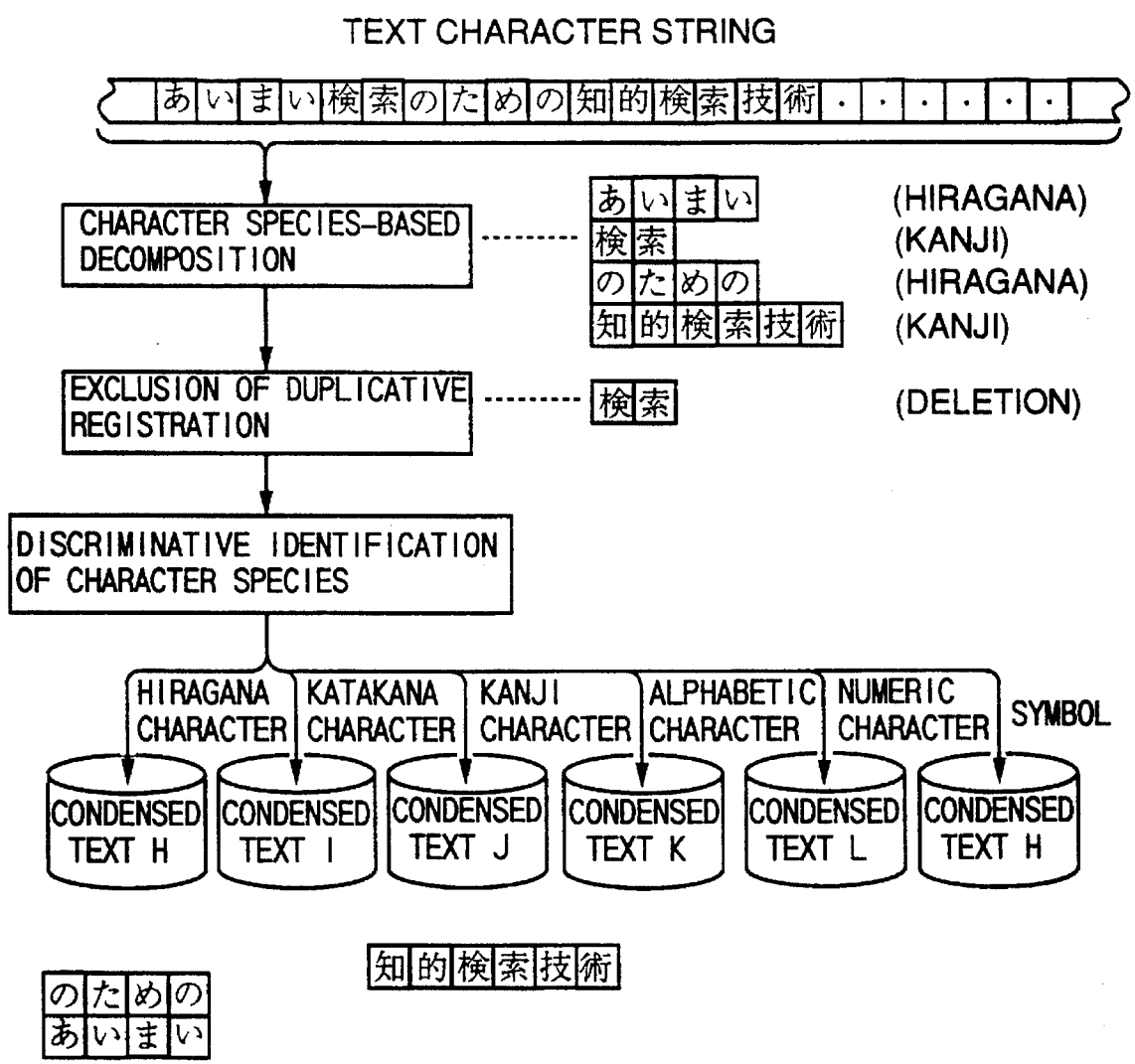
FIG. 28 is a schematic flow chart showing a method of creating a condensed text according to an eleventh embodiment of the invention.

This embodiment is concerned with a document retrieval system in which independent condensed texts are used for different character species, respectively, for the purpose of increasing the compression ratio of the condensed text. In this connection, the condensed text may be referred to as the character-species-based decomposed/duplication excluded/character-species-based registration type condensed text. For creating the condensed text of this type, the character strings remaining after the character-species-based decomposition and the duplicate registration excluding processing are discriminatively identified with regard to the character species to thereby classify a hiragana character condensed text H, a katakana character condensed text I, a kanji character condensed text J, an alphabetic character condensed text K, a numeric character condensed text L and a symbol or other character condensed text M for the registration, as is shown in FIG. 28.

By virtue of such arrangement, the time taken for the document retrieval can further be reduced. More specifically, when a text retrieval is to be performed, for example, with the aid of a kanji character search term, it is sufficient to search only the kanji character condensed text J.

Figure 29:
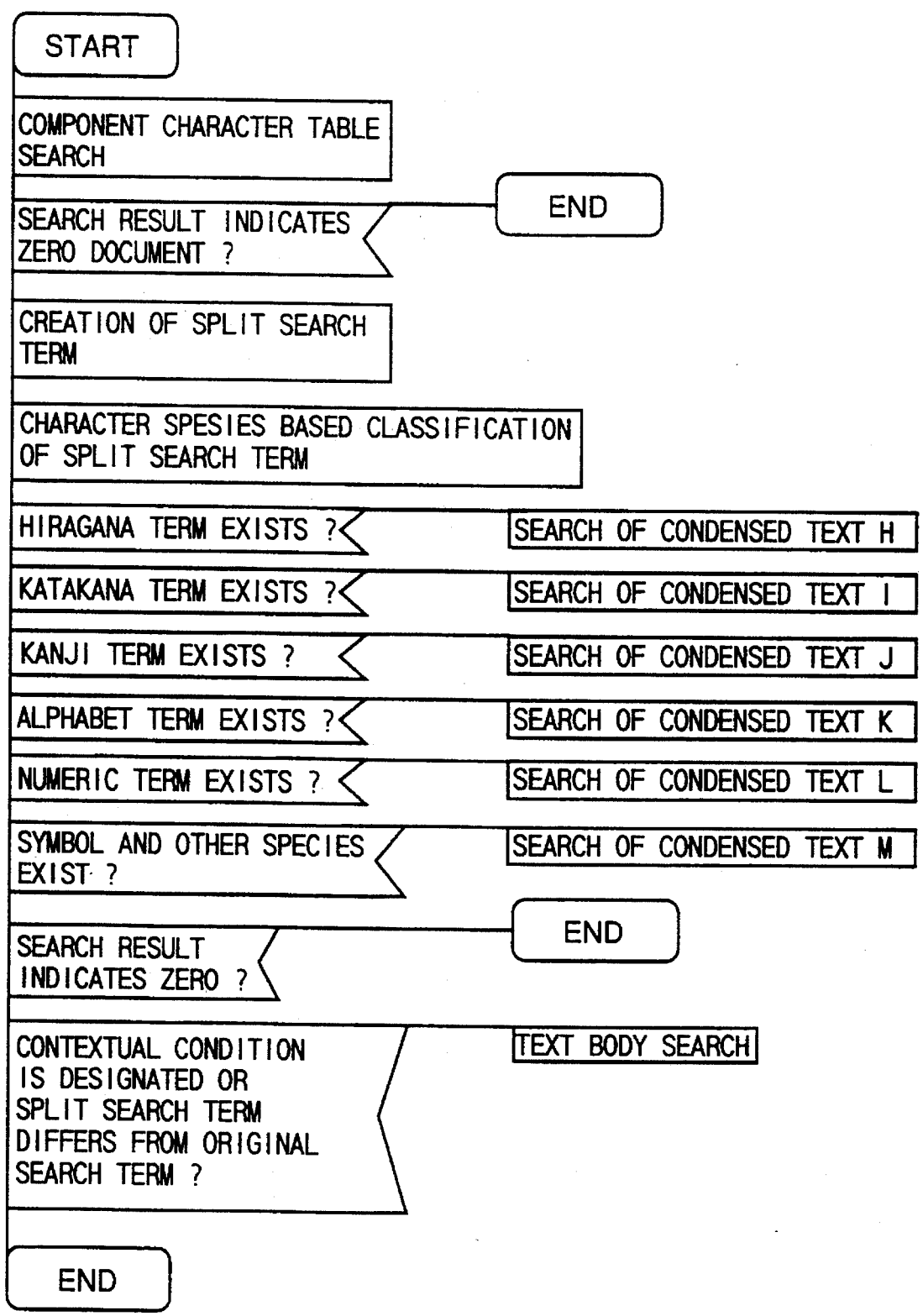
FIG. 29 is a PAD diagram showing a processing procedure of a hierarchical presearch adopted in the eleventh embodiment of the invention.

In this connection, a typical control procedure for the hierarchical presearch to this end is illustrated in FIG. 29. Referring to the figure, the component character table search is first performed in a same manner as in the case of the eighth embodiment. When this presearch results in zero or no retrieval, the retrieval processing is terminated. Otherwise, split search terms are subsequently generated and classified in dependence on the character species as mentioned above. Next, the condensed text to be searched is selected in conformance with the character species of the split search term. By way of example, the condensed text H is selected for the split search term of hiragana characters, while the condensed text I is selected for the split search term of katakana characters and so forth. Thereafter, the retrieval processing is continued up to the text body search in a same manner as in the case of the first embodiment of the invention when the proximity/contextual condition is designated or when the split search term differs from the original search term.

By preparing separately the condensed text files for the different character species, respectively, to thereby reduce the volume of each of the individual condensed texts, the full document retrieval can be carried out at a higher speed by using the search term consisting of characters of one species such as kanji characters only, katakana characters only or hiragana characters only.

Figure 30:
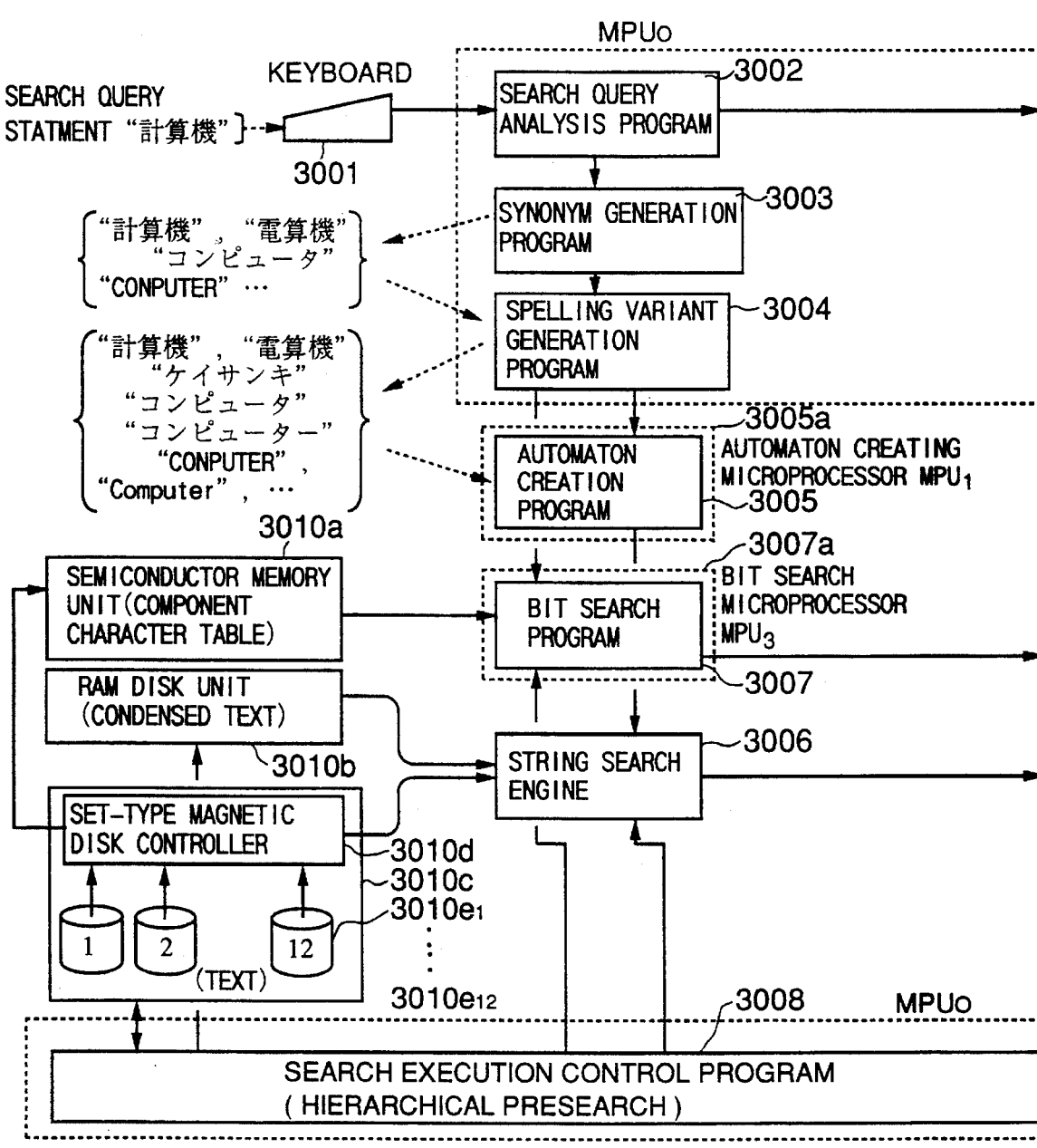
FIG. 30 is a schematic functional block diagram showing a general arrangement of a full document retrieval system according to a twelfth embodiment of the invention.
Figure 31:
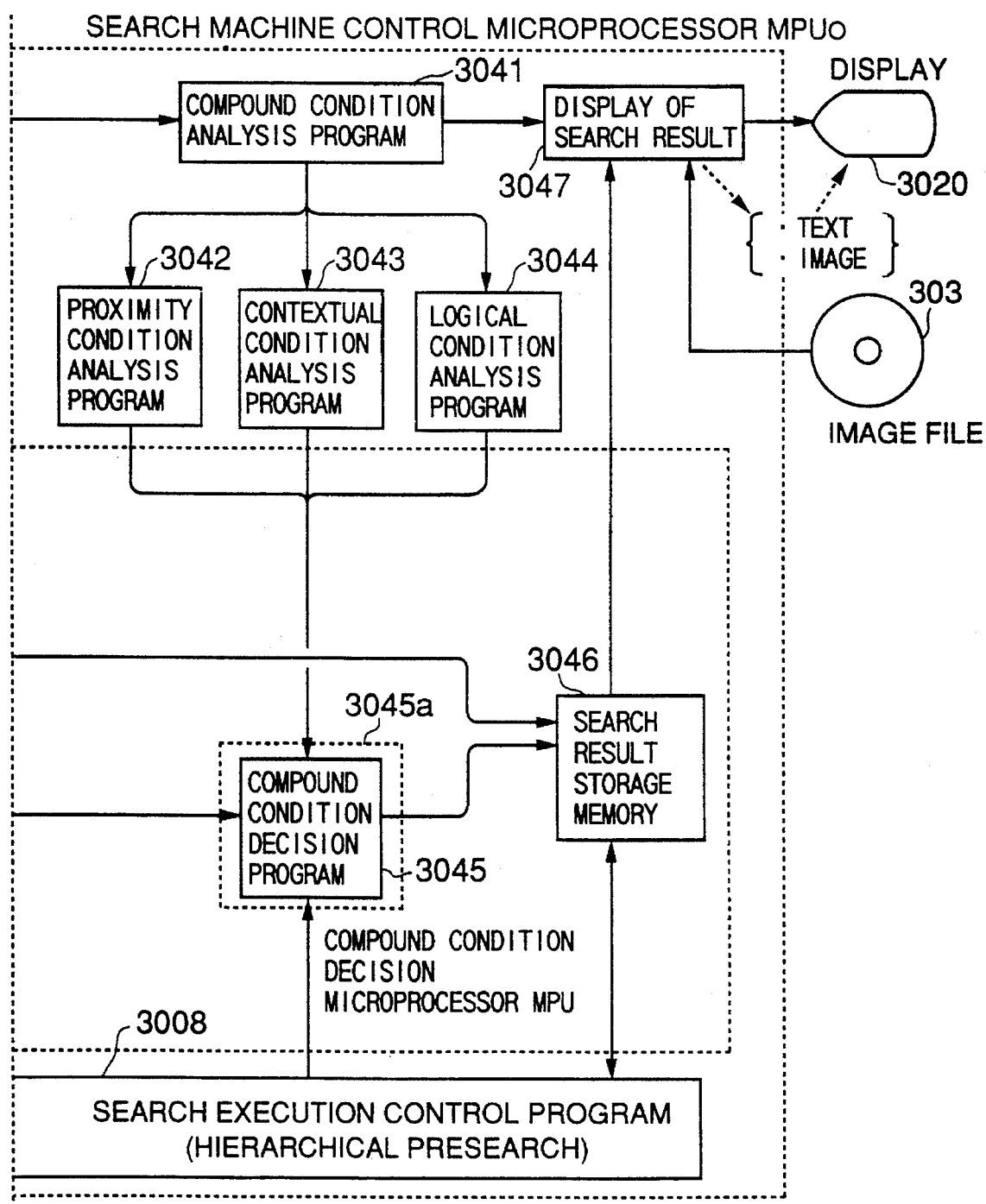
FIG. 31 is a view similar to FIG. 30 and shows remaining parts of the system according to the twelfth embodiment of the invention.
Figure 32:
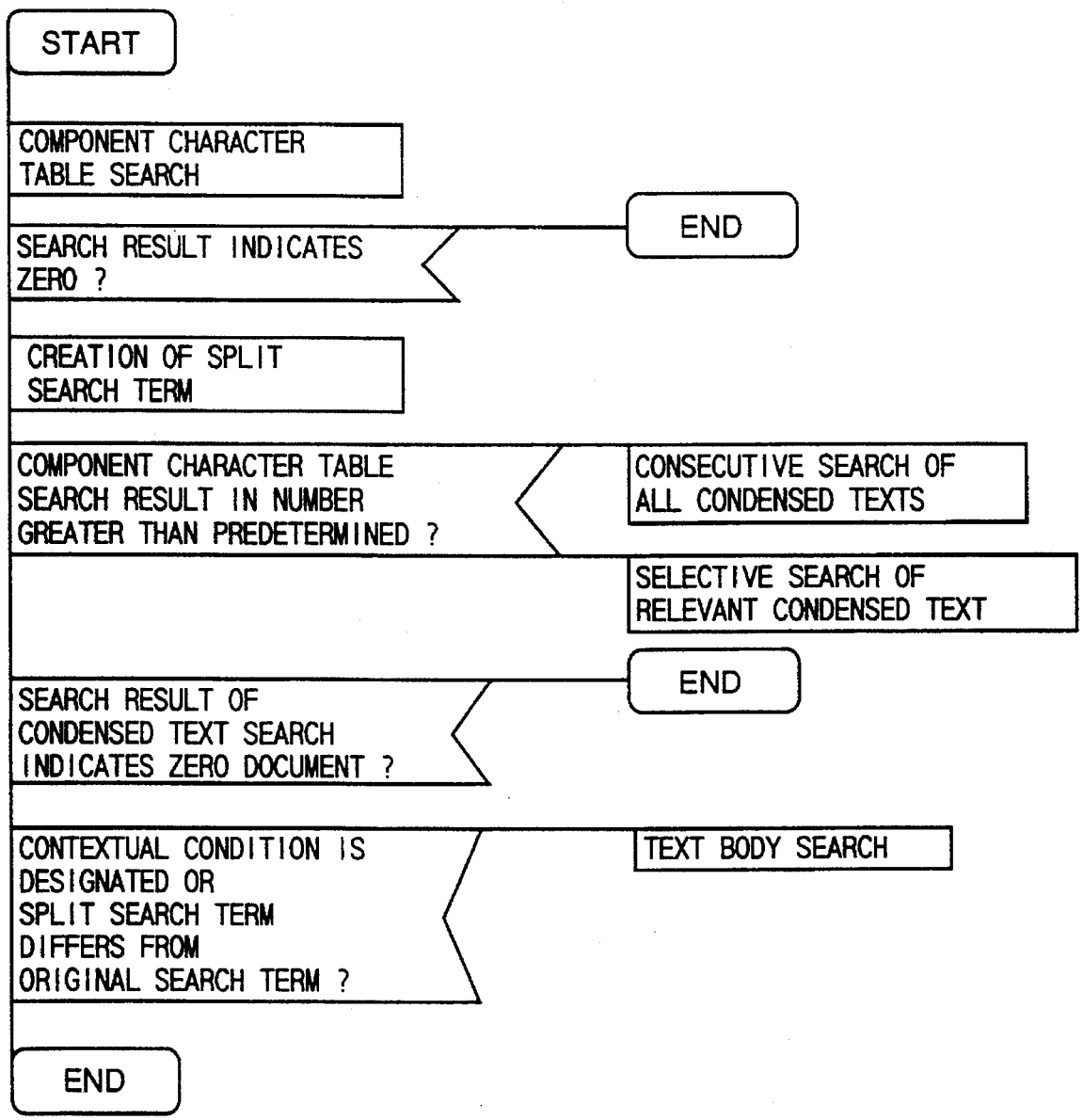
FIG. 32 is a PAD diagram showing a processing procedure of a hierarchical presearch adopted in the twelfth embodiment of the invention.
Figure 34:
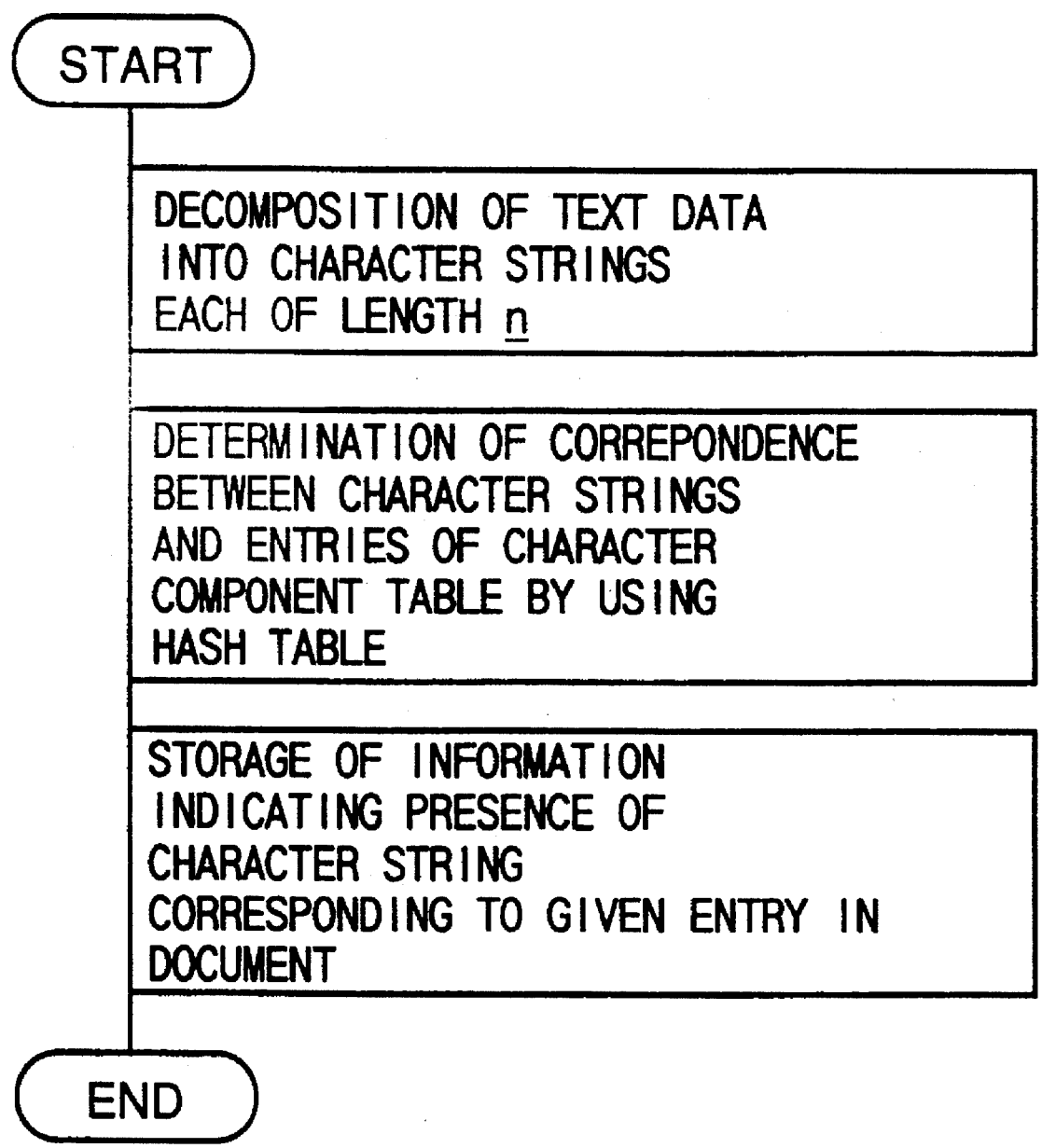
FIG. 34 is a PAD diagram for illustrating a procedure for creating a component character table.
Figures 35, 36:
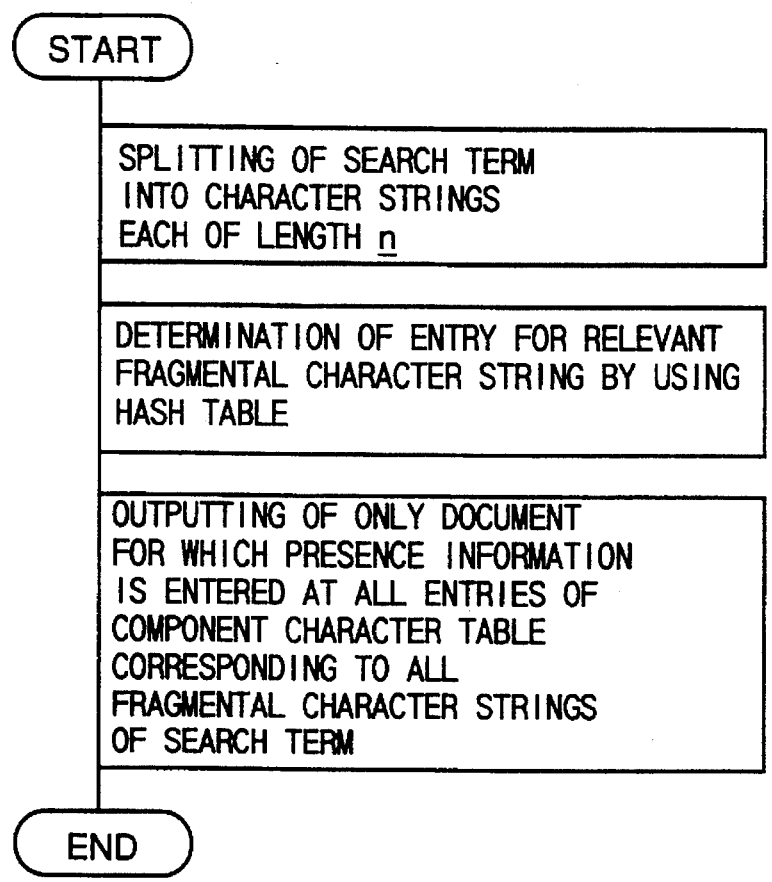
FIG. 35 is a PAD diagram showing a procedure for performing search on a component character table.
FIG. 36 is a view for illustrating manners in which concatenated character strings are prepared.

Next, referring to FIGS. 30 and 31, a twelfth embodiment of the invention will be described. With the instant embodiment, it is contemplated to realize the invention by using a document retrieval system proposed in PCT/JP/90/00774.

The document retrieval system comprises as main components a keyboard 3001, a search query analysis program 3002, a bit search processor 3007*a*, a string search engine 3006, a compound condition decision microprocessor 3045*a*, a search result store memory 3046, a display 3020, a semiconductor memory unit 3010*a*, a RAM disk unit 3010*b*, a set-type magnetic disk unit 3010*c* and a search execution control program 3008. The semiconductor memory unit 3010*a* is destined to store the component character table while the condensed texts are destined to be stored in the RAM disk unit 30 with the texts being stored in the set-type magnetic disk unit 3010*c*. It should however be mentioned that the component character table and the condensed text are previously stored in the set-type magnetic disk unit 3010*c* and loaded in the semiconductor memory unit 3010*a* and the RAM disk unit 3010*b*, respectively, upon starting of operation of the document retrieval system according to the instant embodiment.

The hierarchical presearch control procedure is same as in the case of the foregoing embodiments of the invention. The twelfth embodiment differs from the latter in the respects that the component character table is stored in the semiconductor memory, the condensed texts are stored in the RAM disk and the texts are stored in the set-type magnetic disk unit and that the microprocessor dedicated to the component character table search is provided in combination with the string search engine dedicated to the condensed text search and the text body search.

The retrieval processing procedure in this system will be described below.

The query condition statement inputted via the keyboard 3001 is analyzed by the search query analyzing program 3002 running on a search machine controlling microprocessor MPU03050. More specifically, the search query analyzing program 3002 separates the inputted query condition statement into a search term (keyword) part and a compound condition describing part describing the inclusion condition and the positional condition of the search terms. The inclusion condition is given as Boolean or logic condition, while the positional condition is given in terms of the proximity condition or the contextual condition.

After separation and extraction processing, the search term part is transferred to a synonym generation program 3003 which is also running on the microprocessor MPU03050, while the compound condition describing part is transferred to the compound condition analyzing program 3041.

With the synonym generation program 3003, synonyms of the inputted search term are determined by consulting a synonym dictionary incorporated in the program 3003. In the case of the example illustrated in FIG. 30, synonyms "電算機," "コンピュータ", "COMPUTER" and the like are generated from an input keyword "計算機".

Further, with a spelling variant generation program 3002, the input search term transferred thereto undergoes a spelling variant generation processing, whereby spelling variants of the input search term are generated. In the case of the example illustrated in FIG. 30, "コンピュータ," is generated from "コンピュータ" with "Computer" being generated from "COMPUTER".

The search terms undergone the synonym generation processing and the spelling variant generation processing are then supplied to an automation generating program 3005 running on an automaton generating microprocessor MPU13005a.

With the automaton generating program 3005, an automaton is generated for performing a batch (en-bloc) matching or collation processing on the search terms transferred to the program 3005, whereon the automaton is set in the search engine in the form of a state transition table and identification code information of the search terms which are to undergo the matching processing. Parenthetically, the search engine 3006 is realized as a high-speed multiple character string matching circuit based on a finite automaton.

The search words resulting from the processing by the spelling variant generation program 3004 are transferred together with the relevant input search word to a bit search program running on a bit search microprocessor MPU3007a.

On the other hand, the proximity condition, the contextual condition and the Boolean condition such as logical AND, OR or the like condition are transferred from the search query analyzing program 3002 to the compound condition decision program 3045 via a compound condition analyzing program 3041, a proximity condition analyzing program 3042, a contextual condition analyzing program 3043 and a Boolean condition analyzing program 3044.

After query information required for the document retrieval has been furnished to the bit search program 3007, the string search engine 3003 and the compound condition decision program 3045, the search control execution program 3008 activates firstly the bit search program 3007.

The bit search program 3007 then reads the component character table stored in the semiconductor memory unit 3010a to thereby perform the component character search, the result of which is stored in the search result storing memory 3046.

Upon completion of the component character table search, the search execution control program 3008 consults the search result storing memory 3046. When the number of the result of search is zero, no-result or zero is outputted as the result of retrieval, whereon the retrieval processing is intercepted. If otherwise, the string search engine 3006 is activated and at the same time the condensed text of the document hit in the course of the component character table search, the result of which is stored in the search result storing memory 3046, is read out from the RAM disk unit 2910b to be subsequently sent to the string search engine 3006 to allow the latter to execute the condensed text search. The condition decision as to whether or not the result of the condensed text search is zero is performed by the search execution control program 3008.

The string search engine 3006 performs the condensed text search on the condensed texts read out from the RAM disk unit 3010b by using the split search terms. The results of the matching or collation obtained from the condensed text search ape sequentially sent to the compound condition decision program 3045, which then determines the logical condition imposed on the search terms and stores document identifiers of those documents which satisfy the logical condition sequentially in the search result storing memory 3046.

After completion of the condensed text search, the search execution control program 3008 refers once again to the search result storing memory 3046. When the number of the results is zero, no-result or zero is outputted as the result of the retrieval.

Unless the result of retrieval is zero, the document identifiers obtained from the search is read out from the search result memory only when the proximity/contextual condition is imposed or when the split search terms differ from the original search term, whereon the texts corresponding to the document identifiers are read out from the set-type magnetic disk unit 3010c to be subsequently sent to the string search engine 3006 which is then caused to execute the text body search. Unless the proximity/contextual condition is imposed and when the split search term is identical with the original search term, the result of the search stored in the search result storing memory is outputted as the result of retrieval.

The string search engine 3006 is adapted to perform the text body search by scanning the texts read out from the set-type magnetic disk unit 3010c. The result of the text body search are transferred to the compound condition decision program 3045, which then makes decision as to the logical condition imposed on the search terms as well as the proximity/contextual condition, whereby the document identifiers of those documents which satisfy the abovementioned conditions are sequentially stored in the retrieval result storing memory 3046.

When the search processing is executed up to the text body search inclusive, the search execution control program 3008 refers to the retrieval result storing program 3046 to thereby output the result of retrieval, whereupon the document retrieval processing comes to an end.

As will be appreciated from the foregoing, the text body data of a relatively large volume is stored in the magnetic disk unit while the component character table and the condensed texts of relatively small volumes ape stored in the semiconductor memory and the RAM disk unit. By virtue of this feature, the full text retrieval processing can be realized at a high speed even for a large scale database.

A thirteenth embodiment of the invention will next be described, in which the condensed texts are adapted to be stored in a magnetic disk unit.

In the application where the condensed texts are stored in the magnetic disk unit, it is possible to execute the hierarchical presearch at a higher speed than the conventional hierarchical presearch of a same structure by optimizing the control procedure involved in the hierarchical presearch, as will be elucidated below.

The magnetic disk unit is usually equipped with a mechanically actuated magnetic head. Accordingly, a batch information reading from the magnetic disk (referred to as sequential access) can be performed at a higher speed than skipwise information reading (referred to as the skipwise access). Representing the reading speed in the skipwise access by $V_{skip}$ (MB/s), the reading speed in the sequential access by $V_{seq}$ (MB/s), the number of documents in the whole database by Na, and representing the number of results in the component character search by Nc on the assumption that the documents are of a uniform volume, the access time can be made shorter by performing the search of all condensed texts by the sequential access than the skipwise access performed on the basis of the character component table search when the following condition is satisfied.

$$Nc > (V_{skip}/V_{seq}) \cdot Na \qquad (12\text{-}1)$$

Accordingly, after the component character table search, the number of retrieval results is determined by executing the hierarchical presearch control program, and when the number of hits which satisfies the condition (12-1) is found as having been reached, the result of the component character table search is neglected, whereon the condensed texts are searched from the whole database.

By adopting the method described above, it becomes unnecessary to employ the RAM disk of a large capacity for storing the condensed texts in the magnetic disk. As a result of this, the full document retrieval can be realized at a relatively high speed with a relatively inexpensive structure of the document retrieval system.

Description will be turned to a fourteenth embodiment of the invention in which the condensed texts are stored in a magnetic disk unit.

When the proximity/contextual conditions are designated and when the number of retrievals resulting from the component character table search is very small, the time taken for the whole retrieval processing can be reduced much more by searching directly the text body on the basis off the result of the component character table search without performing the condensed text search.

Now representing the rate of condensed text search by $V_{sr}$ (in MB)/sec., that of the text body search by $V_{tx}$ (in MB)/sec., the number of retrievals resulting from the component character table search by $N_c$, the number of retrievals resulting from the condensed text search by $V_{sr}$, the amount of data for one condensed text by $Q_{sr}$ and the amount of data for one text by $Q_{tx}$, then the time taken for the whole retrieval processing can be shortened by performing directly the text body search while omitting the condensed text search, provided that the following condition is satisfied $$N_c Q_{sr}/V_{sr} + N_{sr} Q_{tx}/V_{tx} > N_c Q_{tx}/V_{tx} \qquad (13\text{-}1)$$

Although the number of retrieval results $N_{sr}$ remains indeterminate until the condensed text search has actually been carried out, it is possible to determine whether the condensed text search is to be performed or not by presetting a constant.

For example, representing the number of all documents. stored in a database by $N_a$ and expressing the term $N_{sr}$ by $$N_{sr} = \alpha N_a \text{ (where } 0 < \alpha < 1) \qquad (13\text{-}2)$$

the expression (13-1) can be rewritten as follows:

$$N_c < \alpha N_a (Q_{tx}/V_{tx})/(Q_{tx}/V_{tx} - Q_{sr}/V_{sr}) \qquad (13\text{-}3)$$

When the condition given by the above expression (13-3) is satisfied, the text body search is directly performed.

By setting previously the value of $\alpha$ as a threshold value in precedence to the document retrieval, it is determined after the component character table search in accordance with the expression (13-3) whether the condensed text search is to be performed or not.

By adopting this control procedure, the full document search or retrieval can be realized at a high speed under designation of the proximity/contextual condition.

With the arrangements of the thirteenth and fourteenth embodiments, the text retrieval system can be implemented more inexpensively when compared with the system of the twelfth embodiments.

In addition to the systems and methods according to the thirteenth and fourteenth embodiments, there can be conceived a further method which is capable of realizing the hierarchical presearch by executing the text body search straightforwardly from the component character table search while omitting the condensed text search step and without making use of the condensed texts at all. According to this method, although the volume of the texts to be scanned increases more or less, requiring a correspondingly lengthened time for the retrieval, a more inexpensive document retrieval system can be realized because of no necessity for the use of the expensive RAM disk with reduction in the magnetic disk capacity which will otherwise be required for storing the condensed texts.

Furthermore, the hierarchical presearch can be realized also by resorting to such a control method according to which all the condensed texts on the RAM disk or magnetic disk are directly searched without using the component character table, whereon the text body search is performed only in the case where the query condition concerning the positional relation between the search terms such as the proximity/contextual condition is designated. Although this method is accompanied with some increase in the time taken for the retrieval because of increase in the volume of the condensed texts to be searched, use of the semiconductor memory for storing the component character table can be rendered unnecessary, whereby the document retrieval system can be implemented with a correspondingly reduced cost.

It should further be mentioned that in place of the bit-list type component character table employed in the embodiments described so far, there may be used such a component character table in which the character codes themselves are stored instead of representing one character by one bit, as is illustrated in FIG. 33. Besides, the capacity of the component character table can be decreased by establishing correspondence between one character entry and a plurality of characters by using the hash function described hereinbefore in conjunction with the fifth, sixth and seventh embodiments of the invention. The component character table search which is based on the component character table storing the character codes as mentioned IB above can be realized by reading data from the file on a one-by-one character basis and making decision as to the presence of a relevant character, as in the case of the condensed text search and the text body search.

Owing to the use of the component character table containing only the characters used in the text, not only the data structure but also the retrieval processing as a whole can be simplified, because the scanning type search similar to the condensed text search and the text body search can be adopted while rendering unnecessary the bit-based operation, to a further advantage.

Additionally, it should be mentioned that the hierarchical presearch can equally be realized with a system arrangement in which the component character table is stored in the magnetic disk unit. In that case, the bit lists of the characters used in the search term and stored in the component character table ape sequentially read out from the magnetic disk and processed on a bit basis. In case the character codes ape stored intact in the component character table as described above, the component character table data are sequentially read out to thereby select or retrieve the document which contains all the relevant characters.

The method in which the component character table is stored in the magnetic disk allows the document retrieval system to be realized much mope inexpensively because the semiconductor memory can be spared.

Next, description will be directed to fifteenth to twenty-first embodiments incarnating a second aspect of the present invention which mainly concerns improvements or profitable modifications of the component character table structure.

Figure 37:
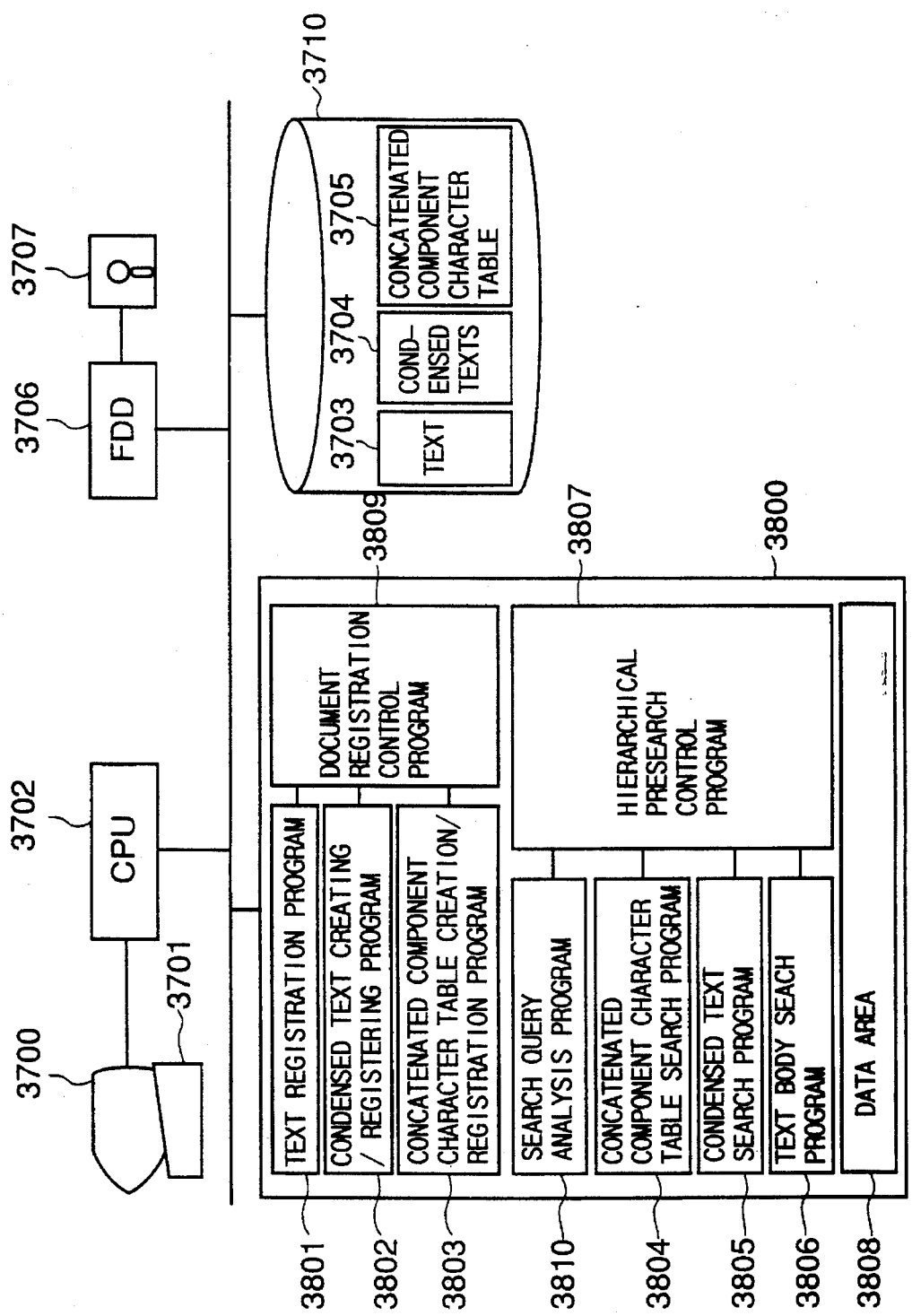
FIG. 37 is a schematic functional block diagram showing a general arrangement of the full document retrieval system according to a fifteenth embodiment of the invention.
Figure 38:
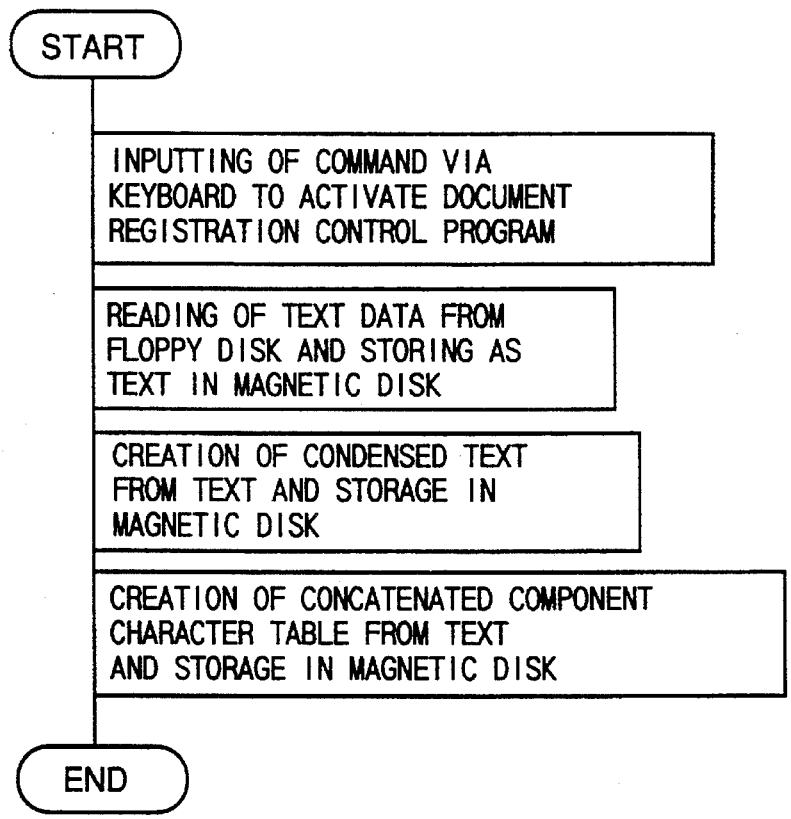
FIG. 38 is a PAD diagram for illustrating a procedure of document registration.
Figure 39:
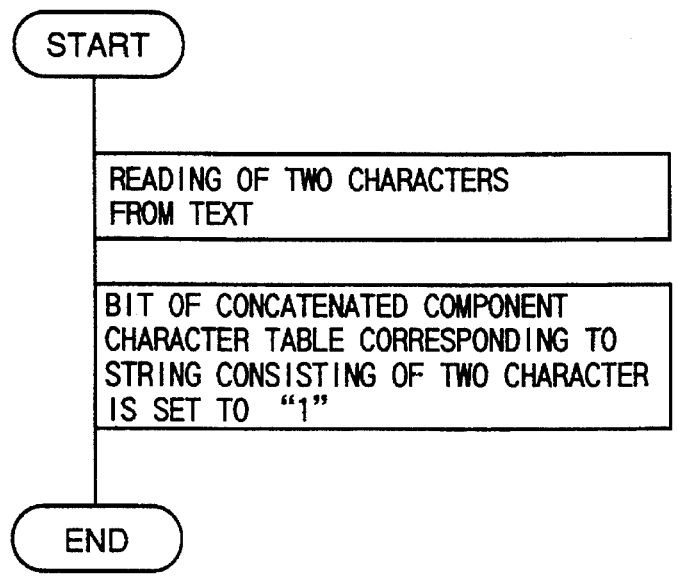
FIG. 39 is a PAD diagram for illustrating a procedure of creating a concatenated component character table of character code dependent type.

Referring to FIG. 37, description will first be made of the fifteenth embodiment of the invention. A document processing system illustrated in this figure comprises a display unit 3700, a keyboard 3701, a central processing unit or CPU 3702, a storage file unit 3710 including a magnetic disk or the like which serves as a storage medium for storing texts 3707, condensed texts 3704 and a concatenated component character table 3705, a floppy-disk driver or FDD 3706 and a main memory 3800. In the figure, a referemce numeral 3707 denotes a floppy disk.

There are stored in the main memory 3800 a document registration control program 3809, a text registration program 3801, a condensed text creation/registration program 3802, a concatenated component character table creation/ registration program 3803, a hierarchical presearch control program 3807, a search query analysis program 3810, a component character table search program 3804, a condensed text search program 3805, and a text body search program 3806. Further, a data area 3808 is secured on the main memory 3800. The programs mentioned above are executed by the CPU 3702 in accordance with commands inputted via the user keyboard 3701.

Upon document registration, a corresponding command is inputted through the keyboard 3701. In response to the command, the document registration control program 3809 is activated, which in turn activates firstly the text registration program 3801 for thereby fetching document data from the floppy disk 3707 placed in the floppy-disk driver 3706 to allow the fetched document data to be stored in the storage file 3710 as the text data 3703. In this conjunction, it should be mentioned that the invention is never limited to the inputting of text data by using the floppy disk. The present invention can equally be applied to such arrangement in which the data is loaded from other apparatus or system via a communication line or the like circuits. Subsequently, the document registration control program 3809 activates the condensed text creation/registration program 3802 to decompose the text 3703 into fragmental character strings at a word level and check mutual inclusion relations possibly existing among the character strings resulting from the decomposition to thereby eliminate those character strings which are included or covered by other character strings, as a result of which there is created a condensed text composed of a set of those character strings which bear no inclusion relation to one another. The condensed text 3704 thus created is stored in the storage file 3710. Finally, the document registration control program 3809 activates the concatenated component character table creation/registration program 3802 to thereby create or prepare a component character table 3705 in which character strings including a predetermined number n of characters and used in the text 3703 are collected without duplication. The component character table 3705 thus prepared is then stored in the storage file 3710 as the concatenated component character table 3705.

In the document retrieval operation, a search query statement is inputted via the keyboard 3701 and furnished to the CPU 3702 which responds thereto by activating first the hierarchical prosearch control program 3807, which is then followed by sequential activations and executions of the search query analysis program 3810, the component character table search program 3804, the condensed text search program 3805 and the text body search program 3806 in this order under the control of the hierarchical prosearch control program 3807.

More specifically, upon execution of the component character table search, a search term given by the inputted search query statement is split to fragmental character strings each of n characters, whereon only the document or text that contains all the character strings constituting the search term are extracted. Next, the condensed texts which correspond to the documents extracted through the component character table search are consulted to thereby extract the document which contains the given search term. In case the given search query statement designates only a single search term of only a logical relation among a plurality of search terms and unless it designates positional relation of the search terms in the text, the search processing then comes to an end by outputting the result of the condensed text search as the result of the document retrieval. In contrast, in other cases where the positional relation(s) among a plurality of search terms in the text is designated by the given search query statement, the text data corresponding to the documents extracted through the condensed text search are checked to thereby extract only the text data which contains the given search term and which satisfies the condition concerning the positional relation imposed on the search terms. The text data thus extracted is outputted as the result of the retrieval processing. As the conditions concerning the positional relation of the search terms, there may be mentioned a proximity condition exemplified by "ニュータ" [8C] "コンピュータ" which commands "search a document in which "ニュータ" and "コンピュータ" occurs in such proximity in which these terms are distanced from each other by no more than ten characters and a contextual condition exemplified by "ニュータ" [S] "コンピ

"ユ-ク" meaning "search a document in which the terms "ニュ-ロ" and "コンピュ-ク" occur concurrently in a same sentence".

The above is an outline of the full text retrieval system according to the fifteenth embodiment of the invention.

In the following, description will be made generally of registration and search processings involved in of the concatenated component character table search according to the instant embodiment on the assumption that the length n of the character string in the concatenated component character table is equal to "2". (In the description of other the embodiments which follows, same assumption is adopted.)

At first, it should be mentioned that creation of the concatenated component character table is automatically effectuated by executing the concatenated component character creation/registration program which is activated by the document registration control program upon registration of document.

The concatenated component character table is created on the basis of the text data. To this end, presence/absence of character strings appearing in the text and each composed of two characters is represented by one-bit information. In the case of a document #1 illustrated in FIG. 40, for example, a bit "1" is set for "オン" while "0" is set for "イオ". Similarly, "251" is allocated with the bit "1". In this manner, the character strings in the concatenated component character table are assigned or allocated with the bit "1" or "0" in dependence on whether the relevant character string occurs in the text or not.

In this manner, the concatenated component character table is automatically created upon registration of document to thereby make preparation for execution of the hierarchical presearch in the retrieval processing.

Next, description will be turned to the search or retrieving method.

When a search query statement is inputted via the keyboard, the hierarchical presearch control program 3807 is activated, as a result of which the search query analysis program 3810 is executed at First. In succession, the component character table search program 3804 is activated, whereby the concatenated character component table is consulted for thereby enabling selection of the character strings in the character component table which correspond to all the character strings contained in the search term and which are affixed with "1s". Subsequently, the condensed text search program 3805 is activated, whereby condensed texts of the documents selected through the component character table search are checked to select the documents which contain the search term given by the input search query statement. Finally, through the text body search, a text containing the search term appearing at the position meeting the search query statement is found out.

Figure 41:
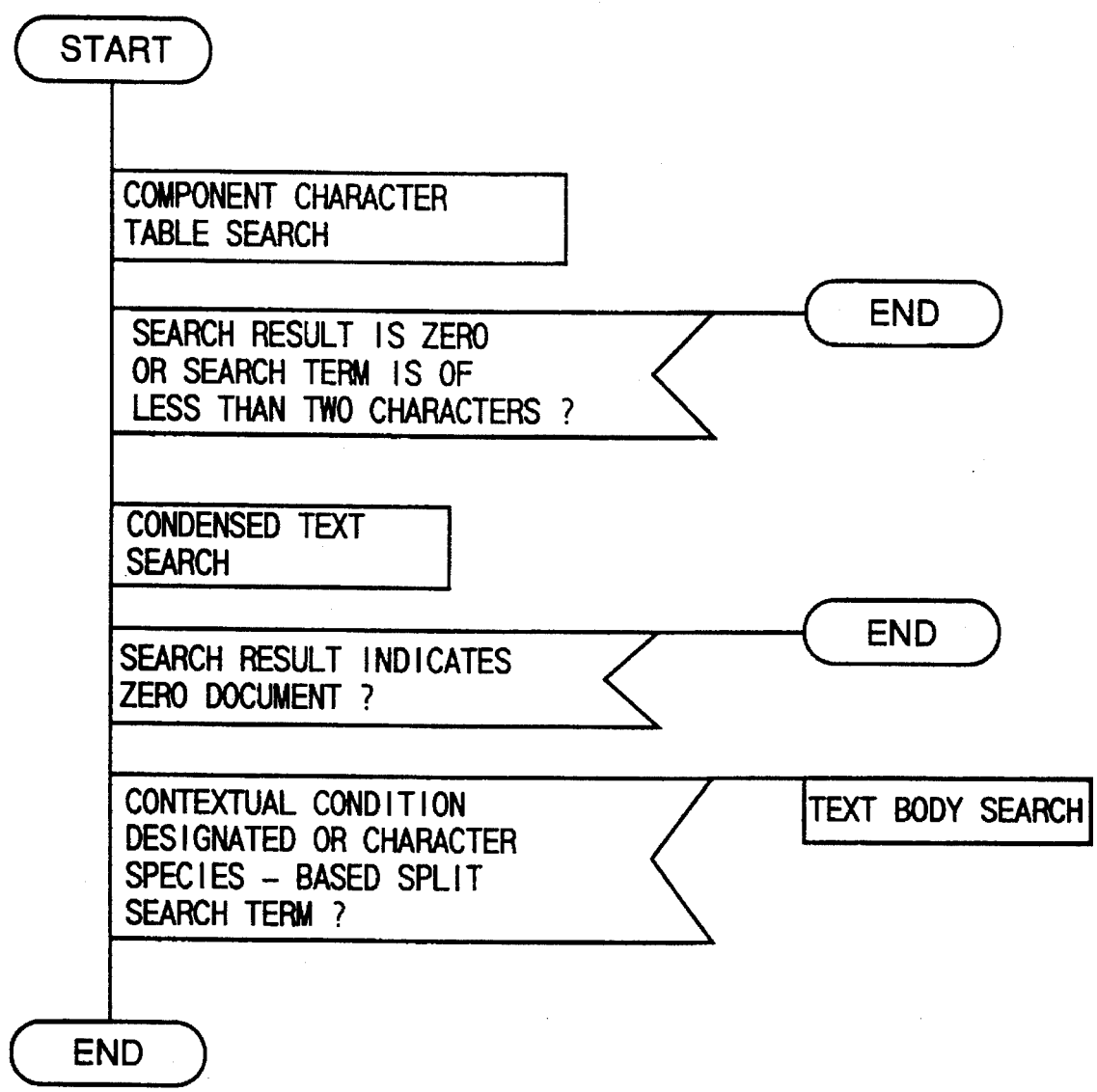
FIG. 41 is a PAD diagram showing a control procedure of a hierarchical search.

Referring to a PAD diagram of FIG. 41, description will now be made of the hierarchical presearch control procedure according to the instant embodiment. At first, the component character table search is performed by using character strings contained in the search term. When the number of results of the component character table search is zero, the retrieval result of zero is outputted, whereupon the document retrieval is ended. Further, when the search term contains no more than one character, the result of the component character table search is outputted, whereupon the document retrieval processing equally comes to an end.

In the case where the search term is composed of two or more characters and unless the result of the component character table search is zero, the condensed text search is then performed. In this conjunction, if the result of the condensed text search is zero, the retrieval result of zero is outputted, whereon the document retrieval processing is terminated. So far as the proximity condition or contextual condition is designated or only when the search term susceptible to splitting on the basis of the character species such as "インサ, イダ-, 取引(combination of katakana and kanji character strings)" is presented, the text body search is conducted. Otherwise, the hierarchical presearch is completed by outputting the result of the condensed text search as the document retrieval result.

Now, description will be made in detail of a method of creating a component character table (which may be referred to as the character code dependent type concatenated component character table) and a control procedure for the component character table search executed by using the abovementioned table.

At first, description will be directed to the method of creating the character-code dependent type concatenated component character table used in the instant embodiment.

As is illustrated in FIG. 42, the character-code dependent type concatenated component character table is so prepared as to express concatenated characters in terms of a string of character codes. In the case of the example shown in FIG. 42, it is assumed that the shift JIS code system is adopted although only for the illustrative purpose. In this figure, "(XXXXXXXX)H represents a character code for a first character by two MSBs (more significant bytes) in the hexadecimal notation while representing a character code of a second character by two LSBs (less significant bytes). For giving an indication that a character string "経済(where "経" is represented by "8C6F" with "済" represented by "8DCF")" exists in a text of a document #1, a bit "1" is set at the position (8C6F8DCF)H in a bit list for the document #1. For convenience of description, the bit position corresponding to a given character string of concern will be referred to as the entry ID number of the component character table. Thus, the entry ID number of "経済", for example, is given by "(8C6F8DCF)H" or "2,356,121,039" in the decimal notation.

Figure 43:
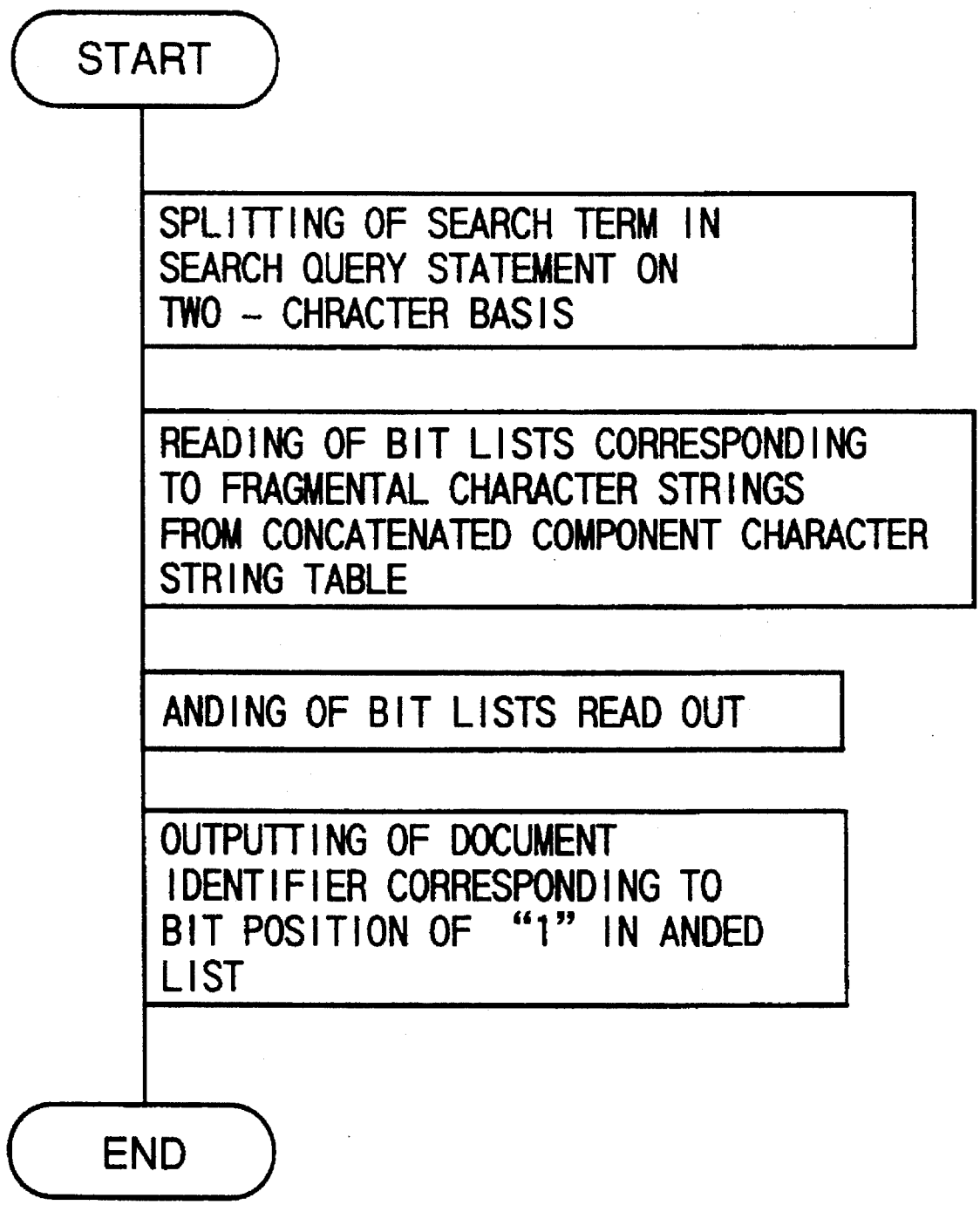
FIG. 43 is a PAD diagram for illustrating a procedure of searching the character code dependent type concatenated component character table.
Figure 44:
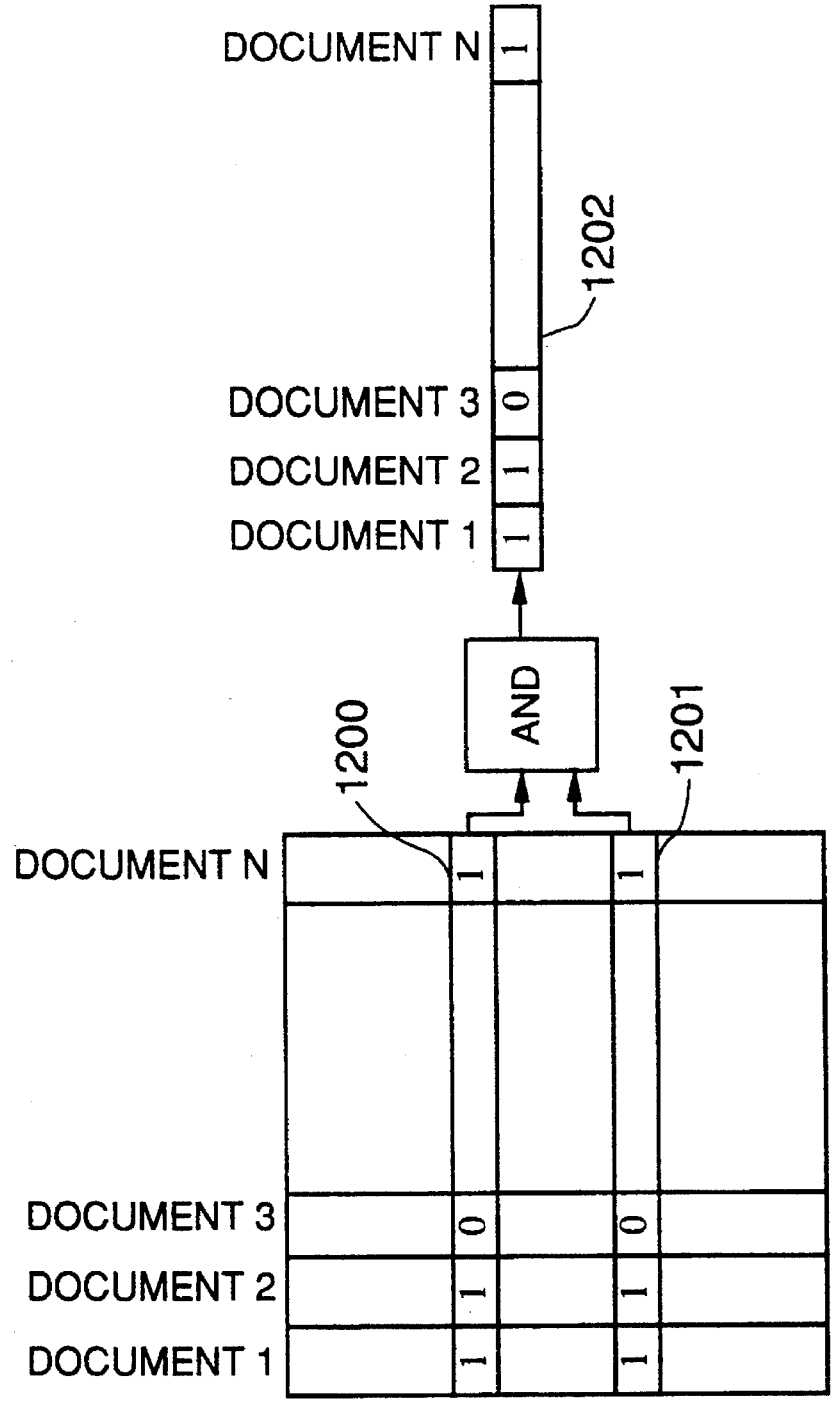
FIG. 44 is a view for illustrating schematically a component character table search.

By using the concatenated component character table described above, the hierarchical presearch control and the text retrieving operation are carried out in the manner which will be described below by reference to FIG. 43. At first, the search term designated by the search query statement is split into two-character strings (i.e. character strings each consisting of two characters), respectively, whereon the bit list is read out from the concatenated component character table for each of the character strings. The bit lists as read out are then logically ANDed. In this case, such a document is determined which has a bit list in which all the positions of the entry ID numbers in the bit list corresponding to the character codes constituting the given search term and the combination of the character codes are allocated with "1s", respectively. By way of example, when a character string "ライオン" is given as the search term, such a document in which the (83898343)H-th bit and the (83498393)H-th bit in the bit lists which correspond to "ライ" and "オン", respectively, are all "1" is outputted as the result of the concatenated component character search, as shown in FIG. 44. More specifically, the bit list 1200 of the entry number ID "(83898343)H" indicating "ライ" and the bit list 1201 of the entry ID number "(83498393)H" indicating "オン" are logically ANDed on the bit-by-bit basis, to thereby obtain the result 1202 of the AND operation, as is illustrated in FIG. 44. The result 1202 of the bit ANDing operation represents the document having the corresponding bit positions of "1" in the bit lists as the hit document resulting from the concatenated component character table search. In other words, the document or documents containing both "ラ イ" and "オ ン" are extracted.

For a search term composed of two characters and having a same length as the concatenated character strings such as "ね こ", the result of the concatenated component character table search can be outputted intact as the result of the document retrieval.

Further, for a search term containing no more than one character such as "誠", the component character table is created on a one-character basis for executing the component character table search in the same manner, as described hereinbefore.

As will be appreciated from the above description, the concatenated component character table search according to the instant embodiment can increase the retrieval speed as a whole for thereby making it possible to carry out a full document retrieval on a large amount of document data by virtue of preliminary registration of character arrays or sets each composed of two characters upon document registration to thereby reduce the amount of condensed texts to be retrieved in the hierarchical presearch procedure. Although it has been described in conjunction with the instant embodiment that the concatenated component character table is composed of character strings coupled together on a two-character basis, it will readily be understood that the table may be prepared on a three or more character basis for allowing similar component character table search.

Figure 45:
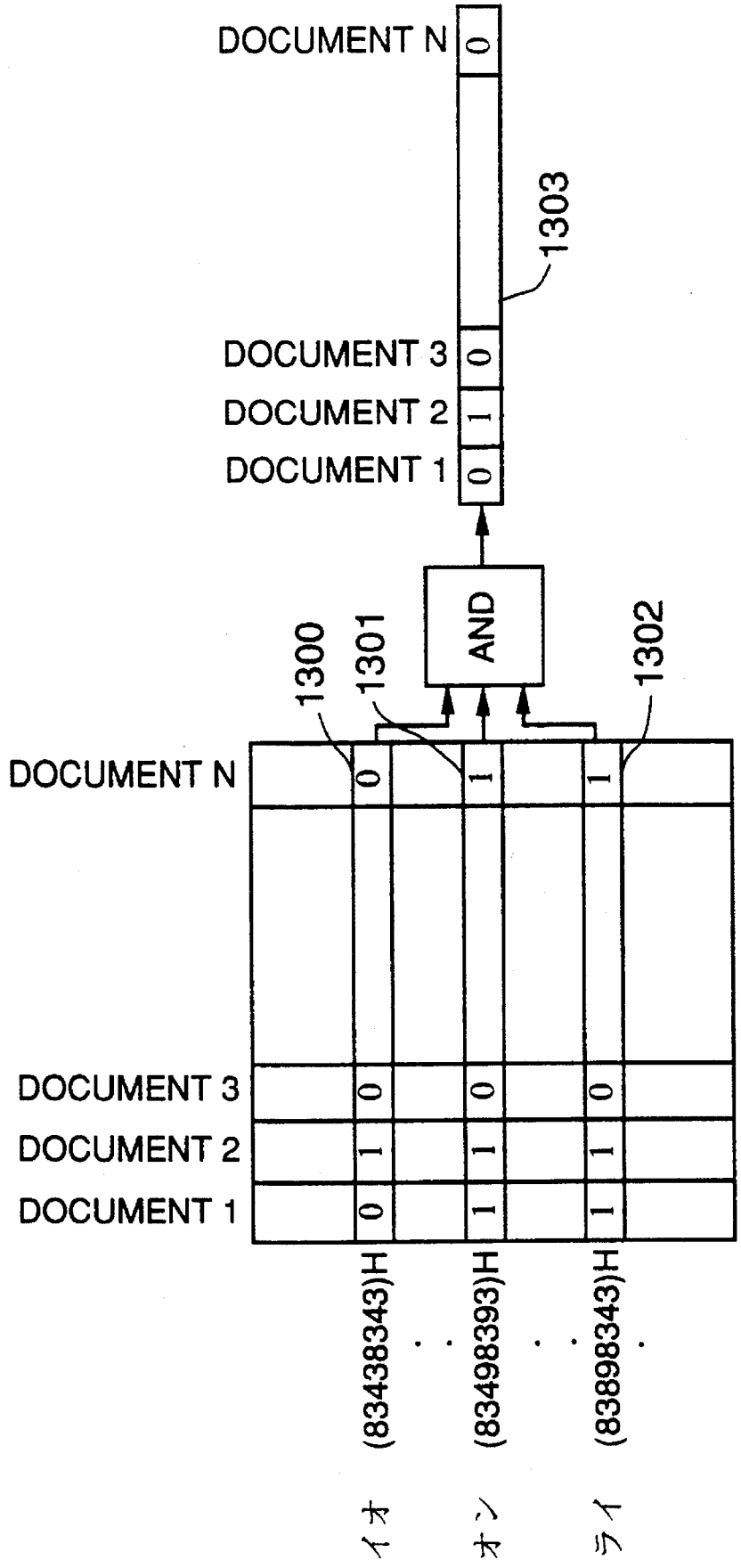
FIG. 45 is a view showing schematically a general concept underlying the component character table search effected by using duplicative character strings according to a sixteenth embodiment of the invention.

Next, by reference to FIG. 45, a sixteenth embodiment of the invention which is directed to a full document retrieval method capable of enhancing the document screening or reduction ratio in the concatenated component character table search by permitting duplication in the splitting of the search term.

By way of example, it is again assumed that a search query statement or search term "ラ イ オ, ン" is given. Then, the concatenated component character table search is executed in a first step. In the case of the fifteenth embodiment of the invention described above, the given search term is split into character strings each composed of two characters which are not duplicate with one another, whereon the document containing all of these character strings is outputted as the result of the concatenated component character table search. In the case of the search query statement or search term reading, for example, "ラ イ オ, ン", the term is divided into a pair of two-character strings of "ラ イ" and "オ ン", respectively, whereon the document containing these character strings is searched by logically ANDing them, as exemplified by "ラ イ" AND "オ ン"'

However, with the document search method mentioned above, there will be contained in the retrieval result such a document which contains "ラ イ" and "オ ン" and additionally even a document which does not contain "イ オ".

In order to eliminate such search noise, it is proposed according to the teaching of the invention incarnated in the sixteenth embodiment to split a given search term into character strings each composed of two characters which exist duplicatively in the character strings resulting from the splitting, whereon the document containing all the character strings is searched. In more concrete, for the search term "ラ イ オ, ン", it is split into three character strings "ラ イ", "イ オ" and "オ ン", as is illustrated in FIG. 45. Then, these character strings are logically ANDed. Namely, "ラ イ" AND "イ オ" AND "オ ン" Thus, the document containing no "イ オ" but "ラ イ" and "オ ン" can be excluded from the result of the concatenated component character table search. In this manner, a high document screening or reduction ratio can be attained in the concatenated component character table search.

As will be appreciated from the above description, according to the teaching of the invention incarnated in the sixteenth embodiment that the search term is split into duplicative character strings, it is possible to discard an increased number of documents irrelevant to the search term in the condensed character table search, whereby the full document retrieval can be realized with an increased processing speed than in the case of the fifteenth embodiment.

Figure 46:
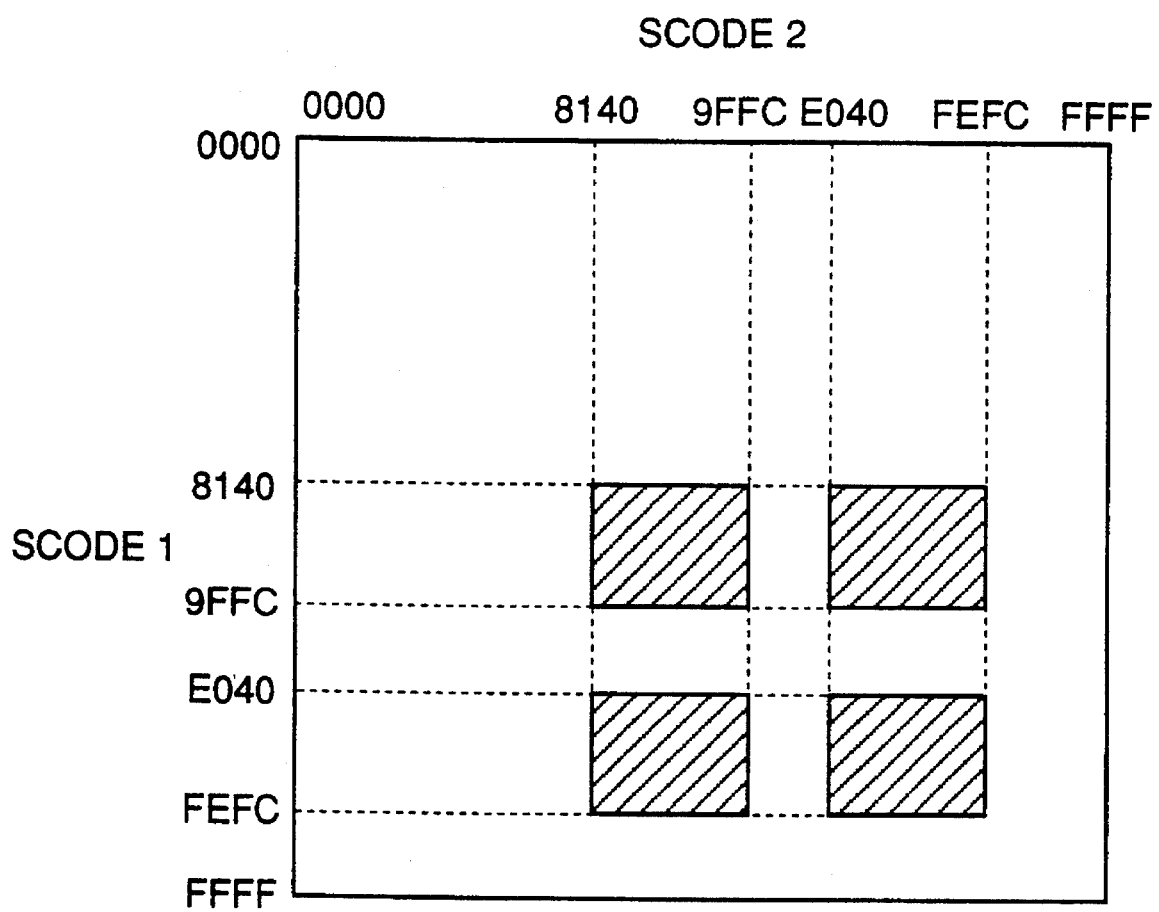
FIG. 46 is a view showing entries of no use in the character code dependent type concatenated component character table.
Figure 47:
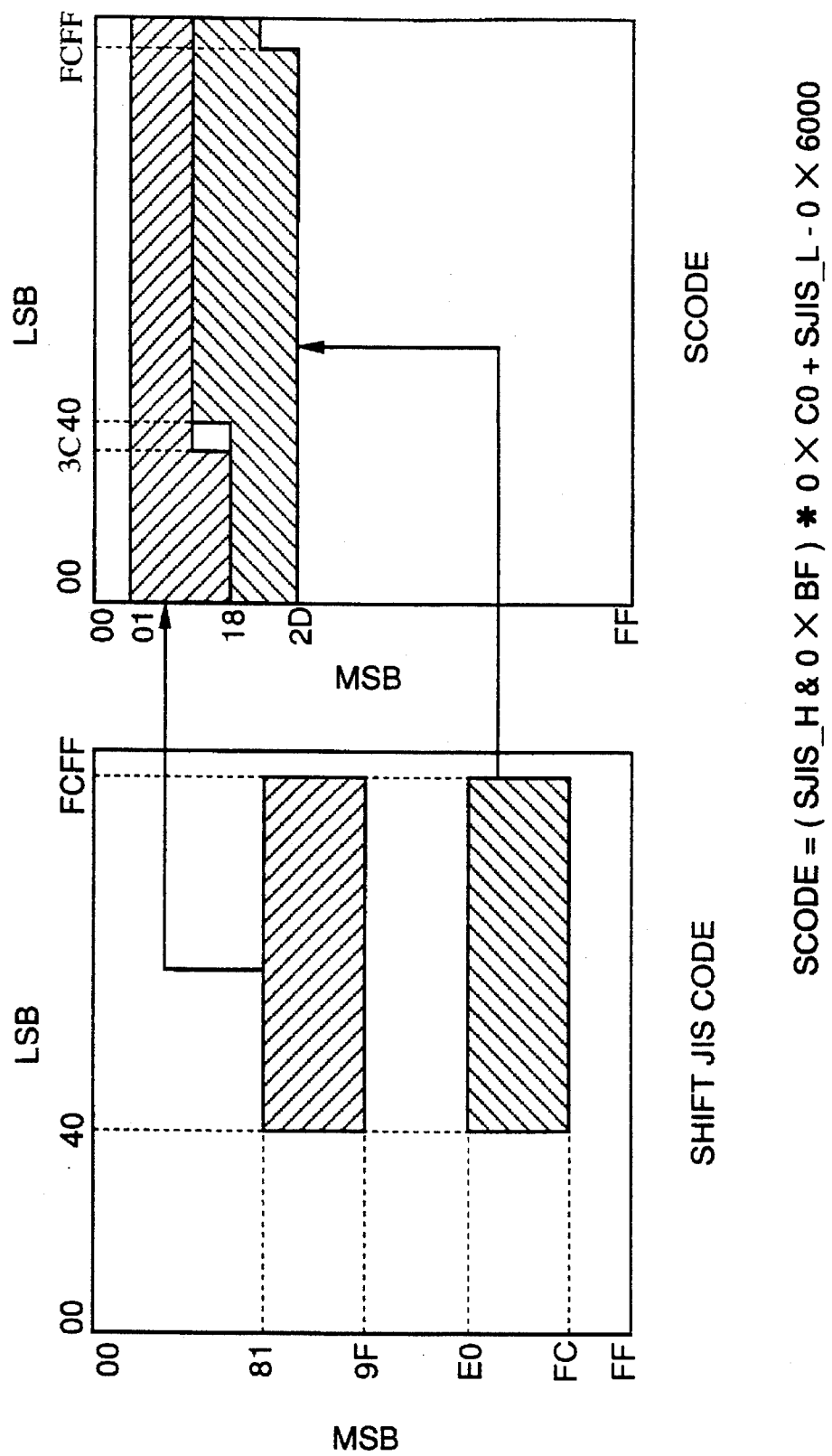
FIG. 47 is a view for illustrating a code transformation processing of a component character table according to a seventeenth embodiment of the invention.

A seventeenth embodiment of the invention will next be described. With this embodiment, it is intended to reduce the capacity of the concatenated component character table used in the document retrieval system according to the fifteenth embodiment of the invention. More specifically, although the character-code dependent type component character table used in the fifteenth embodiment can afford a simplified and facilitated processing, it suffers from a problem that the table size is relatively large because of a great length of the bit list for each document. Besides, since the entry number is allocated nevertheless of absence of a relevant character code or set of character codes, the concatenated component character table has not a few useless areas or locations, giving rise to another problem. In the case of the shift JIS code system, for example, there exist no character codes relevant to the entry ID numbers lying between (0000)H and (8140)H and between (A000)H and (E040)H, i.e. in the ranges from the zeroth to 33087-th entry numbers and from the 40960-th to 57408-th entry numbers, respectively, as is illustrated in FIG. 47. Notwithstanding of this, the component character table must have these areas for the entries because the entry ID numbers are determined in dependence on the character codes. In the case of the concatenated character component table prepared on the two-character basis, all the entries corresponding to blank areas shown in FIG. 46 are of no use.

According to the teaching of the invention incarnated in the seventeenth embodiment, it is proposed with a view to eliminating the useless areas in the bit lists that the concatenated character component character table is created such that the bit positions or locations starting from the zeroth bit position can be used without involving any gap or blank (space) between the adjacent bit positions by resorting to a character code transformation technique. This concatenated component character table will be referred to as the character code transformation type concatenated component character table. The text retrieval system in which the character code transformation type concatenated component character table is employed will be described below in detail.

As an example of the character code transformation expression for creating the character code transformation type component character table, there may be mentioned the following one.

$$SCODE=(SJIS\_H \ \& \ 0xBF) \ X \ 0xC0+SJIS\_L-0x6000 \qquad (17\text{-}1)$$

In the above expression, "SJIS_H" represents one MSB (more significant byte) of the original shift JIS code with SJIS_L representing one LSB thereof, and "SCODE" representing character codes undergone the transformation. In this conjunction, it should be mentioned that KEIS code system or other code system for which correspondence can be established with the shift JIS code system can equally be transformed to the SCODE system in accordance with an expression similar to the abovementioned one. FIG. 45 shows the transformation in accordance with the expression (17-1) in terms of a character code table. As will be seen also from FIG. 45, the character codes disposed between (0000)H and (FFFF)H, being distributed as (8140)H to (9FFC)H and
(E040)H to (FFFC)H are so transformed as to be disposed without any intervening space, starting from the character code (0000)H.

By virtue of the code transformation in accordance with the expression (17-1), the length of the bit list can remarkably be shortened, as will be seen in FIG. 48, which in turn means that the whole concatenated component character table can be reduced to an extremely small capacity.

Figure 49:
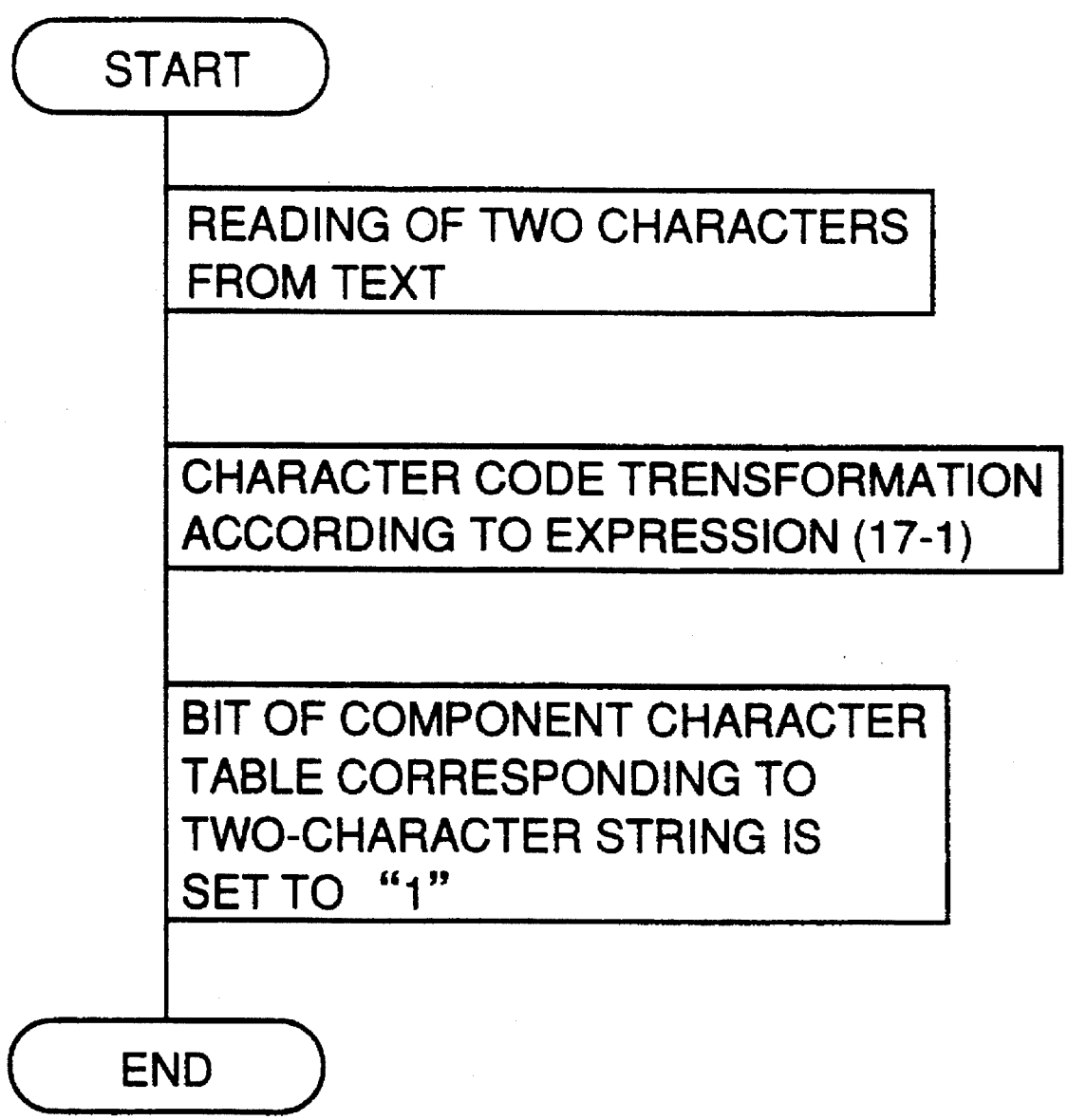
FIG. 49 is a PAD diagram showing a procedure for creating the character code transformation type concatenated component character table.

For creating the character code transformation type concatenated component character table, two concatenated or adjacent characters are read out from the text as in the case of the character code dependent type table, as is illustrated in FIG. 49. The character pairs thus read out are then subjected to the character code transformation in accordance with the expression (17-1), whereon "1s" are set for the bits of the code transformation type component character table which correspond to the character pairs, respectively.

Figure 50:
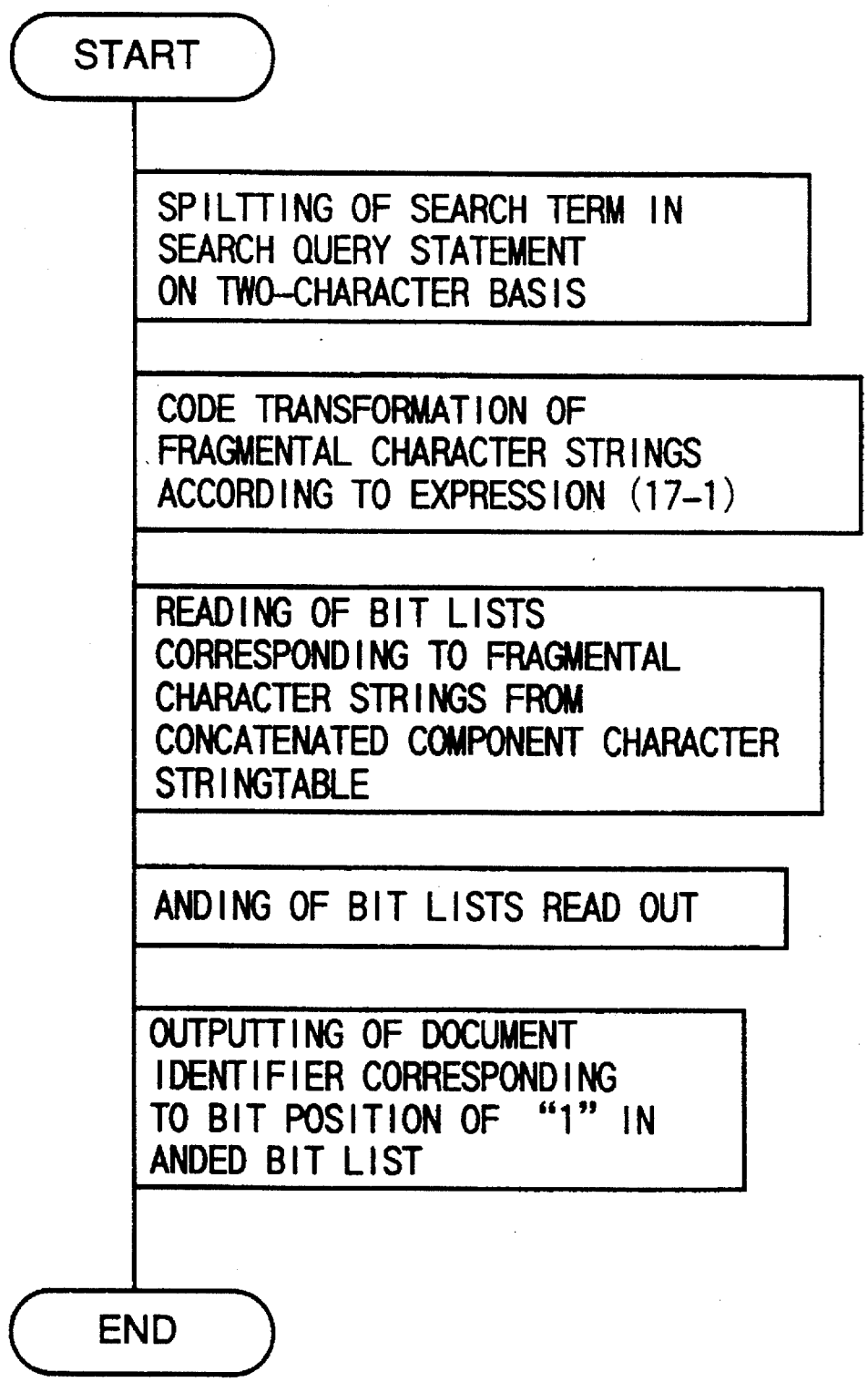
FIG. 50 is a PAD diagram for illustrating a procedure of searching the character code transformation type concatenated component character table.

As is shown in FIG. 50, in the search procedure, a search term given in the search query statement is split into pairs of adjacent or concatenated characters, whereon the character pairs are subjected to the character code transformation in accordance with the expression (17-1). The bit lists are subsequently read out from the concatenated component character table for every split character strings and logically ANDed on the bit-by-bit basis.

The control for the hierarchical presearch is identical with that described hereinbefore in conjunction with the fifteenth embodiment of the invention except that all the inputted search terms have undergone the character code transformation processing in accordance with the expression (17-1) in the concatenated component character table search. Namely, the control procedure illustrated in FIG. 41 is employed without any modification to carry out first the concatenated component character table search by using the character strings contained in the search term, which is then followed by the condensed text search by using the search term(s). Unless the contextual condition is given, the result of the condensed text search is outputted as the result of the retrieval, whereupon the document retrieval processing is completed. On the other hand, when the contextual condition is designated, the text body search is performed as the third search step, whereon the result of the text body search is outputted as the document retrieval result.

The teaching of the present invention directed to the use of the character code transformation type concatenated component character table for reducing the table capacity will be apparent from the above description made on the seventeenth embodiment of the invention. Namely, according to the teaching of the invention incarnated in the seventeenth embodiment, the concatenated component character table is created by arraying the character codes undergone the code transformation at the bit positions starting from the zeroth bit without any intervening space, whereby the entries in the concatenated component character table to which no character codes are allocated can be eliminated, providing an advantage that the concatenated component character table can be prepared with a remarkably reduced capacity.

Now, description will be made of an eighteenth embodiment of the invention with which it is intended to further reduce the capacity of the concatenated component character table obtained through the procedure described above in connection with the seventeenth embodiment by adopting a hashing method.

With a view to decreasing the capacity of the concatenated component character table created according to the seventeenth embodiment, it is contemplated with the eighteenth embodiment of the invention to allocate a plurality of characters or character strings to a single entry in the bit list. More specifically, there is adopted a method for establishing correspondences between the character strings contained in the search term and the bit positions in the bit list by using a hash function. The hash function to this end may be expressed as follows.

$$h((SCODE1)(SCODE2)) = mod((SCODE1)(SCODE2), N) \quad (18\text{-}1)$$

where "SCODE1" represents a first character code resulting from the code transformation of the shift JIS in accordance with the expression (17-1) mentioned hereinbefore, and SCODE2 represents a second character code resulting from B transformation of the shift JIS. Further, "mod" represents a function used for outputting a residue resulting from division of a first argument by a second argument, and "N" represents a given integer value. Assuming, for example, that "4096" is used as the value of N, "する("do" in English)" is allocated with the entry ID number of "618".

Figure 51:
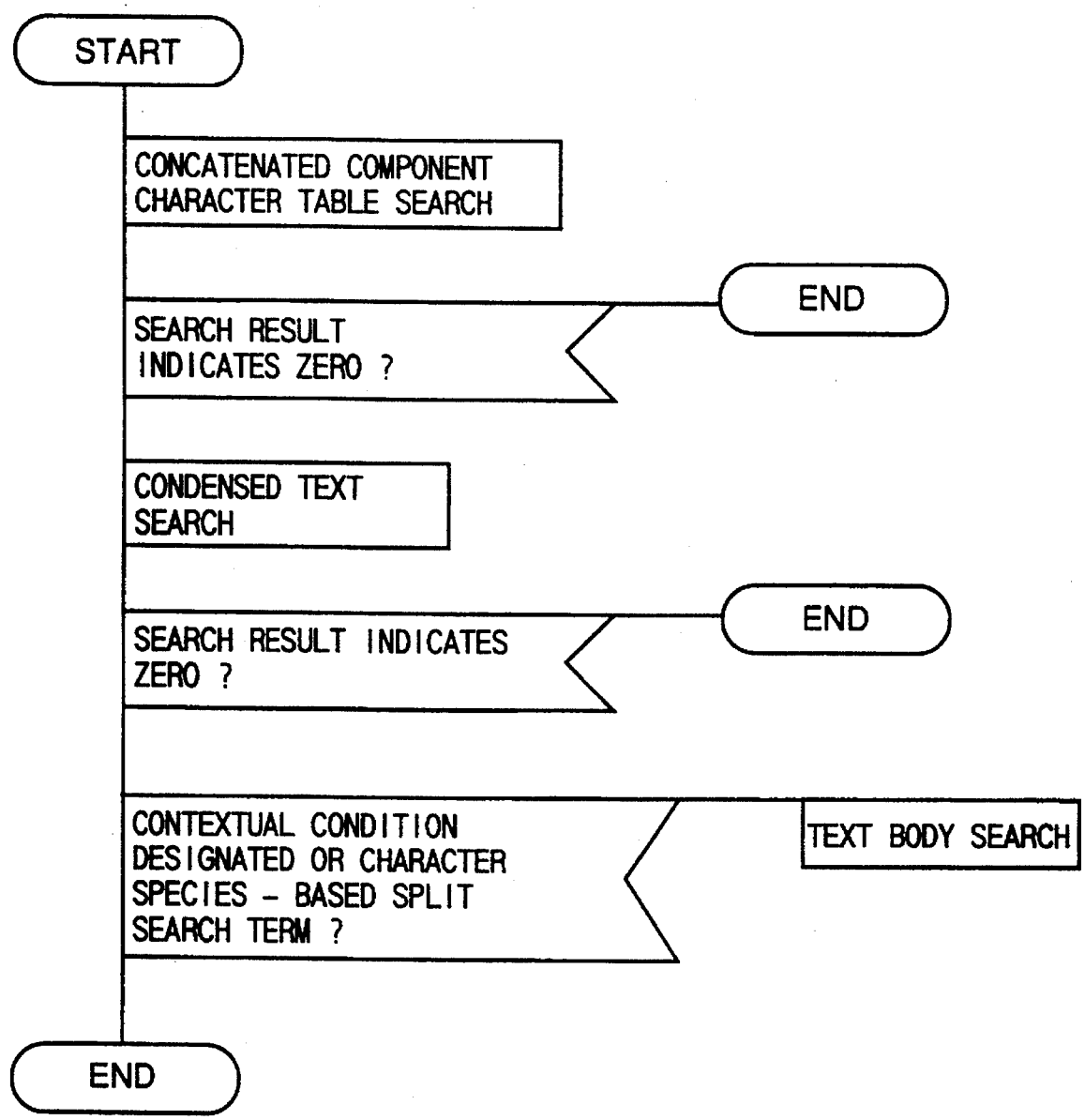
FIG. 51 is a PAD diagram for illustrating a hierarchical search control procedure executed by using a hashing type concatenated component character table.

Next, referring to FIG. 51, the retrieval procedure according to the instant embodiment will be described. It should be recalled that in the case of the fifteenth embodiment of the invention, when the search term consists of two characters, the hierarchical presearch is completed after the concatenated component character table search by outputting the result thereof. In contrast, in the case of the instant embodiment of the invention, it is necessary to carry out consecutively the hierarchical presearch up to the condensed text search inclusive, because of the possibility of generation of search noise in the component character table search performed on the concatenated component character table employed in the instant embodiment. By way of example, a hiragana string "そこ" which is represented by (82BB82B1)H according to the shift JIS code system is allocated with the entry ID number "561" in accordance with the expression (18-1). In this conjunction, it is noted that a kanji character string "行列" which is represented by a shift JIS code "(8D7387F1)H" is also allocated with the same entry ID number "561". This means that when the kanji character string "行列" is designated as a search term those documents which contain the hiragana character string "そこ" will also be outputted as the retrieval result of the component character table search. Such being the circumstances, it becomes necessary to scan the condensed texts for thereby extracting the document containing actually the kanji character string "行列" and outputting the document as that retrieval result.

Figure 52:
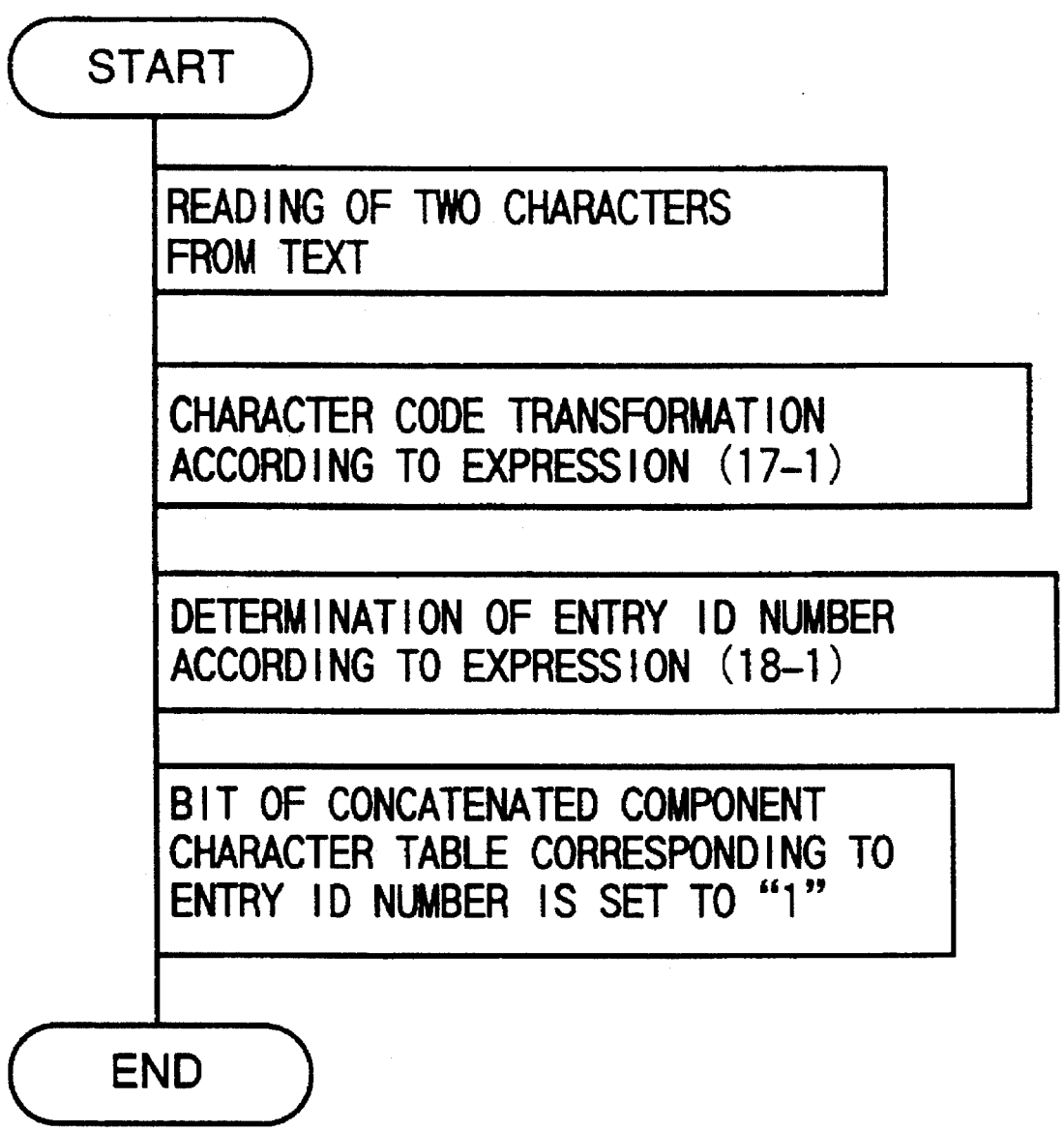
FIG. 52 is a PAD diagram for illustrating a procedure of creating a hash type concatenated component character table according to an eighteenth embodiment of the invention.

Now referring to FIG. 52, description will be made of a procedure for creating the concatenated component character table used in the instant embodiment. At first, a pair of adjacent characters is read out from the text and subjected to the character code transformation in accordance with the expression (17-1), as described hereinbefore in connection with the creation of the character code transformation type character table. From the character code resulting from this transformation, the entry ID number for the paired characters is obtained, and "1" is set for the bit of the concatenated component character table which corresponds to the abovementioned entry ID number.

Figure 54:
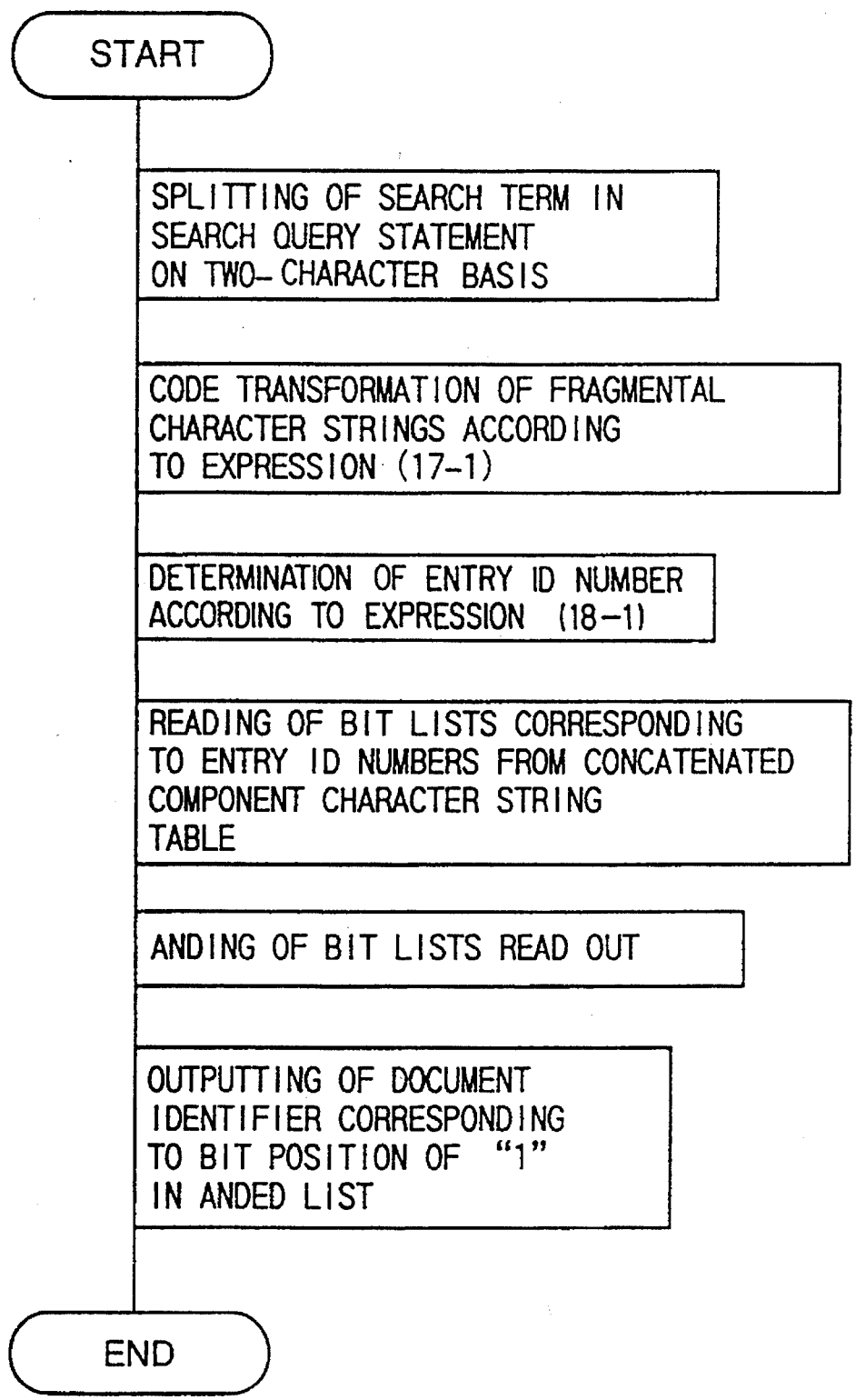
FIG. 54 is a PAD diagram for illustrating a procedure of searching a hashing type concatenated component character table.

An example of the concatenated component character table created in this manner is illustrated in FIG. 53. In the case of this example, N is set to be "4096" in accordance with the expression (18-1). It will be understood that no more than 4096 bits are required for registration of one document. Upon retrieval, the entry numbers are determined for every character of a given search term by using the hash function represented by the expression (18-1) and then reference is made to the corresponding bit positions in the concatenated component character table. In the case of a character string of "ライオン", for example, a document for which all the bits at the positions indicated by the entry ID numbers "643", "646" and "723" corresponding to "ライ", "イオ" and "オン", respectively, are "1", as shown in FIG. 53, is outputted as the result of the component character table search. In the search procedure, each of the search terms designated in the search query statement is split into pairs of adjacent or concatenated characters, respectively, which ape then subjected to the character code transformation in accordance with the expression (17-1), whereon the entry ID numbers are determined in accordance with the expression (18-1), as is illustrated in FIG. 54. Then, the bit lists are read out from the concatenated component character table for every entry ID number and subjected to the bit-based AND operation. Subsequently, the condensed text search is performed for the document determined through the concatenated component character table search procedure.

It will be understood that with the eighteenth embodiment of the invention, the capacity of the concatenated component character table can remarkably reduced to an advantage by virtue of such arrangement that a plurality of characters or character strings ape allocated to each of the entries of the table by using the hash function.

Next, a nineteenth embodiment of the present invention will be described.

In the case of such simple hashing as described above in conjunction with the eighteenth embodiment, both the character string which is likely to make frequent appearance in a document such as the hiragana characters and the character string which makes rare appearance in the document such as the kanji characters may possibly be allocated with a same entry ID number. By way of example, a hiragana character string "そこ" and a kanji character string "行列" are allocated with a same entry ID number "561". Accordingly, when the kanji character string "行列" is given as the search term, all the document containing the hiragana character string "そこ" will be hit in the course of the component character table search. In reality, substantially all the documents will possibly be hit in the concatenated component character table search since the hiragana character string "そこ" is one of the character strings which are used at a relatively high frequency in the documents written in Japanese. As a consequence, the ratio of screening or reducing the number of documents in the concatenated component character table search will be lowered, and the amount of the documents to be scanned in the condensed text search processing is correspondingly increased, presenting a problem that the time demanded for the whole retrieval processing increases ultimately.

Figure 56:
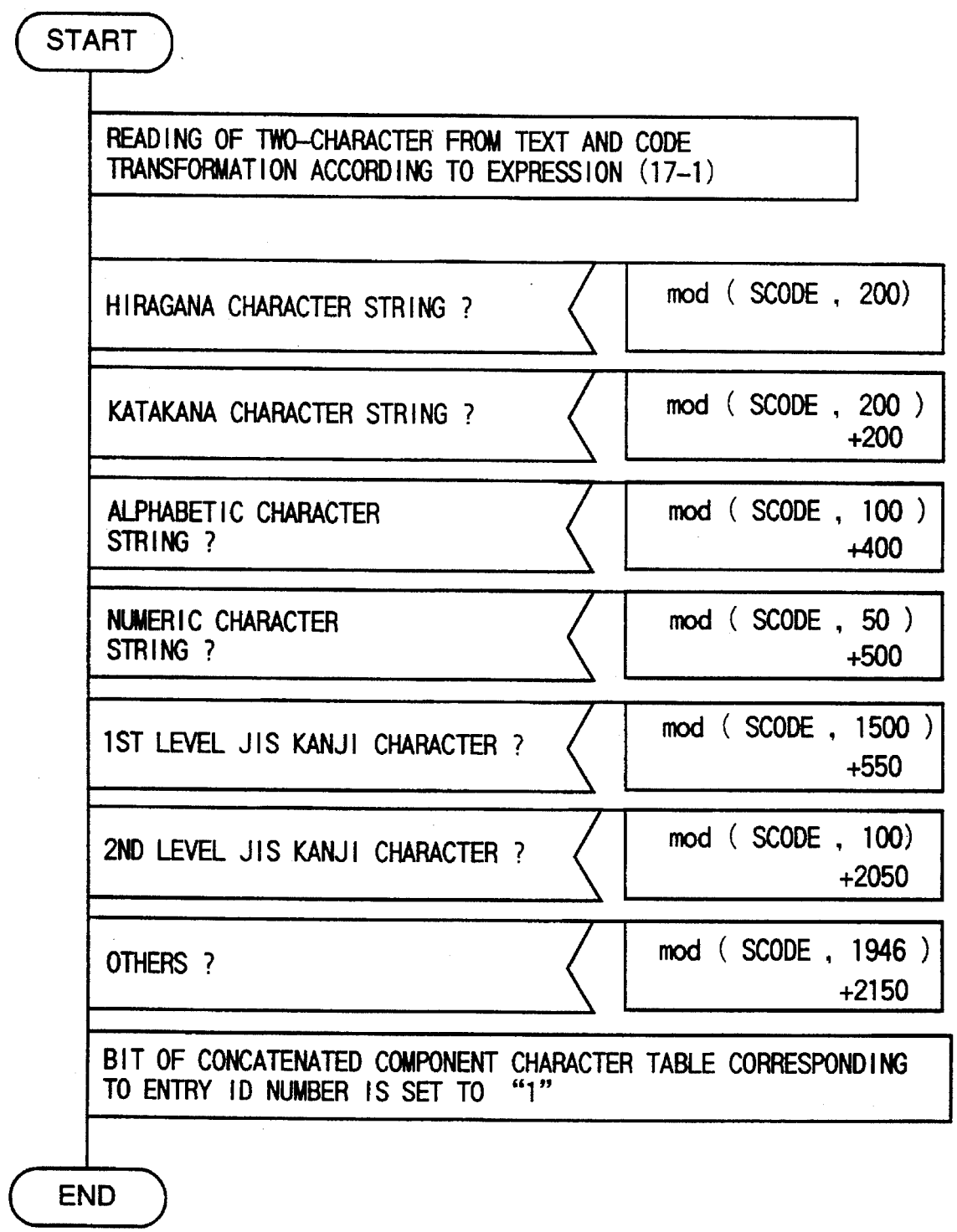
FIG. 56 is a PAD diagram for illustrating a procedure of creating the character-species-based hashing type concatenated component character table.

In order to prevent the document reduction ratio from being lowered in the concatenated component character table search, it is necessary to define the hash function by taking into consideration the frequencies at which character strings are used. In the following description directed to the nineteenth embodiment of the invention, the concatenated component character table as used will be referred to as the character-species-dependent hashing type component character table. For creating the character-species-dependent hashing type component character table, entry areas of a component character table are allocated to the individual character species or types, respectively, whereon such a hash function is prepared which folds at a character code within the area, as is illustrated in FIG. 55. This type of hash function may be realized by determining the character species on the basis of the character code and then folding up by using a "mod" function or by preparing a correspondence table (hereinafter referred to as the hash table) indicating correspondences between the character codes and the entry ID numbers. In the case of the instant embodiment, it is assumed that the entry numbers (i.e. number of entries) of hiragana characters and katakana characters are "200", respectively, the entry number of alphabetic characters is "100", the entry number of the numeric characters is "50", the entry number of the kanji characters belonging to the JIS Kanji character set of first level is "1500", the entry number of kanji characters belonging to the second level JIS Kanji character set is "100", and that the entry number of others is "1946". The kanji characters belonging to the first level JIS kanji character set is imparted with a greater number of entries than the kanji characters of the second level JIS kanji character set because the former are used at a higher frequency than the latter. Referring to FIG. 56 illustrating a procedure for creating the character-species-dependent hashing type component character table, the species or types of the characters constituting an inputted search term are identified on the basis of the character codes obtained from the code transformation described previously, while the entry areas of the component character table allocated to the character types, respectively, are folded up by using the "mod" function defined hereinbefore.

More specifically, when both SCODE1 and SCODE2 are in a range of (021F)H to (0271)H, these SCODEs represent hiragana character strings. Accordingly, values of the mod (SCODE, 200) are determined as the entry ID numbers for hiragana character strings.

When both the SCODE1 and SCODE2 fall within a range of (0280)H to (02D6)H, they represent katakana character strings. Accordingly, mod (SCODE, 200) plus "200" entered at the start of the katakana hashing area are determined as the entry ID numbers for the katakana character strings.

When both SCODE1 and SCODE 2 are within a range of (01E0)H to (021A)H, they represent alphabetic character strings. Accordingly, the mod (SCODE, 100) plus "400" entered at the start of the alphabetic character hashing area are determined to be the entry ID numbers for the alphabetic character strings.

When both SCODE1 and SCODE2 are in a range of (01CF)H to (01D2)H, they represent numeric character strings. Accordingly, mod (SCODE, 50) plus "500" entered at the start of the numerical character hashing area are determined to be the entry ID numbers for the numeric character strings.

When both SCODE1 and SCODE2 fall within a range of (069F)H to (1272)H, they represent kanji character strings belonging to the JIS Kanji character set of first level. Accordingly, mod (SCODE, 1500) plus "550" located at the start of the hashing area allocated to the first level JIS Kanji set are determined as the entry ID numbers for these kanji character strings.

When both SCODE1 and SCODE2 are in a range of (129F)H to (2022)H, they represent kanji characters belonging to the second level JIS Kanji character set. Accordingly, mod (SCODE, 100) plus "2050" entered at the start of the hashing area allocated to the second level JIS Kanji set are determined as the entry ID numbers fop these kanji character strings.

Figure 57:
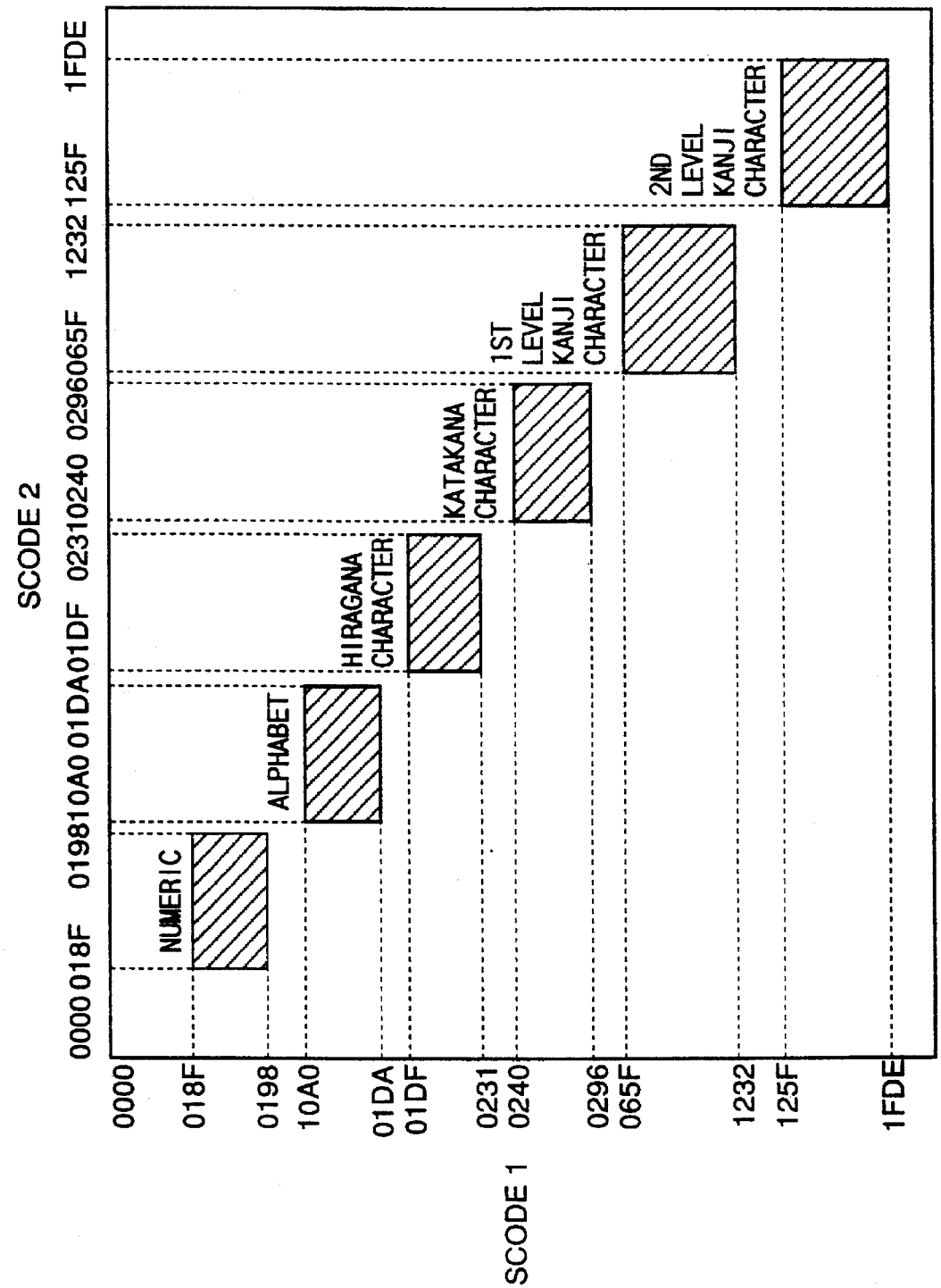
FIG. 57 is a view showing character code ranges of characters of various species.

The code ranges for the abovementioned character species are illustrated in FIG. 57. The codes falling within the blank area in this figure, i.e. the codes other than SCODE1 and SCODE2 ape regarded to represent character strings composed of-combinations of symbols or the other character species. Accordingly, values of mod (SCODE, 1946) PLUS "2150" entered at the start of the hashing area of the symbols are determined to be the entry identifier number for the symbol strings.

Figure 58:
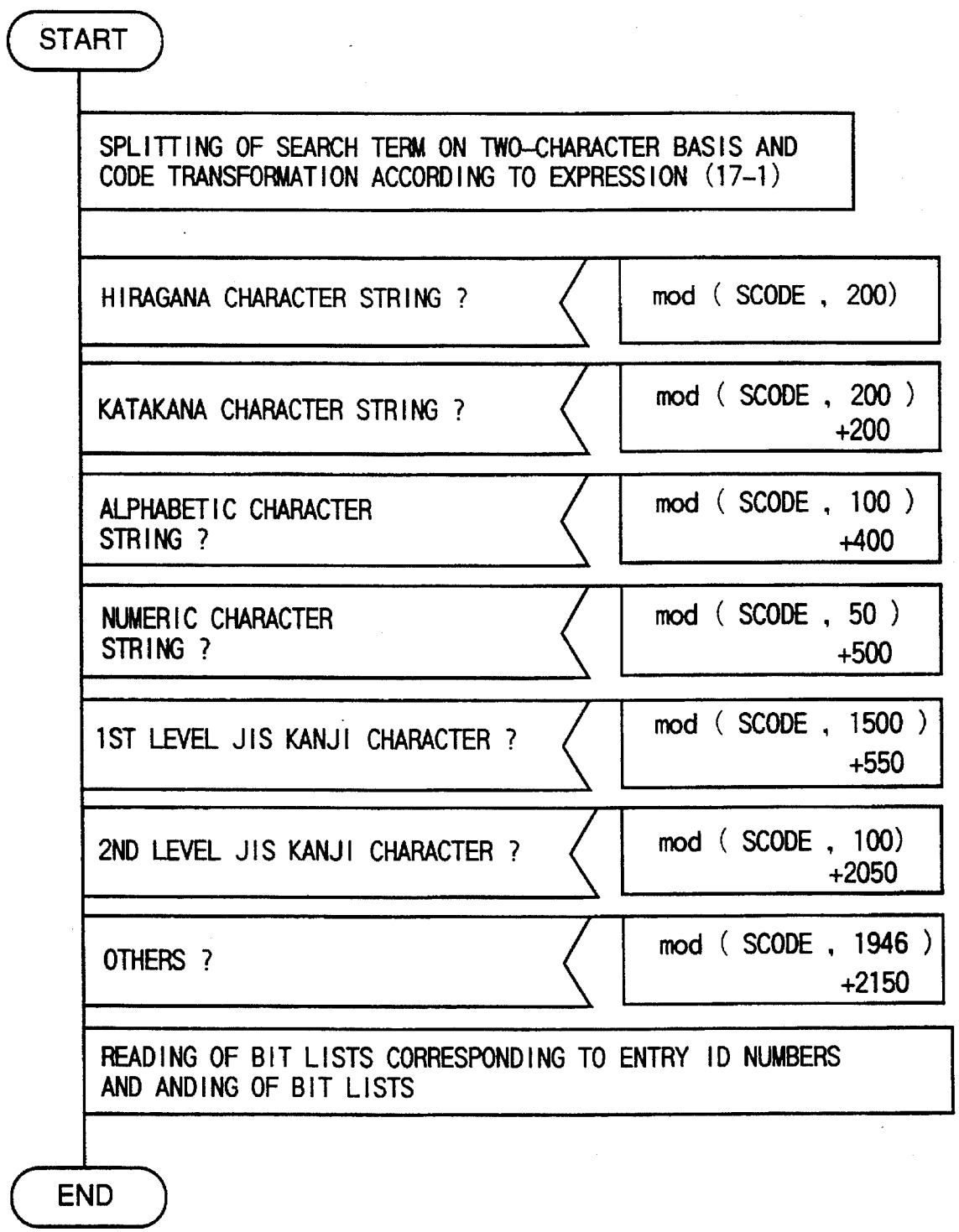
FIG. 58 is a PAD diagram for illustrating a procedure of searching a character-species-based hashing type concatenated component character table.

As is illustrated in FIG. 58, similar character species discrimination is also performed in the search, whereon the bit lists corresponding to the entry ID numbers as determined are logically ANDed.

The hierarchical presearch control procedure performed with the aid of the character-species-dependent hashing type concatenated component character table is identical with the control procedure described hereinbefore in conjunction with the eighteenth embodiment. Namely, the concatenated component character table search is first conducted by using the character string contained in the search term and then the condensed text search is performed by using the search term. Unless the contextual condition and others are imposed, the document retrieval is completed at the end of the condensed text search. Otherwise, the text body search is performed, the result of which is outputted as the document retrieval result.

As will be appreciated from the above description, the nineteenth embodiment of the invention allows the load imposed on the scanning of the documents in the condensed text table search to be reduced, to thereby speed up correspondingly the full document retrieval processing by virtue of the use of the character-species dependent hashing type component character table in which correspondences between the entry ID numbers and the character strings are established in dependence on the character species, respectively, by taking into account the frequencies at which the character strings are used.

A twentieth embodiment of the present invention will now be described in conjunction with a hierarchical presearch control method which is carried out by using a frequency-information-based hashing type concatenated component character table and which is capable of enhancing the screening ratio in the concatenated component character table search and hence reducing the load imposed on the document scanning in the condensed text search.

Figure 59:
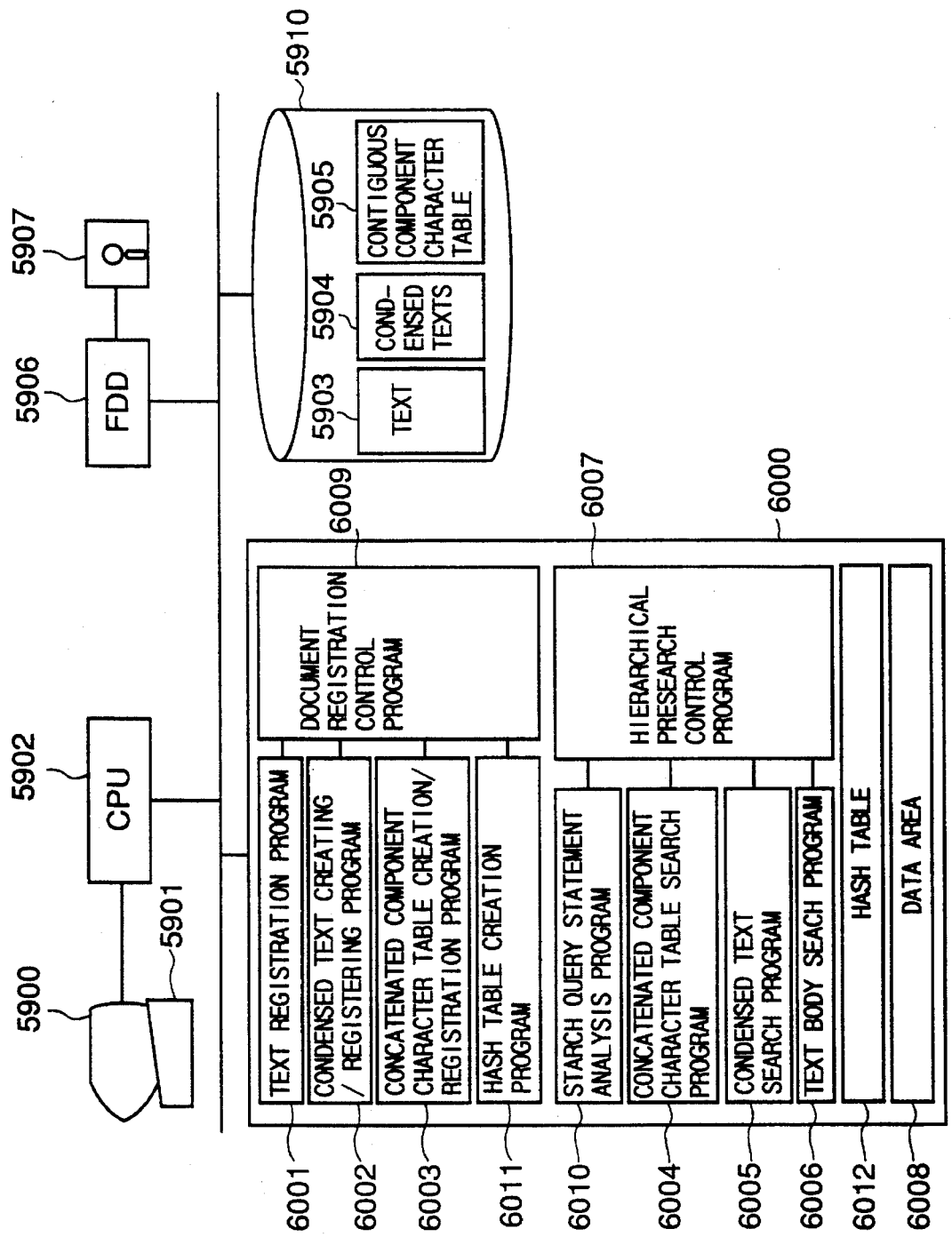
FIG. 59 is a schematic functional block diagram showing a general arrangement of the full document retrieval system according to a twentieth embodiment of the invention.
Figure 60:
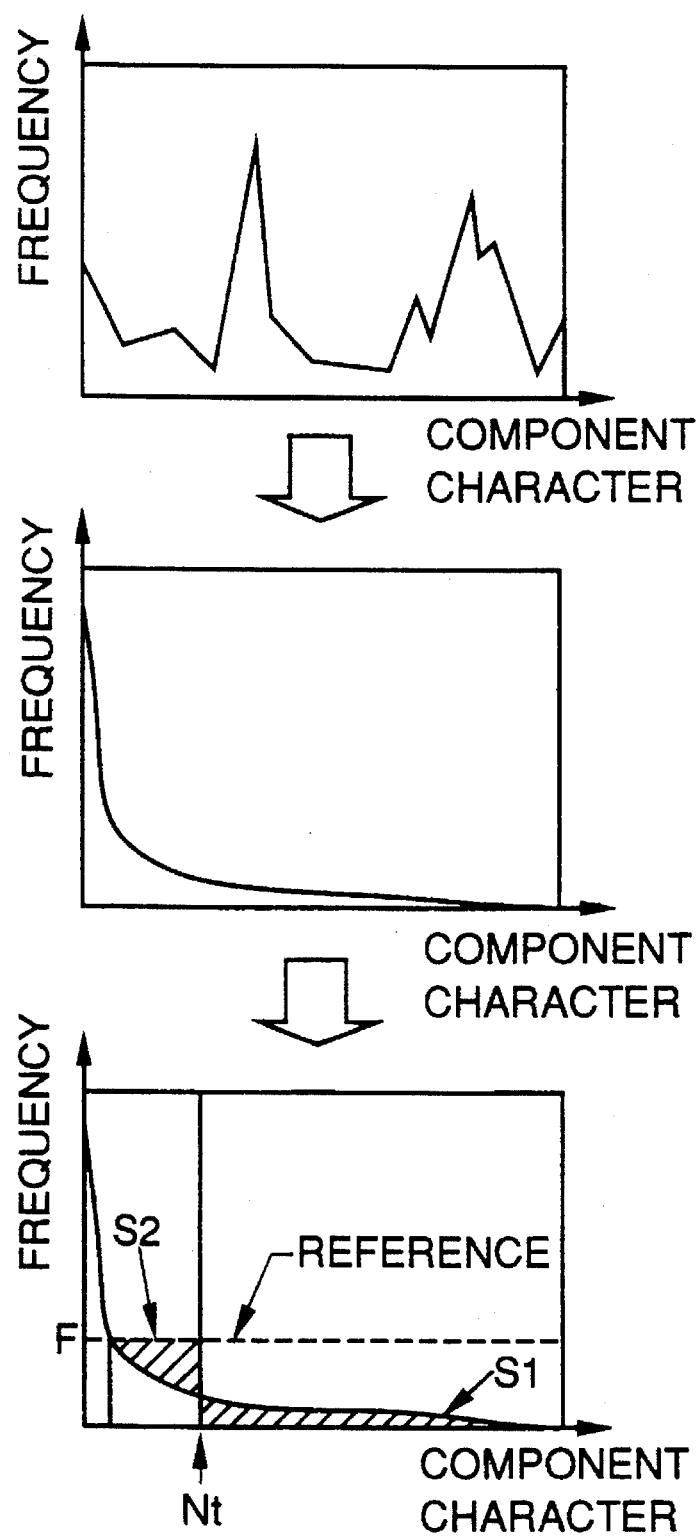
FIG. 60 is a view for illustrating determination of a standard or reference for the hashing employed in the preparation of a frequency information hashing type concatenated component character table.

FIG. 59 shows a text retrieval system which is implemented according to the twentieth embodiment and which differs from the system according to the fifteenth embodiment in that a hash table creating program 6011 is additionally stored in the main memory. By executing this hash table creating program 6011, a hash table 6012 is created and placed in the character storing file 5910.

Figure 61:
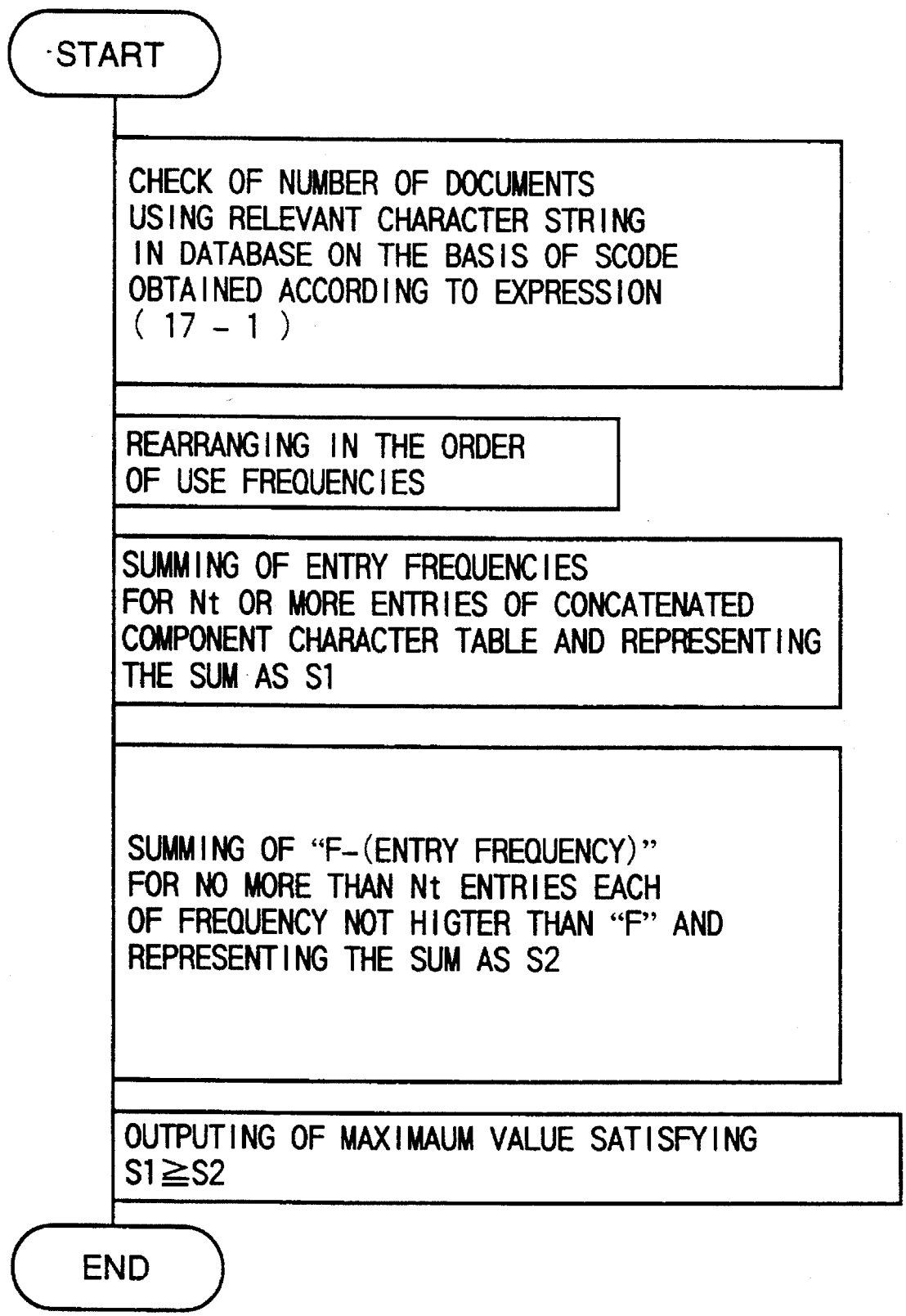
FIG. 61 is a PAD diagram for illustrating a procedure for determining a standard or reference for the hashing employed in the preparation of the frequency information hashing type concatenated component character table.
Figure 62:
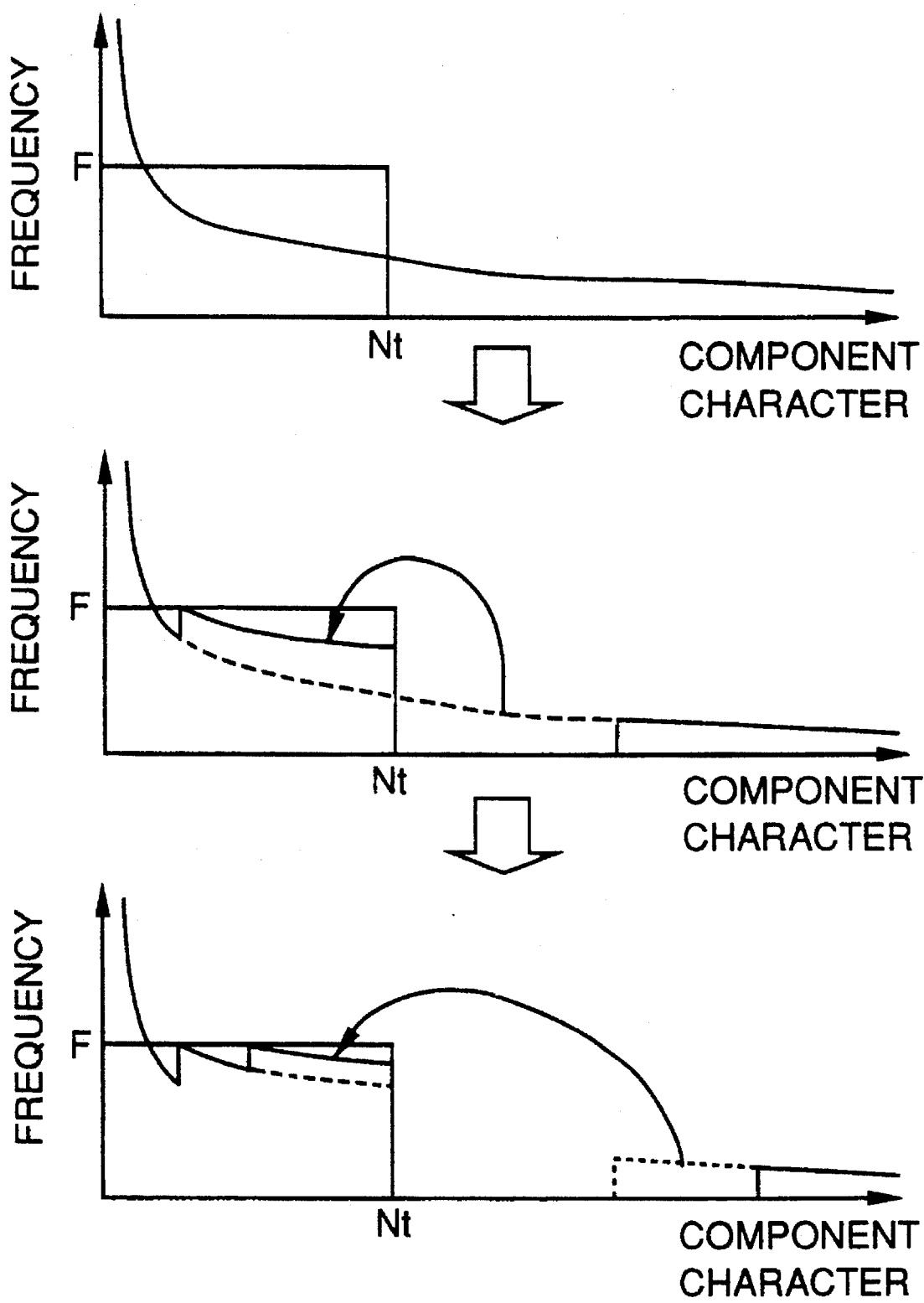
FIG. 62 is a view for illustrating schematically a concept of the frequency information hashing.

For creating the frequency-information-based hashing type concatenated component character table, frequencies at which the fragmental character strings are used in the documents registered in a database are checked to thereby determine the hash function on the basis of the frequency information thus obtained. The hash function is so-adjusted that an entry for a character string used at a high frequency is protected against the entry of other character string to a maximum possible extent while the entry for a character string of a low frequency use allows a plurality of character strings to be entered. More specifically, it is checked which of character strings are to be hashed or at what frequency level the character strings are to be allocated to one and the same entry. In more concrete, in accordance with the processing procedure illustrated in FIG. 61, a number of documents using a character string of concern in a database are checked on the basis of the code SCODE derived in accordance with the expression (17-1) mentioned hereinbefore and rearranged in the order of high to low frequencies. Subsequently, a number of documents corresponding to the number Nt of the entries in the concatenated component character table are selected, starting from the document in which the character string of concern occurs at a highest frequency. Next, on the basis of a sum S1 of the frequencies of more than Nt entries, a sum S2 given by "F entries" is determined, where F represents a certain frequency. Finally, a maximum value of F which makes the sum S2 smaller than the sum S1 is selected as the standard or reference for the hashing.

Figure 63:
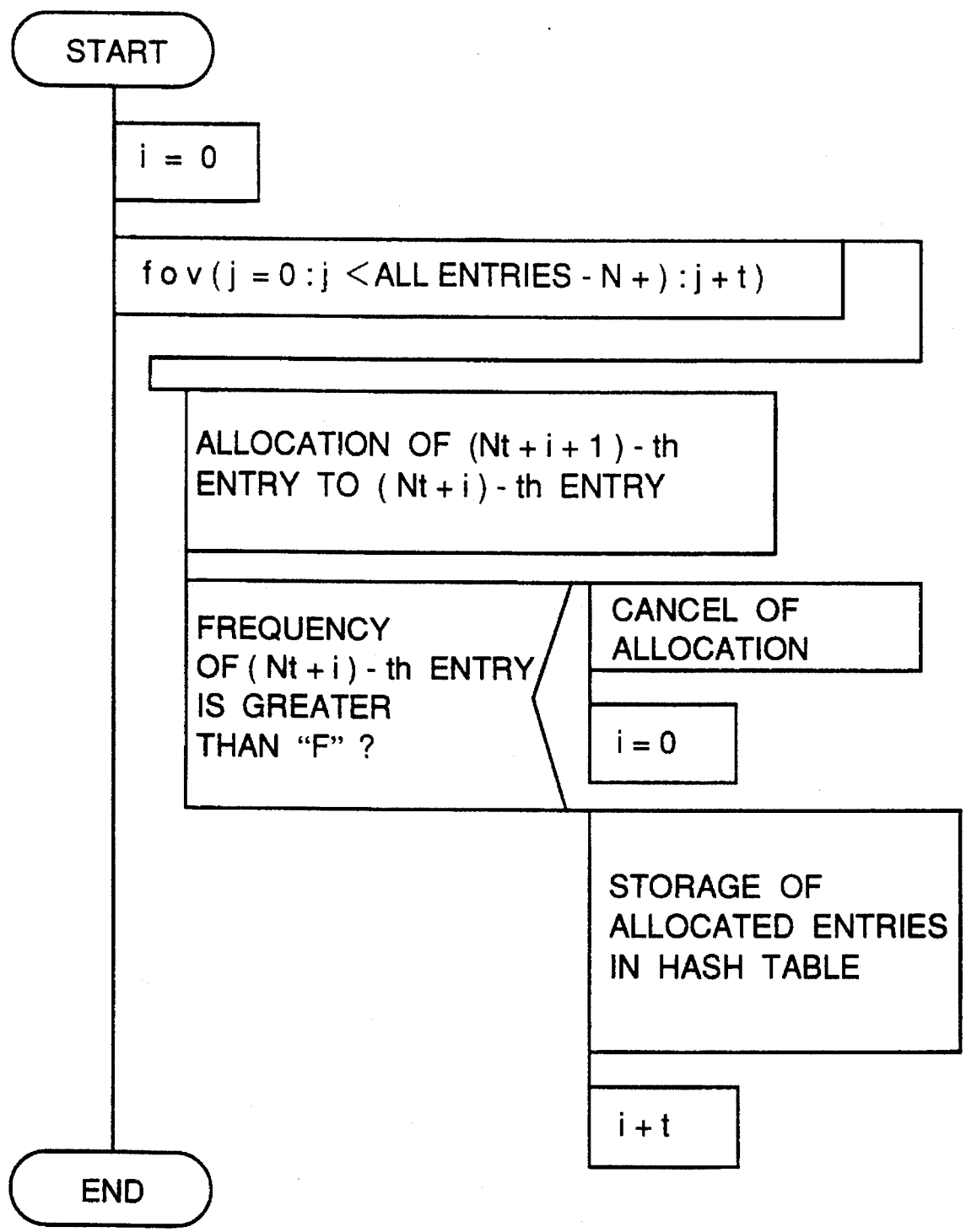
FIG. 63 is a PAD diagram for illustrating schematically a frequency information hashing procedure.

After having set the standard or reference for the hashing, the entry ID numbers greater than Nt are allocated sequentially to the entries of which frequencies is smaller than Nt and greater than F. This procedure will be described by reference to FIG. 63. As can be seen in this figure, allocation of the entry ID numbers is performed such that the entry ID numbers increasing progressively from Nt are sequentially allocated, e.g. by assigning or allocating the entry ID number Nt to a (Nt +1)-th entry, the entry ID number (Nt+2) to the (Nt−1)-th entry and so forth. In the course of the allocation of the entry numbers, care is taken not to allocate other entry to the entry having the frequency greater than F. When it is found as the result of allocation that the frequency of a certain entry exceeds F, the allocation of that entry is canceled, whereon the allocation is again started from the Nt-th entry. The allocated entries are stored in the form of a hash table shown in FIG. 64. For implementing the hash function, this table is consulted. It will be seen that in the case of the example mentioned hereinbefore, the character string "松本" represented by "( 096F0A8F )"H in SCODE1 and SCODE2 is allocated with the entry ID number "1682".

Figure 65:
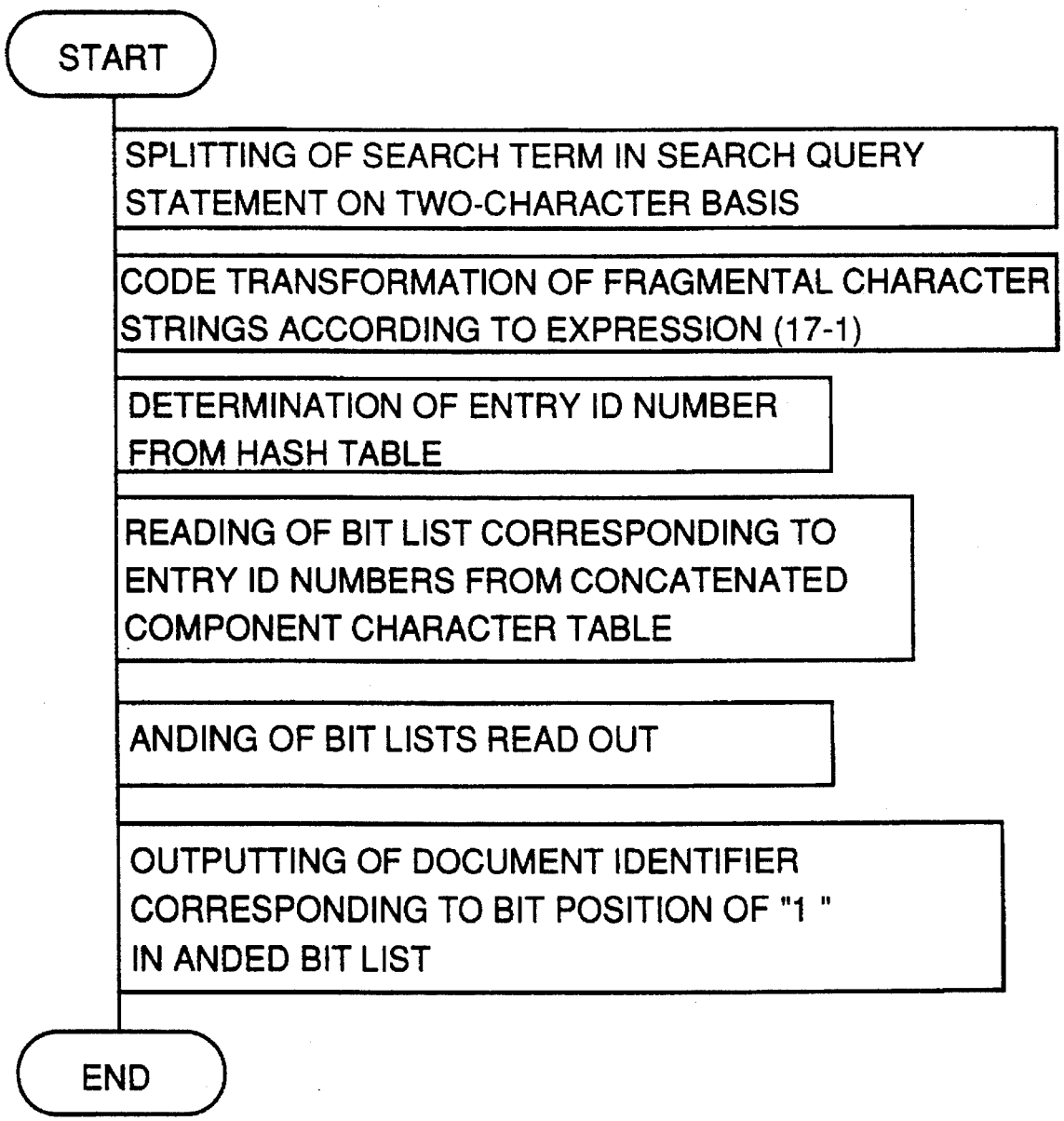
FIG. 65 is a PAD diagram for illustrating a procedure involved in searching the frequency information hashing type component character table.

In the search, the character strings resulting from the splitting of the search term and each composed of two characters are transformed to the character codes in accordance with the expression (17-1) mentioned hereinbefore, as is illustrated in FIG. 65, whereon the entry ID number is determined by consulting the hash table with the aid of the code obtained through the transformation. Subsequently, the bit list corresponding to the entry ID numbers are read out to be logically ANDed.

The control procedure for the hierarchical presearch processing is identical with that described hereinbefore in conjunction with the nineteenth embodiment. Namely, the control procedure illustrated in FIG. 51 is adopted as it is, to thereby effect firstly the concatenated component character table search by using the characters contained in the given search term, which is then followed by the condensed text search by using the search term. Unless the contextual condition and the like are designated, the retrieval is completed at the end of the condensed text search. Otherwise, the text body search is performed, the result of which is then outputted as the retrieval result.

As will be appreciated from the above description, the retrieval can be carried out stably within a remarkably shortened time by virtue of the fact that high document screening or reduction ratio can be realized stably in the concatenated component character search owing to the concatenated character component table prepared on the basis of the frequencies of character strings occurring actually in the database.

Finally, as a twenty-first embodiment of the invention, description will be made of a hierarchical presearch control method in which a frequency-information-based prehash type concatenated component character table is used for the purpose of reducing the capacity of the hash table used in the twentieth embodiment. The hash table described above in conjunction with the twentieth embodiment suffers a problem that the table capacity increases enormously as n increases to "3" or "4" because there is required the table capacity which corresponds to the number of combinations of all characters.

Figure 66:
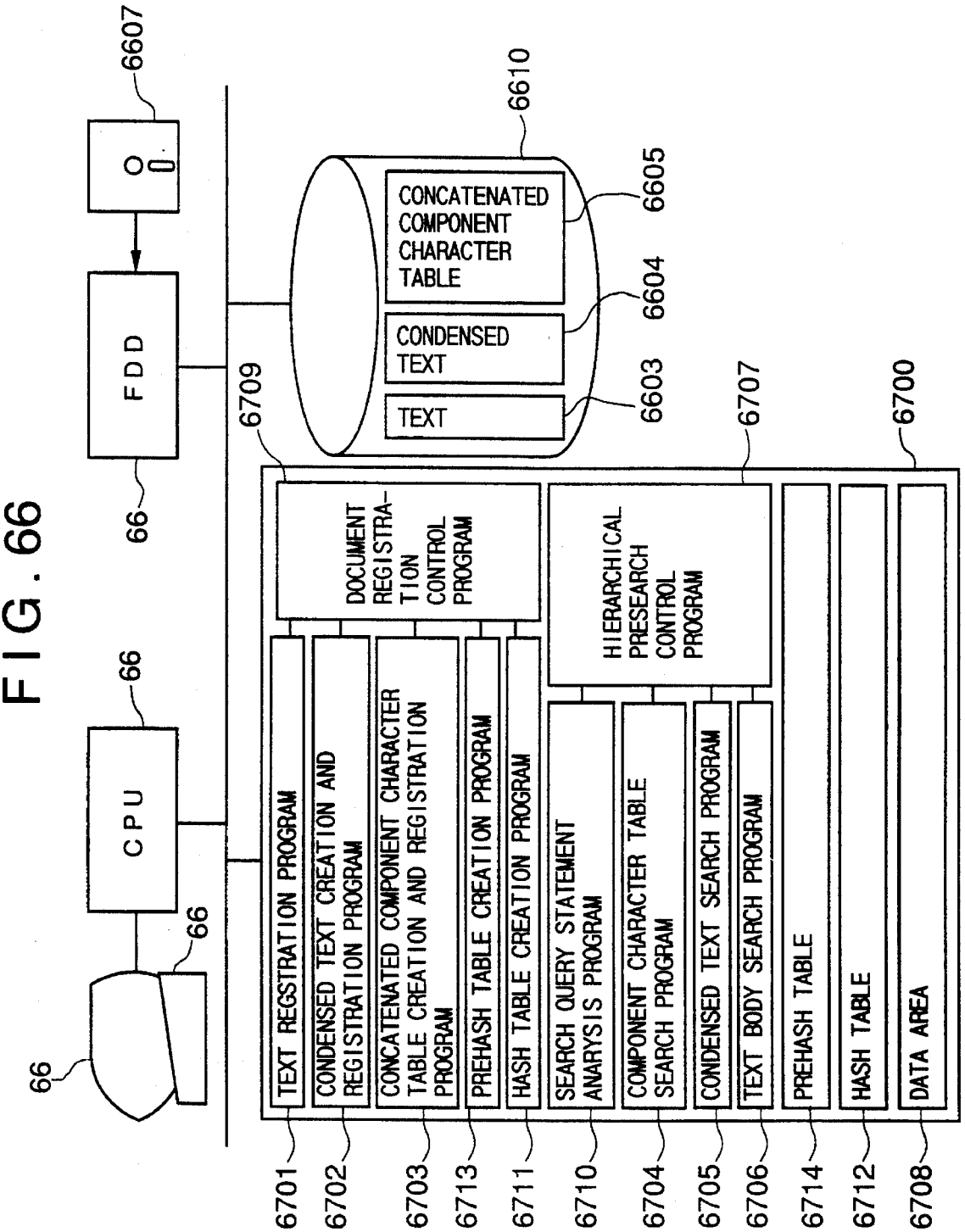
FIG. 66 is a schematic functional block diagram showing a general arrangement of a full document retrieval system according to a twenty-first embodiment of the invention.
Figure 67:
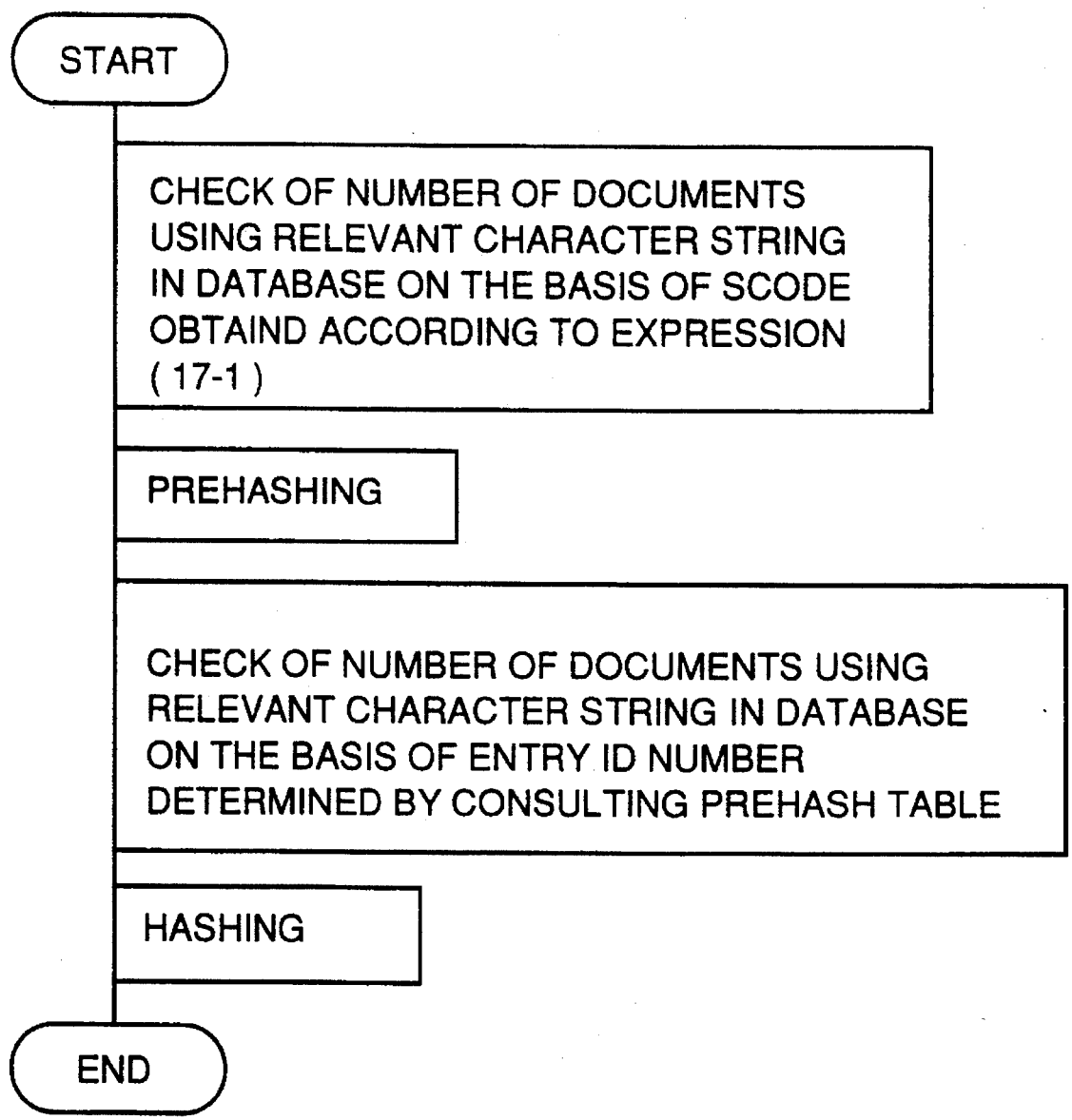
FIG. 67 is a PAD diagram for illustrating a procedure of preparing or creating a frequency information prehashing type concatenated component character table.
Figure 68:
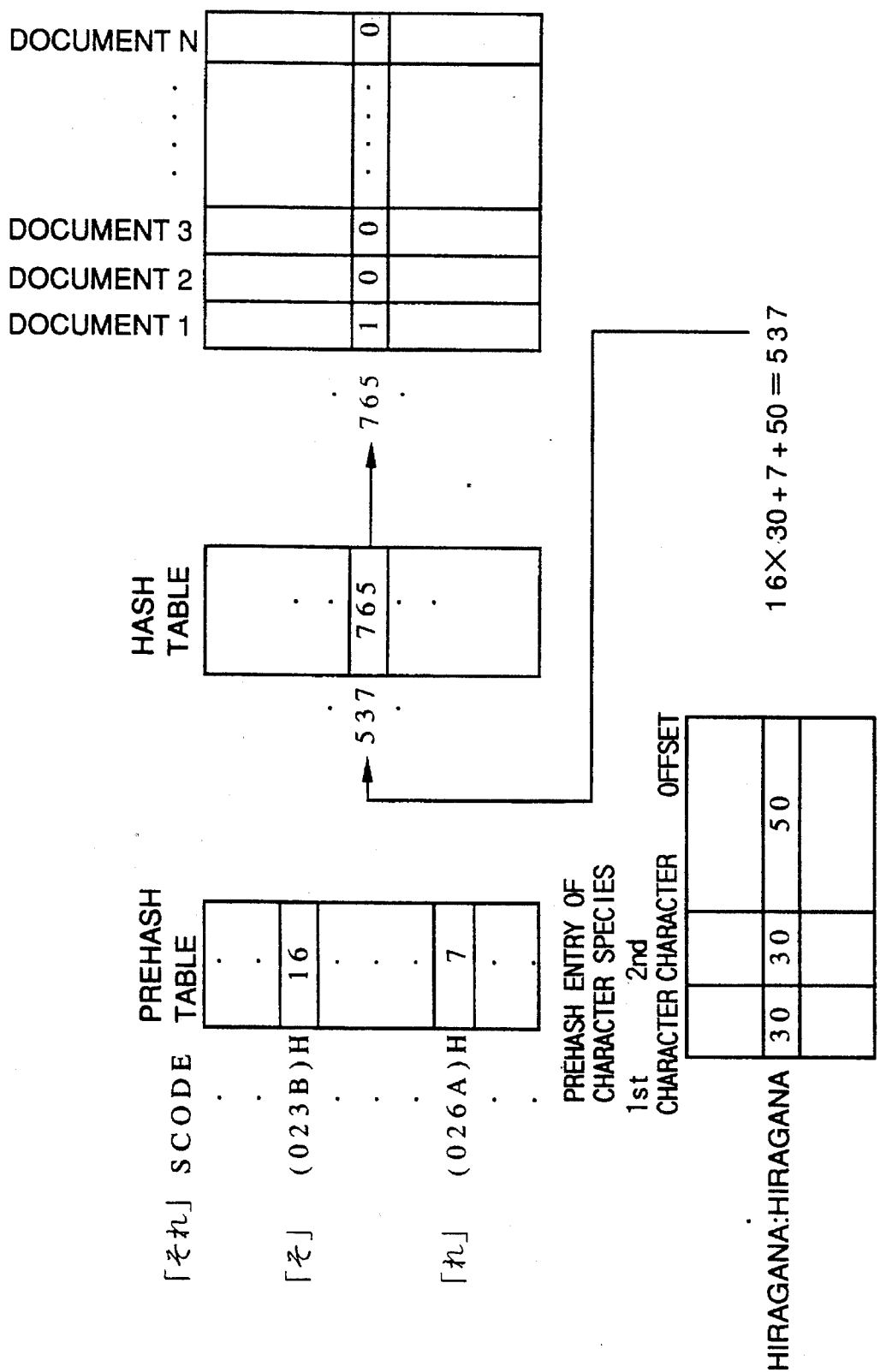
FIG. 68 is a view for illustrating a method of accessing a concatenated component character table by using a prehash table.

FIG. 66 shows a document retrieval system according to the twenty-first embodiment of the invention which differs from the twentieth embodiment in that a prehash table creation program 6713 is newly provided and stored in the main memory. By executing the prehash table creation program, a prehash table 6714 is created and stored in a storage file 6610.

For creating the frequency-information-based prehash type concatenated component character table, frequencies of use of characters in the documents registered in the database are checked, whereon the hash function is determined on the basis of the frequency information thus obtained. The hash function can be implemented in the same manner as in the case of the twentieth embodiment. In other words, the hashing is not performed straightforwardly on the character string but on the character itself. In this case, different characters of which number amounts to 6878 can be handled as if there existed only Nt characters. This hashing is referred to as the prehashing, while the table storing the allocated entries is referred to as the prehash table, which has a same structure as the hash table used in the twentieth embodiment, as will be seen from FIG. 64. The table may have a capacity capable of storing 6879 characters. Further, there is prepared an offset table storing the prehash entry numbers of the character species of first and second characters together with offset.

Subsequently, the frequencies of use of fragmental character strings in the document registered in the database is checked to thereby determine the hash function on the basis of the frequency information. To this end, the frequency information is checked for every combination of the prehash entry ID numbers obtained by referring to the prehash function implemented in the form of the abovementioned prehash table by using the character codes. The hash function can be realized in the same manner as in the case of the twentieth embodiment. For making reference to the hash table with the aid of the prehash table, the prehash entry of the first character is multiplied with the number of prehash entries of the character species of the second character, whereon the prehash table is consulted by using a numerical value resulting from addition of the prehash entry of the second character with the offset. By way of example, in the case of the character string "ギ ガ", the prehash table is consulted with SCODEs of the individual characters to thereby extract the prehash entry for each of the characters. Assuming that the prehash entry of "ギ" is "16" that of "ガ" is "7", the number of prehash entries stored in the offset table is "30" and that the offset is "50", the prehash table is referred to with "537" ="16×30+ 7+50". The structure of the prehash table is same as in the case of the twentieth embodiment.

When the number of prehash entries, i.e. Nt is "1024", the prehash table may have a capacity capable of accommodating "1024×1024" entries.

The control procedure for the hierarchical presearch is same as that described hereinbefore in conjunction with the nineteenth embodiment. Namely, the concatenated component character table is first searched by using a character string contained in the search term, which is then followed by execution of a condensed text search by using the search term. Unless the contextual or the like condition is designated, the retrieval comes to an end upon completion of the condensed text search. Otherwise, the text body search is conducted, the result of which is outputted as the document retrieval result.

As will be appreciated from the above description, the capacity of the hash table can significantly be reduced by adopting the prehashing method according to the twenty-first embodiment of the invention to an advantage.

It can now be understood from the foregoing description that according to the second aspect of the invention, those documents which are irrelevant to the inputted search term can be sieved out with a high accuracy at the level of the fragmental character string through the hierarchical procedure by using a component character table (particularly the concatenated component character table) and the condensed texts and omitting the text body search, whereby the full document retrieval can be realized at a correspondingly increased speed, which in turn means that the full document retrieval can be performed at a practically acceptable response rate even on a large scale document database.

We claim:

1. A document data processing method for retrieving a document containing at least a search term designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings on the basis of at least one of character species including katakana character, hiragana character, kanji character, alphabetic character, numeric character, and symbol character and checking mutual inclusion relations possibly existing among said fragmental character strings resulting from said decomposition, to thereby create the condensed texts each constituted by a set of the fragmental character strings in which any character string found to be included by other character string is eliminated;

creating a component character table in which characters occurring in each of said condensed texts are registered without duplication; and registering in said document database said condensed texts together with said component character table in addition to the texts of the document to be registered; and upon retrieval of the document containing the designated search term, executing first a component character table search for thereby extracting those documents which contain all species of characters constituting the search term designated by the operator by consulting said component character table;

executing subsequently a condensed text search by consulting the condensed texts of the documents extracted through said component character table search for extracting only the documents corresponding to the condensed texts which contain the fragmental character strings constituting the search term designated by the operator to thereby select the documents containing the designated search term; and executing finally a text body search for extracting a document which satisfies query condition imposed on the search term by consulting the texts of the documents extracted through said component character table search and said condensed text search.

2. A document data processing method for document retrieval according to claim 1, wherein said component character table registers without duplication all the characters as used on a document basis.

3. A document data processing method for document retrieval according to claim 2, wherein said component character table is created by mapping the character codes to a number of entry codes of said table which is smaller than a number of the characters used actually by using a hash function.

4. A document data processing method for document retrieval. according to claim 1, wherein in association with said component character table search, a bit list in which one-bit information allocated to all usable characters is prepared for each of said documents and wherein bit positions for the characters used in the documents are set to "1s" respectively, while the bit positions for the characters not used in the documents are set to "0s", respectively;

said component character table search is executed by searching said a bit list having all the bit positions set to "1s" for all the characters constituting said search term.

5. A document data processing method for document retrieval according to claim 4, wherein by mapping the character codes to a number of entry codes which is smaller than the number of the characters actually used, said bit list is realized by a number of bits which is smaller than a number of the character types actually used.

6. A document data processing method for document retrieval according to claim 5, wherein in association with said component character table search, a bit list in which one-bit information allocated to all usable characters is prepared for each of said documents and wherein bit positions for the characters used in the documents are set to "1s" respectively, while the bit positions for the characters not used in the documents are set to "0s", respectively;

said component character table search is executed by searching said bit list having all the bit positions set to "1s" for all the characters constituting said search term.

7. A document data processing method for document retrieval according to claim 6, wherein by mapping the character codes to a number of entry codes which is smaller than the number of the characters actually used, said bit list is realized by a number of bits which is smaller than a number of the characters actually used.

8. A document data processing method for document retrieval according to claim 1, wherein said text body search is executed when said search term is constituted with a plurality of character species and when said query condition includes a positional condition of the search term in the next text.

9. A document data processing method for retrieving a document containing at least a search term designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings on the basis of at least one of character species including katakana character, hiragana character, kanji character, alphabetic character, numeric character, and symbol character and checking mutual inclusion relations possibly existing among said fragmental character strings resulting from said decomposition, to thereby create the condensed texts each constituted by a set of the fragmental character strings in which any character string found to be included by other character string is eliminated;

creating a component character table in which characters occurring in registered texts are registered without duplication; and registering in said document database said condensed texts together with said component character table in addition to the texts of the document to be registered; and upon retrieval of the document containing the designated search term, executing first a component character table search for thereby extracting those documents which contain all species of characters constituting the search term designated by the operator by consulting said component character table;

executing subsequently a condensed text search by consulting the condensed texts of the documents extracted through said component character table search for extracting only the documents corresponding to the condensed texts which contain the fragmental character strings constituting the search term designated by the operator to thereby select the documents containing the designated search term; and executing finally a text body search for extracting a document which satisfies query condition imposed on the search term by consulting the texts of the documents extracted through said component character table search and said condensed text search.

10. A document data processing method for document retrieval according to claim 9, wherein said component character table registers without duplication all the characters as used on a document basis.

11. A document data processing method for document retrieval according to claim 10, wherein said component character table is created by mapping the character codes to a number of entry codes of said table which is smaller than a number of the characters used actually by using a hash function.

12. A document data processing method for document retrieval according to claim 9, wherein said text body search is executed when said search term is constituted with a plurality of character species and when said query condition includes a positional condition of the search term in the next text.

13. A document data processing method for retrieving a document containing all of plural search terms designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings on the basis of at least one of character species including katakana character, hiragana character, kanji character, alphabetic character, numeric character and symbol character and checking mutual inclusion relations possibly existing among said fragmental character strings resulting from said decomposition, to thereby create the condensed texts each constituted by a set of the fragmental character strings in which any character string found to be included by other character string is eliminated;

creating a component character table in which characters occurring in registered texts are registered without duplication; and registering in said document database said condensed texts together with said component character table in addition to the texts of the document to be registered; and upon retrieval of the document containing the designated search term, executing first a component character table search for thereby extracting those documents which contain all species of characters constituting each of said search terms designated by the operator by consulting said component character table;

executing subsequently a condensed text search by consulting the condensed texts of the documents extracted through said component character table search for extracting only the documents corresponding to the condensed texts which contain all the fragmental character strings constituting each of said search terms designated by the operator to thereby select the documents containing the designated search terms; and executing finally a text body search for extracting a document which satisfies query condition imposed on said search terms such as positional relation thereof in the text by consulting the texts of the documents extracted through said component character table search and said condensed text search.

14. A document data processing method for retrieving a document containing any one of search terms designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings on the basis of at least one of character species including katakana character, hiragana character, kanji character, alphabetic character, numeric character and symbol character and checking mutual inclusion relations possibly existing among said fragmental character strings resulting from said decomposition, to thereby create the condensed texts each constituted by a set of the fragmental character strings in which any character string found to be included by other character string is eliminated;

creating a component character table in which characters occurring in registered texts are registered without duplication; and registering in said document database said condensed texts together with said component character table in addition to the texts of the document to be registered; and upon retrieval of the document containing the designated search term, executing first a component character table search for thereby extracting those documents which contain all species of characters constituting any one of said search terms designated by the operator by consulting said component character table;

executing subsequently a condensed text search by consulting the condensed texts of the documents extracted through said component character table search for extracting only the documents corresponding to the condensed texts which contain all the fragmental character strings constituting any one of said search terms designated by the operator to thereby select the documents containing the designated search terms; and executing finally a text body search for extracting a document which satisfies query condition imposed on said search terms by consulting the texts of the documents extracted through said component character table search and said condensed text search.

15. A document data processing method for retrieving a document containing at least a search term designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings in dependence on character species each of the fragmental character strings being able to include one of katakana character string, hiragana character string, kanji character string, alphabetic character string, numeric character string and symbol character string, and checking mutual inclusion relations possibly existing among said fragmental character strings resulting from said decomposition, while checking said hiragana character string by consulting a basic word dictionary and conjunction rules as to whether said hiragana character string represents a succession of subsidiary words having semantically no meaning as the search term, to thereby create the condensed texts each constituted by a set of the fragmental character strings in which any character string found to be included by other character string and any hiragana character string found to be a succession of the semantically meaningless subsidiary words are excluded;

creating a component character table in which characters occurring in registered texts are registered without duplication; and registering in said document database said condensed texts together with said component character table in addition to the texts of the document to be registered; and upon retrieval of the document containing the designated search term, executing first a component character table search for thereby extracting those documents which contain all species of characters constituting the search term designated by the operator by consulting said component character table;

executing subsequently a condensed text search by consulting the condensed texts of the documents extracted through said component character table search for extracting only the documents corresponding to the condensed texts which contain the fragmental character strings constituting the search term unless said fragmental character strings have been determined to be a succession of semantically meaningless words as the search term after the check of said fragmental character strings by using the basic word dictionary and the conjunction rules; and executing finally a text body search for extracting a document which satisfies query condition imposed on the search term by consulting the texts of the documents extracted through said component character table search and said condensed text search while consulting the registered texts of the documents extracted through said component character table search when any one of said fragmental character strings has been determined to be a succession of the semantically meaningless words, for thereby extracting a document which contains each of the fragmental character strings and which satisfies the retrieval condition imposed on the search term concerning the positional relation thereof.

16. A document data processing method for document retrieval according to claim 15, wherein said text body search is executed when said search term is constituted with a plurality of character species and when said query condition includes a positional condition of the search term in the next text.

17. A document data processing method for retrieving a document containing at least a search term designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings in dependence on character species each of the fragmental character strings being able to include one of katakana character string, hiragana character string, kanji character string, alphabetic character string, numeric character string and symbol character string, and checking mutual inclusion relations possibly existing among said fragmental character strings resulting from said decomposition, after having eliminated all the hiragana character strings, to thereby create the condensed texts each constituted by a set of the fragmental character strings in which any character string found to be included by other character string is excluded;

creating a component character table in which characters occurring in registered texts are registered without duplication; and registering in said document database a plurality of said condensed texts corresponding to said character species, respectively, together with said component character table in addition to the texts of the documents to be registered; and upon retrieval of the document containing the designated search term, executing first a component character table search for thereby extracting those documents which contain all species of characters constituting the search term designated by the operator by consulting said component character table;

executing subsequently a condensed text search by consulting the condensed texts of the documents extracted through said component character table search for extracting only the documents corresponding to the condensed texts which contain the fragmental character strings constituting the search term designated by the operator provided that said fragmental character strings constituting the search term designated by the operator has been determined as including none of the hiragana character strings as a result of corresponding decision step; and executing finally a text body search for extracting a document which satisfies query condition imposed on the search term by consulting the texts of the documents extracted or alternatively for extracting a document containing the designated fragmental character strings and satisfying said query condition by consulting the original text of the document extracted through said component character table search.

18. A document data processing method for document retrieval according to claim 17, wherein said text body search is executed when said search term is constituted with a plurality of character species and when said query condition includes a positional condition of the search term in the next text.

19. A document data processing method for retrieving a document containing at least a search term designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings on the basis of at least one of character species including katakana character, hiragana character, kanji character, alphabetic character, numeric character and symbol character and checking mutual inclusion relations possibly existing among said fragmental character strings resulting from said decomposition, to thereby create a plurality of condensed texts separately on a character species basis, each of said condensed texts being constituted by the fragmental character strings of a same character species while excluding any character string found to be included by other character string;

creating a component character table describing the species of the characters occurring in registered texts;

registering in said document database said plurality of character-species based condensed texts together with said component character table in addition to the text of the document to be registered; and upon retrieval of the document containing the designated search term, executing first a component character table search for thereby extracting those documents which contain all the species of characters constituting the search term designated by the operator by consulting said component character table;

executing subsequently a condensed text search by consulting the condensed text corresponding to the character species of the fragmental character strings constituting the search term designated by the operator in the documents extracted through said component character table search for extracting only the documents corresponding to the condensed texts which contain the fragmental character strings constituting the search term designated by the operator to thereby select the documents containing the designated search term; and executing finally a text body search for extracting a document which satisfies query condition imposed on the search term by consulting the texts of the documents extracted through said component character table search and said condensed text search.

20. A document data processing method for document retrieval according to claim 19, wherein said text body search is executed when said search term is constituted with a plurality of character species and when said query condition includes a positional condition of the search term in the next text.

21. A document data processing method for retrieving a document containing a search term designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings on the basis of at least one of character species including katakana character, hiragana character, kanji character, alphabetic character, numeric character and symbol character and checking mutual inclusion relations possibly existing among said fragmental character strings resulting from said decomposition, to thereby create the condensed texts each constituted by a set of the fragmental character strings in which any character string found to be included by other character string is eliminated;

creating a component character table in which characters occurring in each of said condensed texts are registered without duplication; and registering in said document database said condensed texts together with said component character table in addition to the text of the document to be registered; and upon retrieval of the document containing the designated search term, executing first a component character table search for thereby extracting those documents which contain all species of characters constituting the search term designated by the operator by consulting said component character table; and executing subsequently a condensed table search by consulting the condensed texts of the documents extracted through said component character table search for thereby extracting only the documents corresponding to the condensed texts which contain the fragmental character strings constituting the search term designated by the operator to thereby extract the documents containing the designated search term;

creating a component character table in which characters occurring in texts are registered without duplication; and registering in said document database said component character table in addition to the texts of the documents to be registered; and upon retrieval of the document containing the designated search term, executing first a component character table search for thereby extracting those documents which contain all species of characters constituting the search term designated by the operator by consulting said component character table; and executing subsequently a text body search by consulting the texts of the documents extracted through said component character table search for thereby extracting only the document which contains the designated search term and which satisfies query condition imposed on the search term such as positional relation thereof in the text, whereby a full text retrieval is carried out at an equivalently increased speed.

22. A document data processing method for retrieving a document containing a search term designated by an operator from a document database registering therein document information in terms of character code data while referring to textual content of said document, comprising the steps of:

upon registration of text documents in said document database, creating a component character table in which characters occurring in texts are registered without duplication; and registering in said document database said component character table in addition to the texts of the documents to be registered; and upon retrieval of the document containing the designated search term, executing first a component character table search for thereby extracting those documents which contain all species of characters constituting the search term designated by the operator by consulting said component character table; and executing subsequently a text body search by consulting the texts of the documents extracted through said component character table search for thereby extracting only the document which contains the designated search term and which satisfies query condition imposed on the search term.

23. A document data processing method for retrieving a document containing at least a search term designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings on the basis of at least one of character species including katakana character, hiragana character, kanji character, alphabetic character, numeric character and symbol character and checking mutual inclusion relations possibly existing among said fragmental character strings resulting from said decomposition, to thereby create the condensed texts each constituted by a set of the fragmental character strings in which any character string found to be included by other character string is eliminated; and registering in said document database said condensed texts in addition to the texts of the documents to be registered; and upon retrieval of the document containing the designated search term, executing a condensed text search by consulting the condensed texts of the documents for extracting only the documents corresponding to the condensed texts which contain the fragmental character strings constituting the search term designated by the operator to thereby select the documents containing the designated search term; and executing a text body search for extracting a document which satisfies query condition imposed on the search term by consulting the texts of the documents extracted through said condensed text search.

24. A document data processing method for document retrieval according to claim 23, wherein said text body search is executed when said search term is constituted with a plurality of character species and when said query condition includes a positional condition of the search term in the next text.

25. A document data processing system for retrieving a document containing a search term designated by an operator from a document database registering therein document information in terms of character code data while referring to textual content of said document, comprising:

for registration of text documents in said document database, means for creating condensed texts by decomposing each of textual character strings of the documents to be registered into fragmental character strings on the basis of at least one of character species including include hiragana character, kanji character, alphabetic character, numeric character and symbol character and checking mutual inclusion relations possibly existing among said fragmental character strings resulting from said decomposition, to thereby create the condensed texts each constituted by a set of the fragmental character strings in which any character string found to be included by other character string is eliminated;

means for creating a component character table in which characters occurring in each of said condensed texts are registered without duplication; and means for registering in said document database said condensed texts together with said component character table in addition to the texts of the documents to be registered; and for document retrieval, component character table search means for extracting those documents which contain all species of characters constituting the search term designated by the operator by consulting said component character table;

condensed text search means for extracting only the documents corresponding to the condensed texts which contain the fragmental character strings constituting the search term designated by the operator by consulting the condensed texts of the documents extracted through the component character table search; and text body search means for extracting a document which satisfies query condition imposed on the search term by consulting the texts of the documents extracted.

26. A document data processing system for retrieving a document containing a search term designated by an operator from a document database registering therein document information in terms of character code data while referring to textual content of said document, comprising:

for registration of text documents in said document database, means for creating condensed texts by decomposing each of textual character strings of the documents to be registered into fragmental character strings on the basis of at least one of character species including include hiragana character, kanji character, alphabetic character, numeric character and symbol character and checking mutual inclusion relations possibly existing among said fragmental character strings resulting from said decomposition, to thereby create the condensed texts each constituted by a set of the fragmental character strings in which any character string found to be included by other character string is eliminated;

means for creating a component character table in which characters occurring in each of said condensed texts are registered without duplication;

means for registering in said document database said condensed texts together with said component character table in addition to the texts of the documents to be registered; and means for storing the condensed text data in a RAM disk while storing the component character table in a semiconductor memory; and for document retrieval, component character table search means for extracting those documents which contain all species of characters constituting the search term designated by the operator by consulting said component character table;

condensed text search means for extracting only the documents corresponding to the condensed texts which contain the fragmental character strings constituting the search term designated by the operator by consulting the condensed texts of the documents extracted through the component character table search; and text body search means for extracting a document which satisfies query condition imposed on the search term by consulting the texts of the documents extracted.

27. A document data processing system for retrieving a document containing a search term designated by an operator from a document database registering therein document information in terms of character code data while referring to textual content of said document, comprising:

for registration of text documents in said document database, means for creating condensed texts by decomposing each of textual character strings of the documents to be registered into fragmental character strings on the basis of at least one of character species including include hiragana character, kanji character, alphabetic character, numeric character and symbol character and checking mutual inclusion relations possibly existing among said fragmental character strings resulting from said decomposition, to thereby create the condensed texts each constituted by a set of the fragmental character strings in which any character string found to be included by other character string is eliminated;

means for creating a component character table in which characters occurring in each of said condensed texts are registered without duplication; and means for registering in said document database said condensed texts together with said component character table in addition to the texts of the documents to be registered and storing the text data and the condensed text data in a magnetic disk while storing said component character table in a semiconductor memory; and for document retrieval, component character table search means for extracting those documents which contain all species of characters constituting the search term designated by the operator by consulting said component character table;

means for checking the number of the documents extracted through the component character table search;

condensed text search means for reading out all of said condensed texts by neglecting the result of the component character table search, when said number of said extracted documents has attained a predetermined number, to thereby extract only the documents corresponding to the condensed texts which contain the fragmental character strings constituting the search term designated by the operator, while consulting the condensed texts of the documents extracted through said component character table search to thereby extract only the documents corresponding to the condensed text containing the fragmental character strings which-constitute the search term designated by the operator, when said number of said extracted documents is smaller than said predetermined number; and text body search means for extracting a document which satisfies query condition imposed on the search term by consulting the texts of the documents extracted.

28. A document data processing system for retrieving a document containing a search term designated by an operator from a document database registering therein document information in terms of character code data while referring to textual content of said document, comprising:

for registration of text documents in said document database, means for creating condensed texts by decomposing each of textual character strings of the documents to be registered into fragmental character strings on the basis of at least one of character species including include hiragana character, kanji character, alphabetic character, numeric character and symbol character and checking mutual inclusion relations possibly existing among said fragmental character strings resulting from said decomposition, to thereby create the condensed texts each constituted by a set of the fragmental character strings in which any character string found to be included by other character string is eliminated;

means for creating a component character table in which characters occurring in each of said condensed texts are registered without duplication; and means for registering in said document database said condensed texts together with said component character table in addition to the texts of the documents to be registered and storing the text data and the condensed text data in a magnetic disk while storing said component character table in a semiconductor memory; and for document retrieval, component character table search means for extracting those documents which contain all species of characters constituting the search term designated by the operator by consulting said component character table;

means for checking the number of the documents extracted through the component character table search;

condensed text search means for reading out all of said condensed texts by neglecting the result of the component character table search only when said number of said extracted documents has attained a predetermined number, to thereby extract only the documents corresponding to-the condensed texts which contain the fragmental character strings constituting the search term designated by the operator; and text body search means for extracting a document which satisfies query condition imposed on the search term by consulting the texts of the documents extracted, while consulting the condensed texts of the documents extracted through said component character table search to thereby extract only the document corresponding to the condensed text containing the fragmental character strings which constitute the search term designated by the operator, when said number of said extracted documents is smaller than said predetermined number.

29. A document data processing method for retrieving a document containing at least a search term designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings on the basis of at least one of character species including hiragana character, katakana character, kanji character, alphabetic character, numeric character and symbol character and checking mutual inclusion relations possibly existing among said fragmental character strings resulting from said decomposition, to thereby create the condensed texts each constituted by a set of the fragmental character strings in which any character string found to be included by other character string is eliminated;

creating a concatenated component character table by preparing, for each of the documents, information of all usable character strings each composed of at least two characters, said information including first information indicating those character strings which are used in the document to be registered and second information indicating those character strings unused in the document to be registered; and registering in said document database said condensed texts together with said concatenated component character table in addition to the texts of the document to be registered; and upon retrieval of the document containing the designated search term, executing a component character table search for extracting all the documents in which all the character strings contained in the search term designated by the operator and each composed of at least two characters are used, by consulting said concatenated component character table;

executing a condensed text search by consulting the condensed texts corresponding to the documents extracted through said component character table search for thereby extracting only the documents which contain the fragmental character strings constituting the search term designated by the operator; and executing finally a text body search for extracting a document from the documents selected through said condensed text search which document satisfies query condition imposed on the search term by consulting the texts of the documents extracted through said concatenated component character table search and said condensed text search.

30. A document data processing method for document retrieval according to claim 29, wherein in association with said concatenated component character table a bit list in which one-bit information are allocated to all usable character strings each composed of at least two characters, respectively, is prepared for each of said documents and wherein bit positions in said bit list for the character strings used in the documents are set to "1s", respectively, while the bit positions for the character strings not used in the documents are set to "0s", respectively.

31. A document data processing method for document retrieval according to claim 30, wherein said concatenated component character table is prepared on the basis of the individual character strings each constituted by a predetermined number n (where n is an integer greater than or equal to 2) of characters for each character species including hiragana character, katakana character, kanji character, numeric character, symbol character and symbol character.

32. A document data processing method for document retrieval according to claim 30, wherein said concatenated component character table is prepared by mapping sets of character codes to the bit list having a number of entries which is smaller than the number of combinations of the characters used actually by using a hash function.

33. A document data processing method for document retrieval according to claim 32, wherein each of the character strings used actually is decomposed on the basis of at least one of the character species including hiragana character, katakana character, kanji character, alphabetic character, numeric character, symbol and symbol character, and wherein said concatenated component character table is prepared by mapping sets of character codes to the bit list having a number of entries which is smaller than the number of combinations of the characters used actually by using a hash function.

34. A document data processing method for document retrieval according to claim 32, wherein use frequencies at which the character strings are actually used are checked, and upon mapping the sets of character codes to the bit list having a number of bits smaller than the number of the character strings used actually by the hash function, the character strings of a lower use frequency are mapped to a same bit.

35. A document data processing method for document retrieval according to claim 32, wherein the character codes are mapped to a number of codes of entries which is smaller than that of the characters used actually by using said hash function, whereon sets of the hashed character codes are mapped to the bit list having a number of entries smaller than the number of the actually used character strings by using another hash function.

36. A document data processing method for document retrieval according to claim 30, said concatenated component character table being prepared on the basis of the character strings each composed of n characters, wherein in the step of the concatenated component character table search, the document containing all the character strings each composed of n characters and contained without duplication in the search term designated by the operator is extracted by searching the bit list having the relevant bit positions all set to 1".

37. A document data processing method for document retrieval according to claim 30, said concatenated component character table being prepared on the basis of the character strings each composed of n characters, wherein in the step of the concatenated component character table search, the document containing all the character strings each composed of n characters and contained in duplication in the search term designated by the operator is extracted by searching the bit list having the relevant bit positions all set to "1".

38. A document data processing method for document retrieval according to claim 30, said concatenated component character table being constituted by character strings each composed of a given number of characters in a range of one to n, wherein when the search term designated by the operator is composed of a number of characters which is smaller than n, the result of said concatenated component character table search is outputted as the final result of the document retrieval, whereupon the search processing is ended.

39. A document data processing method for document retrieval according to claim 29, wherein said text body search is executed when said search term is constituted with a plurality of character species and when said query condition includes a positional condition of the search term in the next text.

40. A document data processing method for retrieving a document containing at least a search term designated by an operator from a document database registering therein document information in terms of character code data while referring to textual content of said document, comprising steps of:

upon registration of text documents in said document database, creating condensed texts by decomposing each of textual character strings of the documents to be registered into fragmental character strings on the basis of at least one of character species including hiragana character, katakana character, kanji character, alphabetic character, numeric character and other symbol character and checking mutual inclusion relations possibly existing among said fragmental character strings resulting from said decomposition, to thereby create the condensed texts each constituted by a set of the fragmental character strings in which any character string found to be included by other character string is eliminated;

creating a single component character table and a concentrated component character table by preparing, for each of the documents, information of all usable single characters and character strings each composed of at least two characters, said information including first information indicating those single-character and character strings which are used in the document to be registered and second information indicating those single-character and character strings unused in the document to be registered, respectively; and registering in said document database said condensed texts together with said concatenated component character table in addition to the texts of the document to be registered; and upon retrieval of the document containing the designated search term, executing a component character table search for extracting all the documents in which all the character strings contained in the search term designated by the operator and each composed of at least two characters are used, by consulting said concatenated component character table;

executing a condensed text search by consulting the condensed texts corresponding to the documents extracted through said component character table search for thereby extracting only the documents which contain the fragmental character strings constituting the search term designated by the operator; and executing finally a text body search for extracting a document from the documents selected through said condensed text search which document satisfies query condition imposed on the search term by consulting the texts of the documents extracted through said concatenated component character table search and said condensed text search.

41. A document data processing method for document retrieval according to claim 40, wherein in association with said concatenated component character table, a bit list in which one-bit information are allocated to all usable character strings each composed of at least two characters, respectively, is prepared for each of said documents and wherein bit positions in said bit list for the character strings used in the documents are set to "1s", respectively, while the bit positions for the character strings not used in the documents are set to "0s", respectively.

42. A document data processing method for document retrieval according to claim 40, wherein said text body search is executed when said search term is constituted with a plurality of character species and when said query condition includes a positional condition of the search term in the next text.

43. A text data creating method for creating a text database for storing document information as character code data, comprising steps of:
   (1) fetching text data;
   (2) determining frequencies at which individual character strings each constituted by a predetermined number n of characters are used in the text data and rearraying said character strings in a sequential order in dependence on said frequencies;
   (3) establishing correspondences between said character strings and a number of entries which is smaller than the number of said character strings and storing said correspondences in the form of a hash table; and
   (4) storing at the entry corresponding to the character strings used in said text data said character strings in the form of a componeht character table.

44. A full text retrieval method for retrieving a document containing a search term designated by an operator from a text data database registering therein document information as character code data while referring to textual content of said document, comprising steps of:
   (1) fetching text data;
   (2) determining frequencies at which individual character strings each constituted by a predetermined number n of characters are used in the text data and rearraying said character strings in a sequential order in dependence on said frequencies;
   (3) establishing correspondences between said character strings and a number of entries which is smaller than the number of said character strings and storing said correspondences in the form of a hash table;
   (4) storing at the entry corresponding to the character strings used in said text data said character strings in the form of a component character table;
   (5) decomposing the search term designated by the operator into fragmental character strings each composed of n characters;
   (6) extracting from said component character table those entries which correspond to said fragmental character strings resulting from said decomposition; and
   (7 retrieving said document in which all the character strings constituting said search terms exist, by consulting the entries extracted from said component character table.

45. A document data processing system for retrieving a document containing a search term designated by an operator from a document database registering therein document information in terms of character code data while referring to textual content of said document, comprising:
   for registration of text documents in said document database,
   means for registering texts of documents to be registered;
   means for creating condensed texts by decomposing each of textual character strings of the documents to be registered into fragmental character strings on the basis of at least one of character species including hiragana character, katakana character, kanji character, alphabetic character, numeric character and symbol character and checking mutual inclusion relations possibly existing among said fragmental character strings resulting from said decomposition, to thereby create and register the condensed texts each constituted by a set of the fragmental character strings in which any character string found to be included by-other character string is eliminated; and
   means for creating a concatenated component character table by preparing, for each of the documents, information of all usable character strings each composed of at least two characters, said information including first information indicating those character strings which are used in the document to be registered and second information indicating those character strings unused in the document to be registered and registering said concatenated component character table in said database; and
   for retrieval of the document containing the designated search term,
   component character table search means for extracting all the documents in which all the character strings contained in the search term designated by the operator and each composed of at least two characters are used, by consulting said concatenated component character table;
   condensed text search means for executing a condensed text search by consulting the condensed texts corresponding to the documents extracted through said component character table search for thereby extracting only the documents which contain the fragmental character strings constituting the search term designated by the operator; and
   text body search means for executing a text body search for extracting a document from the documents selected through said condensed text search which document satisfies query condition imposed on the search term by consulting the texts of the documents extracted through said concatenated component character table search and said condensed text search.

46. A document data processing system for retrieving a document containing a search term designated by an operator from a document database registering therein document information in terms of character code data while referring to textual content of said document, comprising:
   for registration of text documents in said document database,
   means for registering texts of documents to be registered;
   means for creating condensed texts by decomposing each of textual character strings of the documents to be registered into fragmental character strings on the basis of at least one of character species including hiragana character, katakana character, kanji character, alphabetic character, numeric character and symbol character and checking mutual inclusion relations possibly existing among said fragmental character strings resulting from said decomposition, to thereby create and register the condensed texts each constituted by a set of the fragmental character strings in which any character string found to be included by other character string is eliminated;

means for creating a hash table by checking frequencies at which said fragmental character strings are used, determining a hash function on the basis of the frequency information and mapping said fragmental character strings to a bit list having entries in a number smaller than that of combinations of actually used character; and means for creating a concatenated component character table by preparing, for each of the documents, information of all usable character strings each composed of at least two characters by consulting said hash table, said information including first information indicating those character strings which are used in the document to be registered and second information indicating those character strings unused in the document to be registered and registering said concatenated component character table in said database; and for retrieval of the document containing the designated search term, component character table search means for extracting all the documents in which all the character strings contained in the search term designated by the operator and each composed of at least two characters are used, by consulting said concatenated component character table;

condensed text search means for executing a condensed text search by consulting the condensed texts corresponding to the documents extracted through said component character table search for thereby extracting only the documents which contain the fragmental character strings constituting the search term designated by the operator; and text body search means for executing a text body search for extracting a document from the documents selected through said condensed text search which document satisfies query condition imposed on the search term by consulting the texts of the documents extracted through said concatenated component character table search and said condensed text search.

47. An index creating apparatus, comprising:

means for fetching data for retrieval;

counting means for determining frequencies at which characters contained in said data for retrieval are used;

sorting means for rearraying said characters in the order of frequencies at which said characters are used;

means for establishing correspondences between said characters and a number of bits, respectively, said bit number being smaller than that of said characters, means for converting character codes of said characters to the corresponding bits; and means for manipulating said bits on a bit-by-bit basis.

48. A document retrieval apparatus, comprising:

input means for inputting a search term;

means for extracting bit lists corresponding to character strings constituting said search term from a component character table;

means for logically ANDing said bit lists; and means for transforming result of said ANDing operation into a document identifier affixed to a document.

49. A document data processing method for retrieving a document containing a search term designated by an operator from a document database registering therein document information in terms of character code data while referring to the textual content of said document, comprising steps of:

upon registration of text documents in said document database, creating a concatenated component character table in which character strings, each being constituted with n-characters (n<2) and occurring in the text documents, are registered without duplication for each of the text documents, and registering in said document database said component character table in addition to the texts of the documents to be registered; and upon retrieval of a document containing the designated search term, executing first a component character table search for thereby extracting those documents which contain all species of characters constituting the search term designated by the operator by consulting said concatenated component character table; and executing subsequently a text body search by consulting the texts of the documents extracted through said component character table search for thereby extracting only the document which contains the designated search term and which satisfies a query condition imposed on the search term.

50. A document data processing method for document retrieval according to claim 49, further including, upon registration of the text documents, a step of creating and registering an additional character table in which characters occurring in the text documents or character strings, each being constituted with characters of a number smaller than n and occurring in the text documents, are registered, wherein said additional character table is consulted instead of said concatenated character table when said search term is constituted with characters of a number smaller than n.

* * * * *